US008510158B2

(12) United States Patent
Postrel

(10) Patent No.: US 8,510,158 B2
(45) **Date of Patent: *Aug. 13, 2013**

(54) ONLINE REWARD POINT EXCHANGE METHOD AND SYSTEM WITH REWARD TRANSACTIONS BASED ON USER PROFILES

(75) Inventor: Richard Postrel, Miami Beach, FL (US)

(73) Assignee: Signature Systems LLC, Miami Beach, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/491,912

(22) Filed: Jun. 8, 2012

(65) Prior Publication Data

US 2012/0303433 A1 Nov. 29, 2012

Related U.S. Application Data

(63) Continuation of application No. 12/703,243, filed on Feb. 10, 2010, which is a continuation-in-part of application No. 12/687,423, filed on Jan. 14, 2010, now abandoned.

(60) Provisional application No. 61/144,733, filed on Jan. 14, 2009.

(51) Int. Cl.
*G06Q 30/00* (2012.01)
*G05B 19/418* (2006.01)

(52) U.S. Cl.
USPC .......................................... 705/14.23; 235/379

(58) Field of Classification Search
USPC .......................................................... 235/379
See application file for complete search history.

(56) References Cited

U.S. PATENT DOCUMENTS

| | | | | |
|---|---|---|---|---|
| 2002/0160761 | A1 * | 10/2002 | Wolfe | 455/414 |
| 2003/0036952 | A1 | 2/2003 | Panttaja et al. | |
| 2003/0050831 | A1 * | 3/2003 | Klayh | 705/14 |
| 2006/0010033 | A1 | 1/2006 | Thomas | |
| 2006/0053056 | A1 * | 3/2006 | Alspach-Goss et al. | 705/14 |
| 2008/0257958 | A1 * | 10/2008 | Rothwell et al. | 235/380 |

OTHER PUBLICATIONS

"Intellinet Develops Rewards Management Application for Stratus Rewards Exclusive Credit Cards; Selection Based Upon Microsoft. NET Experience & Custom Iterative Development." PR Newswire , p. NA. Jun. 7, 2004.*

* cited by examiner

*Primary Examiner* — Victoria Vanderhorst
(74) *Attorney, Agent, or Firm* — Barkume & Associates, P.C.

(57) ABSTRACT

An online reward exchange system and method of operation, which includes an exchange computer that interoperates via a computer network with user computers, reward point issuer computers, and merchant computers. The merchants' products may be purchased by a user by requesting an issuer(s) to redeem reward points in exchange for payment to the merchant for the product. The exchange computer is the gateway to the system and manages various transactions such as providing online product catalogs to users that list the merchants products, as well as displaying to the user the reward points he has available in his reward programs with the issuers. Once a user selects a desired product the exchange computer can mediate or manage the purchase transaction in which reward points are redeemed by the selected issuer and consideration is conveyed to the merchant in exchange for the merchant providing the product to the user.

16 Claims, 84 Drawing Sheets

FIGURE 2
Welcome to Swift Rewards!
Login
Email Address
Password
Go!
New User Registration
Start Now!
Millions of rewards to choose from!
200

1100

1400

2400

2700

2800

2900

3000

3100

3600

4200

4400

4500

4600

4900

5000

5300

5400

5700

6100

6200

6300

6500

6600

6700

ONLINE REWARD POINT EXCHANGE METHOD AND SYSTEM WITH REWARD TRANSACTIONS BASED ON USER PROFILES

CROSS-REFERENCE TO RELATED APPLICATIONS

This application is a continuation of application Ser. No. 12/703,243 filed Feb. 10, 2010, which is a continuation-in-part of application Ser. No. 12/687,423 filed Jan. 14, 2010 now abandoned, which claims the benefit of U.S. provisional application 61/144,733, filed on Jan. 14, 2009.

TECHNICAL FIELD

This invention relates to reward systems, and in particular to a reward point exchange platform that enables users to exchange reward points amongst various reward programs via an online exchange service, and more particularly to such a reward exchange platform that provides reward redemption offers based on user profile information.

BACKGROUND OF THE INVENTION

Users often may earn reward points as part of a transaction with a merchant or issued by a credit card company or a distributor. For example, a merchant and/or issuer may award a user one point for each dollar spent. In this case, a $100 purchase will result in the awarding of 100 reward points, which are tracked in a reward point account stored on a reward point server computer managed by the merchant, issuer or a third party service provider. In addition, credit card issuers may implement their own reward point system, such as AMERICAN EXPRESS MEMBERSHIP REWARDS. In this card issuer-based system, a user may be awarded one point for every dollar spent regardless of the merchant. For example, if a user spends a total of $2,465 in one month with his credit card, the issuer may award him with 2,465 points in a reward account. Often these merchant-based programs are implemented independently from a card issuer-based program, such that a user may be awarded with reward points in multiple accounts based on the same transaction. Airline frequent flyer programs operate similarly and may award points or miles based on the distance or cost of an airplane trip (or on the value of the customer to the airline rather than its distance or cost).

Many programs offer redemption programs in which the user may trade in, or redeem, his reward points in exchange for goods, services, or discounts. For example, a user may redeem 20,000 MEMBERSHIP REWARD points for a music player device, or he may redeem 50,000 AMERICAN AIRLINES points for a free flight or seat upgrade, etc. A major problem in this field is that redemption options are limited to only certain goods available from a certain merchant, issuer, or catalog. Also, users often have small amounts of points in several accounts, each of which provide no meaningful redemption options. My issued U.S. Pat. Nos. 6,594,640; 6,842,739; 6,820,061; 6,829,586; 6,947,898; 7,096,190; 7,512,551; 7,624,040; 7,624,041 relate to the exchange and/or combination of reward points from various user accounts so that the aggregated reward points provide greater redemption options to the user. This new invention is for a reward point exchange platform in which consumers (users), merchants, manufacturers, issuers and other partners may interoperate to the benefit of all parties.

In particular, it is desired to provides reward redemption offers to a user based on user profile information such as prior reward redemptions of the user and the prior viewing history of the user

SUMMARY OF THE INVENTION

The present invention includes a system that provides for and implements a "promotional wallet". For example, card issuers desire consumers to adopt and utilize (spend money with) their card. To achieve this, they offer an incentive system whereby they provide points or other value to the consumer (the "promotional wallet" of the issuer). The consumer collects this promotional wallet from numerous issuers, with the average American household being a member of fourteen reward programs. The consumer is able to aggregate their promotional wallet, based on a set of eligibility rules, which he trades in exchange for goods and services from the merchant by transferring his promotional wallet to the merchant. The merchant in turn transfers his promotional wallet in the form of a discount provided to the issuer. Thus, a complete cycle of the promotional wallets are transferred from the issuer to the consumer, from the consumer to the merchant, and from the merchant to the issuer, allowing the issuer to liquidate his liability at a discount, merchants to sell more and optimize their inventory, and consumers to purchase products and services from a much larger universe of offerings with greater frequency and ease. In addition a product manufacturer may operate in the same manner as a merchant by providing products for sale directly to the consumer or through a third party via the exchange of the present invention without using the merchant as a middleman; the manufacturer may also provide a portion of his promotional wallet to merchants and other participants in the wholesale-retail chain of distribution as an incentive for participating on the exchange in liquidating certain products and services designated by the manufacturer as a credit towards the purchase of "new inventory" for every item sold in the selected inventory on the exchange. This helps to collapse the cycle time of bringing new products of the manufacturer to market and increases the sales volume of the merchants as well, without cannibalizing the cash wallet of the consumer. For the issuer, provided is an optimization methodology for the lifetime value of his reward points and frequent flyer miles.

The exchange of the present invention further provides for issuers to geometrically expand their merchant base and redemption offering opportunities to consumers in a seamless end-to-end solution which allows consumers to not only aggregate their reward points for a higher value redemption and a higher perceived value redemption, but more frequent redemption opportunities and solves the problem for issuers of not being able to manage large numbers of merchants in their reward program. Most reward programs have less than a thousand merchants who redeem points, the largest being AMERICAN EXPRESS with approximately 1500 merchants. Currently these merchant programs are managed by account managers. There is a limit to the number of accounts they can manage. Thus, only a limited number of merchants participate and this is generally confined to the largest merchants. Under this invention, the nearly 18 million merchants in the United States and millions of international merchants that accept credit cards would now be able to participate on reward programs. The system provides automated eligibility and trading capabilities for the issuers to enable the electronic management of the system. In so doing, this allows for a bidding system whereby millions of merchants may bid for access to issuers' cardmembers by offering a discount on the redeemed value of the issuers' points for that privilege, thereby driving the cost of redemption down and liquidating liability at meaningful discounts for the issuer.

By implementing the present invention, the merchant is provided with an inventory optimization system which is based upon an age discount progression algorithm whereby inventory is tracked according to age and assigned a discount based upon the algorithm. When the algorithm matches one or more of the trading relationships established with issuers, or meets a designated price, that inventory is transferred into the rewards server and is available for redemption on the exchange thereby creating an inventory optimization engine that dynamically connects the merchants' promotional wallet to the issuer with the sale discount on his selected merchandise according to his rules based algorithm.

In one embodiment, it is recognized that a major expense of a merchant is his differential discount from full price to cash price. When merchants get new inventory, it is put out for sale (whether in a brick and mortar store or an online store) at full price. If the products sell at an acceptable rate then the price will stay at full price. If, however, the merchandise does not sell at an acceptable rate, then the merchandise is discounted. Depending upon how poorly the merchandise sells, and how long it takes to sell, that merchandise is discounted at a greater degree. Under the present invention, this discount may be utilized as a promotional wallet and be transferred to the issuer. For example, a merchant may provide 60% off full price in his store, and have a relationship to provide 30% off in the exchange and earn an additional 30% on the sale of that product. Or, in the alternative, the merchant may opt to provide 30% off to the customer and 30% off to the issuer. In this scenario a $100 item would sell for a $70 price to the customer. The customer would redeem what he perceives to be a one hundred dollar item paid for with $70 worth of points from a selected issuer(s), which may be 7,000 points (with a perceived value of one cent per point). The merchant would provide a further 30% discount to the issuer, so the issuer would only pay the merchant $40 cash but would retire 7,000 of the customer's reward points in the transaction. By selling the inventory at less of a discount to the consumer ($30 rather than $60), brand devaluation is eliminated, and the consumer is glad to be able to purchase using his promotional wallet and preserving his cash. The exchange takes a transaction fee from individual constituents.

Thus, as more fully described herein, the present invention in one aspect is a method for operating an online reward exchange system. A user registers via a user computer over a computer network with an exchange computer via a web site by entering into the user computer user information comprising reward account information for at least one reward program in which the user is previously enrolled, the reward program operated by an issuer via an issuer computer and providing reward points to a reward account of the user stored in association with the issuer computer as a result of a transaction previously executed between the user and the issuer. A plurality of merchants also register with the exchange computer via the web site by using an associated merchant computer for providing merchant information comprising (i) product information that identifies at least one product to be offered for sale to the user via the exchange computer, and (ii) a designation of issuers registered with the exchange computer with which the merchant agrees to execute a reward redemption transaction when requested by the user. A plurality of issuers also register with the exchange computer via the web site, each of the issuers registering using an associated issuer computer for providing issuer information comprising a designation of merchants registered with the exchange computer with which the issuer agrees to execute a reward redemption transaction when requested by the user.

The exchange computer communicates with each of the issuer computers with which the user is enrolled with a reward account with the issuer computer. The exchange computer receives reward account information from each of the issuer computers for the user. The exchange computer then calculates a promotional wallet for the user, which comprises a total redeemable value for all of the user's reward accounts stored in the plurality of issuer computers. The exchange computer then displays to the user via the user computer the user's promotional wallet.

In one embodiment, an unregistered user views a web page from an issuer computer of a registered issuer, the unregistered user being previously enrolled in a reward program of the registered issuer. The unregistered user selects a link on the web page that automatically links the unregistered user computer to the exchange computer, and the exchange computer automatically registers the unregistered user by using reward account information transmitted from the issuer computer to the exchange computer. The user may then enter additional reward account information for a plurality of additional issuers with which the user is previously enrolled.

A reward redemption transaction may then be executed by a user selecting, via a web page served to the user computer by the exchange computer, an item for purchase from a merchant (for example by utilizing a dynamic search filter presented by the web page that enables the user to select a desired product category, manufacturer, and/or price range), the item to be purchased at least partially by the redemption of reward points from at least one issuer. The user selects via the web page at least one reward program previously registered in the exchange computer by the user and a quantity of reward points to be redeemed for the purchase of the item by the user. The exchange computer then causes a purchase transaction to be executed for the item selected by the user using at least the quantity of reward points from the reward program selected by the user.

The user may also select via the user computer a plurality of points of interest, which are tracked and analyzed by the exchange computer. The exchange computer then provides the user computer with a web page displaying products available for redemption determined as a result of analyzing the points of interest selected by the user. The exchange computer may also dynamically display to the user computer a quantity of products available for redemption that correspond to each of the points of interest selected by the user.

In one embodiment, the exchange computer causes the purchase transaction to be executed for the item selected by the user using at least the quantity of reward points from the reward program selected by the user by first requesting the issuer computer associated with the selected reward program to (I) reduce the reward account associated with the user by the quantity of reward points selected by the user for execution of the reward redemption transaction, and (II) convey consideration to the exchange computer corresponding to the quantity of reward points selected by the user for execution of the reward redemption transaction. The exchange computer then conveys consideration to the merchant computer selected by the user in exchange for the associated merchant providing to the user the selected item.

In another embodiment, the exchange computer causes the purchase transaction to be executed by requesting the merchant to execute the purchase transaction by first transmitting to the merchant computer (I) an identification of the item selected by the user and (II) an identification of the reward issuer selected by the user and the quantity of reward points selected by the user for redemption for the item. The merchant computer then requests the issuer computer associated with the selected reward program to (I) reduce the reward account associated with the user by the quantity of reward points selected by the user for execution of the reward redemption transaction, and (II) convey consideration to the merchant computer corresponding to the quantity of reward points selected by the user for execution of the reward redemption transaction. The issuer computer at some point (e.g. in real time or at a later time in batch mode) conveys consideration to the merchant in exchange for the merchant providing to the user the selected item.

The exchange computer may provide a proposed redemption solution to the user computer, which designates at least one reward program previously registered in the exchange computer by the user and a quantity of reward points to be redeemed for the purchase of the item by the user. The user may then either accept the proposed redemption solution, or modify the proposed redemption solution as desired.

The exchange computer determines the proposed redemption solution by any or all of: (1) referencing a user profile stored in an associated user profile database that indicates user preferences as to which of a plurality of reward programs is desired to be used for reward redemption, (2) analyzing prior reward redemptions by the user stored in an associated reward redemption database to ascertain a preferred reward program, (3) ascertaining by reference to a merchant profile database a preferred redemption partner of the merchant from which the user is making the product purchase, (4) referencing an exchange rules profile stored in an exchange rules profile database that indicates exchange preferences as to which of a plurality of reward programs is desired to be used for reward redemption, (5) referencing an issuer rules profile stored in an issuer rules profile database that indicates issuer preferences as to which of a plurality of reward programs is desired to be used for reward redemption. In the case of the issuer rules profile, the issuer preferences may comprise (1) a preference to redeem the reward points of a primary issuer before redeeming reward points of issuers other than the primary issuer, (2) a preference to redeem the reward points of a primary issuer after redeeming reward points of issuers other than the primary issuer, (3) a preference to redeem the reward points of a primary issuer up to a specified amount, after which the points of issuers other than the primary issuer will be redeemed, or (4) a preference to redeem the reward points of a issuers other than a primary issuer up to a specified amount, after which the points of the primary issuer will be redeemed.

In one aspect, the user may bid on a reward redemption transaction by selecting via a web page served by the exchange computer to the user computer an item for purchase from a merchant, the item to be purchased at least partially by the redemption of reward points from at least one issuer; then the user selects via the web page at least one reward program previously registered in the exchange computer by the user and a quantity of reward points to be bid to be redeemed for the purchase of the item by the user. The user computer submits to the exchange computer a bid comprising a quantity of reward points that the user is offering for redemption for purchase of the item. The exchange computer submits the bid received from the user computer to the merchant computer, and the merchant computer either accepts or rejects the bid for purchase of the product. In the alternative, the exchange computer submits the bid received from the user computer to the issuer computer, and the issuer computer either accepts or rejects the bid for purchase of the product.

In another aspect of the invention, a merchant and an issuer may execute a trading agreement. The merchant may create a bid by selecting via the merchant computer a desired issuer from a group of issuers that are registered with the exchange, and entering into the merchant computer a desired redemption discount offer, the desired redemption discount offer being the amount that the merchant is willing to provide in a transaction with the selected issuer. The merchant submits the bid to the exchange computer, which then forwards the bid to the issuer computer of the desired issuer selected by the merchant in the bid. The issuer accepts the bid, rejects the bid, or counter proposes a modified bid in which a modified redemption discount is submitted to the exchange computer for forwarding to the merchant computer. In the alternative, the issuer may create a bid by selecting with the issuer computer a desired merchant from a group of merchants that are registered with the exchange, and entering into the web page a desired redemption discount offer, the desired redemption discount offer being the amount that the issuer is willing to accept in a transaction with the selected merchant. The issuer submits the bid to the exchange computer, which then forwards the bid to the merchant computer of the desired merchant selected by the issuer in the bid. The merchant accepts the bid, rejects the bid, or counter proposes a modified bid in which a modified redemption discount is submitted to the exchange computer for forwarding to the issuer computer.

In another aspect of the invention, a merchant may submit to the exchange computer any or all of the following: (1) a price discount schedule that specifies price discounts to be automatically generated by the exchange computer as a function of elapsed time that a specified product is available for purchase; (2) a redemption schedule that specifies redemption discounts to be automatically generated by the exchange computer as a function of elapsed time that a specified product is available for purchase; and/or (3) a transacted value discount schedule that specifies transacted value discounts to be automatically generated by the exchange computer as a function of elapsed time that a specified product is available for purchase.

In yet another aspect of the invention, a user profile is built for storage in a user profile database associated with the exchange computer. A reward redemption offer is generated based on information in the user profile and then presented to the user via the user computer. The user profile may include information regarding the user's past reward redemptions and/or the user's past product viewing history. A merchant may access the user profile database in order to generate a product offer to a user that is targeted to that user based on the profile information of the user.

In another aspect of the invention, a product purchase transaction is executed by a user first selecting an item for purchase from a merchant. Then, the exchange computer determines the lowest price that is being charged by the plurality of merchants for the item selected by the user. The exchange computer also determines the lowest number of reward points that may be redeemed from the plurality of issuers for the item selected by the user. The determined lowest price and the determined lowest number of reward points are displayed to the user via the user computer, and the user selects a mode of purchase of the item with either the determined lowest price or the determined lowest number of reward points. Then, a purchase transaction is executed for the item selected by the user by the mode selected by the user.

In another embodiment, provided is a method of and system for executing a purchase transaction for an item at a point of sale, such as in a merchant retail store. Price information associated with an item to be purchased by a user is input into a point of sale device, such as a terminal associated with a cash register at a checkout counter of the store. A user ID associated the user is also input into the point of sale device, such as by swiping a credit card, loyalty card or the like. The user ID is then transmitted to an exchange computer via a computer network. The exchange computer sends back to the point of sale device a promotional wallet associated with the user ID, the promotional wallet indicating a redeemable value of reward points stored in at least one reward point account associated with the user and at least one issuer computer. The point of sale device receives the promotional wallet and displays it to the user. A redemption selection is input as a function of the promotional wallet, the redemption selection indicating a selection of reward points to be redeemed from at least one reward point account associated with the user and at least one issuer computer. The point of sale device then causes a purchase transaction to be executed for the item selected by the user by using the inputted redemption selection.

The point of sale device may cause the purchase transaction to be executed by transmitting an instruction to the exchange computer to request the at least one issuer computer to redeem the reward points selected by the user by (I) reducing the reward account associated with the user by the quantity of reward points selected by the user for execution of the purchase transaction, and (II) conveying consideration to the exchange computer corresponding to the quantity of reward points selected by the user for execution of the purchase transaction. The point of sale device may then receive confirmation from the exchange computer that the issuer computer has redeemed the reward points selected by the user and the user may take the item purchased.

Alternatively, the point of sale device may cause the purchase transaction to be executed by transmitting an instruction to the at least one issuer computer to request the at least one issuer computer to redeem the reward points selected by the user by (I) reducing the reward account associated with the user by the quantity of reward points selected by the user for execution of the purchase transaction, and (II) conveying consideration to a merchant computer associated with the point of sale device corresponding to the quantity of reward points selected by the user for execution of the purchase transaction. The point of sale device may then receive confirmation from the merchant computer that the issuer has redeemed the reward points selected by the user and the user may take the item purchased.

The promotional wallet indicates a total redeemable value of reward points stored in a plurality of reward point accounts associated with the user, wherein each of the plurality of the reward point accounts are associated with one of a plurality of issuer computers.

The redemption selection input to the point of sale device may indicate a combination of a first selection of reward points to be redeemed from a first reward point account and a second selection of reward points to be redeemed from a second reward point account, etc.

Price information associated with the item may be input by reading a machine-readable indicia associated with the item. The price information may be embedded in and obtained directly from the machine-readable indicia, or the machine-readable indicia may include an index that is used by the point of sale device to lookup the price information from an associated product database. The reading of the machine-readable indicia may be performed by scanning a bar code symbol with a bar scanning device associated with the point of sale device, or by reading an RFID tag with an RFID reader device associated with the point of sale device, or by manually entering the price information with a manual data entry device associated with the point of sale device. Alternatively, an item description may be entered, and the price looked up in a price lookup database. Further alternatively, a description of the item may be entered in lieu of the price, and the transaction may proceed on that information.

Thus, the system that is used to implement this embodiment includes an exchange computer, a merchant computer associated with a merchant and selectively interconnected to the exchange computer via a computer network, an issuer computer associated with a reward points issuer and selectively interconnected to the exchange computer via a computer network; and a point of sale device operably associated with the merchant computer. The point of sale device has at least one input device for inputting information from a user, a display, a data connection to the computer network; and a processor programmed to a) receive via the at least one input device price information associated with an item to be purchased by a user; b) receive via the at least one input device item a user ID associated the user; c) transmit the user ID to the exchange computer via the data connection; d) receive from the exchange computer via the data connection a promotional wallet associated with the user ID, the promotional wallet indicating a redeemable value of reward points stored in at least one reward point account associated with the user and at least one issuer computer; e) display the promotional wallet to the user; f) receive via the at least one input device a redemption selection as a function of the promotional wallet, the redemption selection indicating a selection of reward points to be redeemed from at least one reward point account associated with the user and at least one issuer computer; and g) cause a purchase transaction to be executed for the item selected by the user by using the inputted redemption selection.

DESCRIPTION OF THE PREFERRED EMBODIMENTS

Figure 1A:
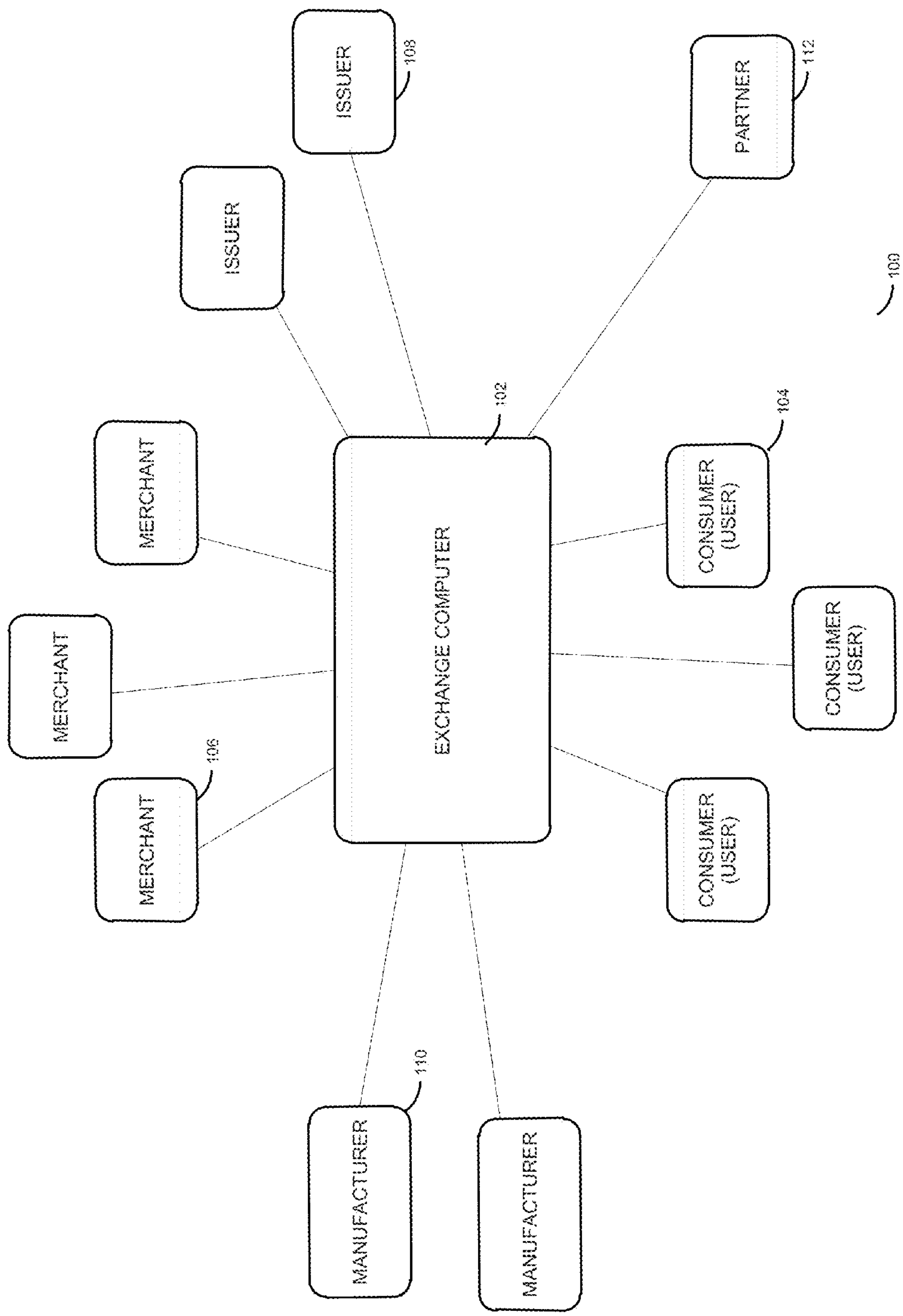
FIG. 1*a* is a top level block diagram of the system of the present invention.

FIG. 1*a* is a top level block diagram of the system 100 of the present invention, which may be referred to as the online reward exchange system, or simply the exchange. Participants on the exchange may be grouped into five different types: consumers 104 (also referred to interchangeably herein as users), merchants 106, issuers 108, manufacturers 110, and partners 112. Also shown in FIG. 1*a* is an exchange computer 102, which is the central hub or gateway that mediates the entire exchange system 100. A consumer or user 104 is a participant who makes purchases, receives reward points, and ultimately exchanges or redeems reward points for goods or services. For example, a user 104 may redeem previously earned reward points for an item on the exchange. A merchant 106 is a participant who sells goods or services to a user 104 and who receives compensation in the form of cash and/or reward points (e.g. as a credit to an account). For example, a merchant 106 may be an electronics retailer such as BEST BUY which agrees to provide a television to a user 104 and receive a discounted price. An issuer 108 is a participant which issues reward points to users 104 as part of some type of transaction. For example, an issuer 108 may be CITICORP which provides a credit card account to a user 104 and issues THANKYOU reward points each time that user uses the credit card to make a purchase. A manufacturer 110 is similar to a merchant 106 in that it sells goods to a user, but in this case it is done directly and not through a retail environment. For example, SONY may be a manufacturer 110 that produces and sells radios to users 104 through the exchange. A partner 112 is a participant that performs some other function related to the exchange. For example, a points aggregator may be a partner 112 on the system, which may perform the function of aggregating reward points from different accounts for use in redeeming on the exchange. A processor such as FIRST DATA may act on the exchange in multiple functions on behalf of merchants and processing credit card transactions.

Any participant on the exchange may function as one or more of these types. For example, a participant may function as a merchant 106 (selling goods or services) and may function as an issuer 108 (issuing points in conjunction with the sale of goods or services). For convenience purposes we will refer to them as independent entities in the following description.

The exchange computer 102 is the central server that interoperates with each of the entities described above and shown in FIG. 1*b*. All of the entities in FIG. 1*a* interoperate with the exchange computer 102 over a wide area network 114, such as the Internet, in order to accomplish the functionality of the exchange as described herein. An existing network such as a credit card network may also be used. Communications are accomplished through computers such as server and/or client computers as well known in the art. Thus, when we refer to the interactions with a merchant, we are referring to such interactions that may take place with a merchant computer 128, and likewise for the issuers 108 with issuer computers 130. In most cases the user 104 will interact with the exchange computer 102 via a user computer 126 such as a desktop computer, laptop computer, smartphone, tablet, netbook, web-enabled television set and the like. In an alternative embodiment described further herein, the user 104 may use a point of sale device to accomplish the desired transaction.

Figure 1B:
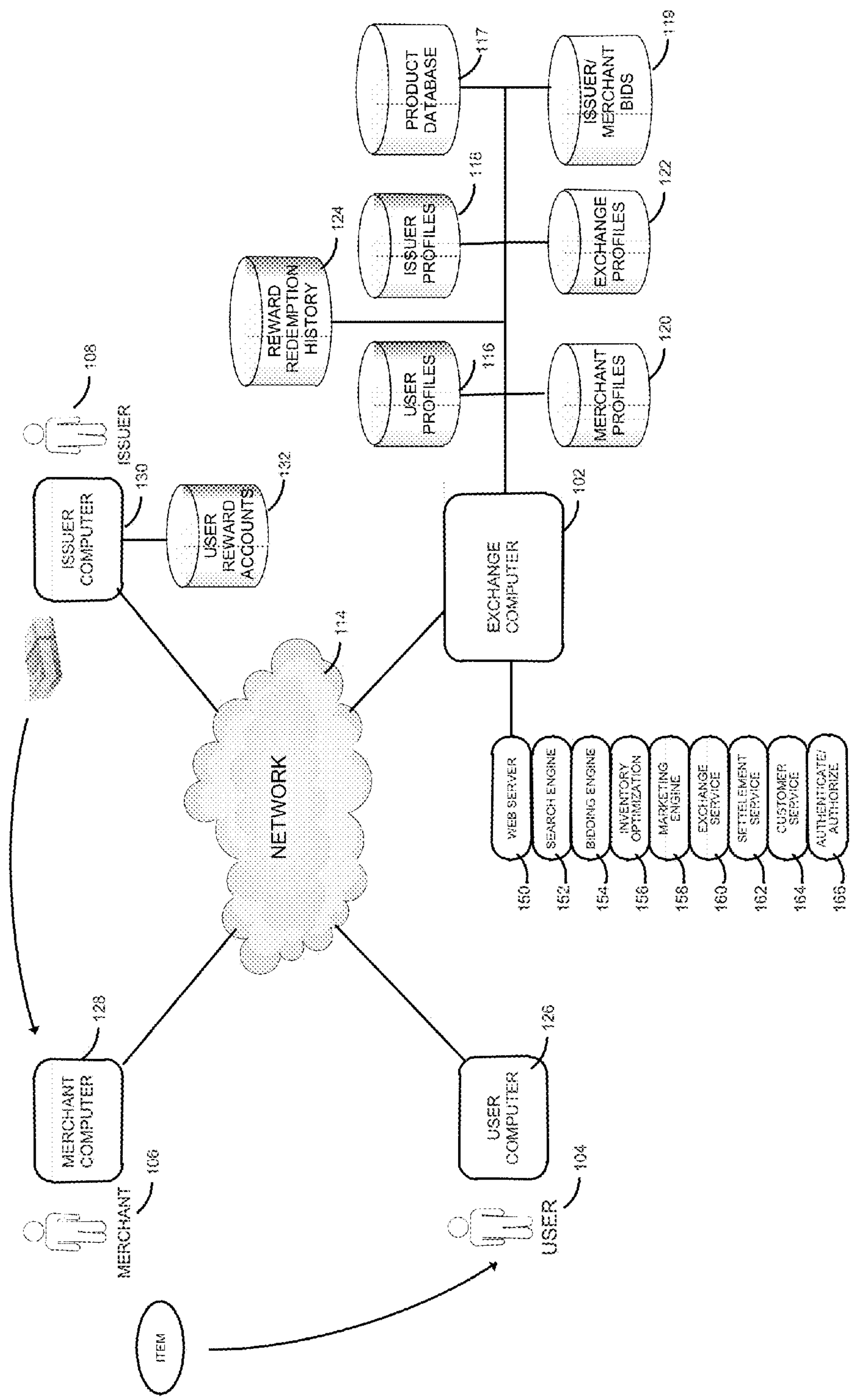
FIG. 1*b* is detailed diagram of the system of the present invention.

Also shown in FIG. 1*b*, and discussed further herein, is a user reward account database 132 that is associated with the issuer computer 130. As known in the art, users earn reward points through various transactions with the issuer 108, and those reward points are stored in a user reward point account in the database 132 for subsequent redemption. The present invention allows users to redeem their reward points in new ways heretofore unavailable.

Also shown in FIG. 1*b* are several databases that are associated with the exchange computer 102: a user profiles database 116, an issuer profiles database 118, a merchant profiles database 120, an exchange profiles database 122, a reward redemption history database 124, a product database 117, and an issuer/merchant bids database 119. These are also described in further detail below.

The exchange computer implements various programs and software modules in order to execute the functionalities as described herein. These programs include but are not limited to a web server 150, a search engine 152, a bidding engine 154, an inventory optimization engine 156, a marketing engine 158, an exchange service 160, a settlement service 162, a customer service 164, and authentication and authorization service 166, all of which are also shown in FIG. 1*b*. Theses programs/modules utilize the various databases described above in order to interoperate with the user computers, the issuer computers, and the merchant computers. The web server 150 will communicate with browser and other client programs executing on the user computers, the issuer computers, and the merchant computers in order for the users, issuers and merchants respectively to communicate with the exchange computer 102 as further described herein. Many of the web pages that are served by the web server 156 are illustrated in the remaining Figures and described throughout this specification. The web server 156 may be comprised of several web server programs as desired. The web server 156 therefore provides the graphical user interface (GUI) front end for the various parties that interoperate with the exchange computer 102. Other client/server software may be used instead of a web server in order for the various computers to interact if desired.

The search engine 152 is program code that enables searches of the various databases to be executed. In particular, the search engine 152 will utilize the product database 117 such that a user computer may request the display of certain products, such as all DSLR cameras, or those cameras that cost less than $500, or TVs that may be redeemed by reward points only, etc. The search engine will implement dynamic filters that are served to the user computer on search pages through the web server 156 as known in the art. The user may select search criteria on the search pages, return those to the search engine via the web server, and have the search engine return the desired results after searching the required databases.

The bidding engine 154 is a program that interoperates with the issuer/merchant bids database 119 in order to facilitate the bidding process between issuers and merchants as described further herein. The bidding engine 154 will facilitate the interaction and agreement of terms for discounts between issuers and merchants. Issuers and merchants can configure a series of auto accept or reject criteria to better manage pending bids. Bids whose state can't be determined with the criteria given by the issuer or merchant will be added to a pending queue and will be dealt with manually. Bids can be generated, countered, accepted or rejected within the engine. A complete history of all bids and their resulting audit trail will be kept. Accepted bids are fed into the inventory optimization engine.

Thus, a merchant may submit a bid to an issuer in which the merchant agrees to provide a specified discount for purchases by a user who proposes to utilize reward points of that issuer in the transaction. For example, a merchant may submit to the exchange computer a desired 20% discount bid applicable to reward points issued by CHASE. This bid is forwarded to CHASE, and if accepted by CHASE, then the merchant would only charge $80 for a $100 MSRP item, for example. As explained below, bids may be accepted, rejected, or negotiated until an agreement is reached by the issuer and merchant.

In addition, the bidding engine 154 manages a bidding process that is undertaken by a user in order to bid on products by offering a reduced number of reward points as tender for a desired product, as further described below.

The inventory optimization engine 156 shown in FIG. 1*b* facilitates the merchant's ability to control which products are available at a given discount. It allows a merchant to either directly control a given product's current discount or to setup an automated date driven discount schedule. In this way a merchant can schedule a progressive discount schedule to move product. The engine will determine the products in the exchange service that are available for reward point redemption. It does this by applying accepted bids to the merchant's products and finds those that match the accepted bids the merchant has with various issuers. This information feeds into the redemption solution the consumer can use for the merchant's products. A history of products, their discount schedule and changes will be retained in a audit trail. Also data from the engine will be fed into the marketing engine for use in analytics.

The inventory optimization engine is therefore a program that enables the exchange computer 102 to provide an age discount progression algorithm whereby inventory is tracked according to age and assigned a discount based upon the algorithm. When the algorithm matches one or more of the trading relationships established with issuers, that inventory is transferred into the rewards server and is available for redemption on the exchange thereby creating an inventory optimization engine that dynamically connects the merchants' promotional wallet to the issuer with the sale discount on his selected merchandise according to his rules based algorithm.

The marketing engine 158 is a program executed by the exchange computer that provides for various marketing functions such as promotion programs, product and customer analytics, etc. The marketing engine facilitates insight into consumers, their behavior, and product sales. It allows the issuer's and merchant's to visualize the performance of various offerings and promotions based on consumer demographics. The engine manages the communication with consumers. In this way, issuers and merchants can set up promotions that will be communicated to consumers matching various parameters. Additional analytics are generated around product/service performance. This enables issuers and merchants to hone in on the products that consumers want and the effectiveness of promotions. General system reporting for all parties will also be included in the engine.

The exchange service 160 facilitates the customers purchase of products and services with reward points and other consideration such as cash or credit. The merchants and products available may be determined by the inventory optimization engine. Products are arranged in various categories and hierarchies. These can be easily searched and navigated by the consumer. A wish list for consumers to store interesting products will be kept. When the consumer wishes to purchase a product, they will be presented with a redemption solution interface that will present a default redemption solution as well as enable to consumer to edit the solution using available issuer programs as determined by the inventory optimization engine. Once a successful solution is accepted by the consumer the product will be added to the consumer's shopping cart. The shopping cart is then fed into the settlement service upon consumer checkout. The exchange service keeps a history of customer behavior including which products were viewed, added to their wish list, abandoned in their cart and purchased. This history is fed into the marketing engine to provide additional analytics.

The settlement service 162 is a program executed by the exchange computer that facilitates the various exchange transactions between the merchant, the user, and the issuer as further described herein. The settlement service facilitates the completion of the checkout process. It performs the resulting transactions between the consumer and issuers, the consumer and merchants, and the merchants and issuers. It is responsible to generate the various API calls to debit or credit a consumer's account at various issuers and for sending product/service orders to merchants for fulfillment. In the event of any failures it is also responsible for the role back of any transactions already completed as part of the checkout process. The service also facilitates customer returns from either the merchant's or issuer's viewpoint. It reports financial information into the exchange's financial system for backend processing. It also keeps an entire audit trail of all resulting transactions, their status, state, and confirmation or denial.

The customer service module 164 will enable the users of the exchange to report any issues that result from its use. This includes consumers having questions about products and services, billing, order status, etc. In addition, it should be the point of contact for issuers and merchants to find assistance with issues. Consumer issues will be forward directly to issuers and/or merchants when appropriate. By doing this it will enable the issuer and/or merchant to provide an elevated level of service when such a level is desired. This is beneficial when an issuer is using the exchange as a captive portal for high value customers and wish to ensure those customers receive a premium customer service experience.

Figure 1C:
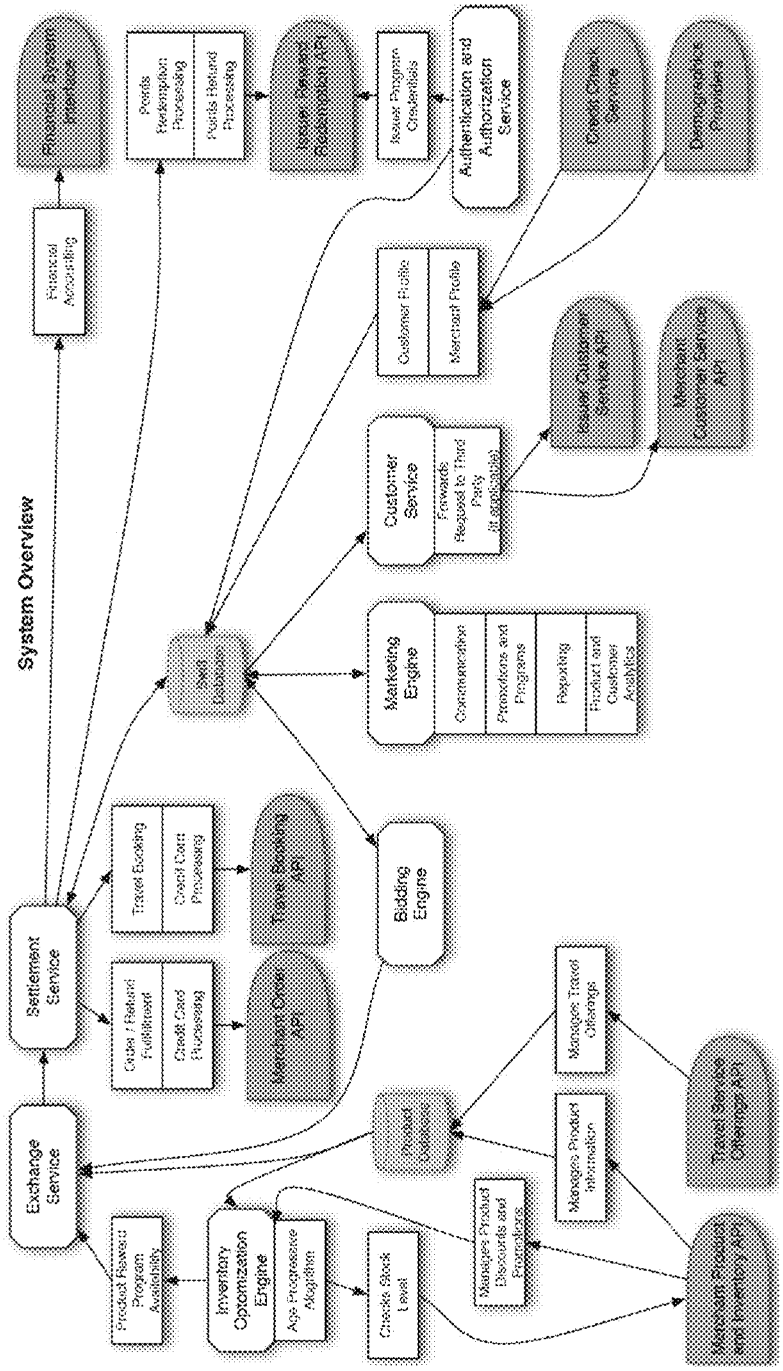
FIG. 1*c* is an alternative detailed diagram of the system of the present invention.

The authentication and authorization service 166 ensures that users of the exchange are valid and for which functions they are entitled. In the case of consumers it will communicate to issuer systems to validate credentials given for the issuer system. In addition it will handle single sign on when a consumer arrives from an issuer portal. Also it will allow for consumers to merge accounts and/or identify when consumers arriving to the exchange from different issuer portals are in fact the same individual. Finally it will allow merchant and issuers to administer the exchange accounts that have elevated privileges when acting on behalf of the merchant or issuer. FIG. 1*c* shows an alternative view of the exchange system shown in FIG. 1*b* and described further herein.

The exchange computer 102 provides each participant with an appropriate interface (e.g. via various web pages) that enables that participant to perform the desired functions as will now be described. FIG. 1 is a screen shot of a home page 134 of the reward exchange system in one embodiment, also known as the SWIFT REWARDS EXCHANGE. Any participant, after accessing the general URL (such as http://www.swiftrewardsexchange.com) of the exchange computer 102, will be provided with the home page 134 of FIG. 1 that is displayed on their particular computer. From there, the participant will select the icon desired (consumer/user button 136, merchant button 138, issuer button 140, manufacturer button 142, or partner button 144). The functionality provided to each type of participant by the exchange server will now be described in detail.

In one aspect, a user 104 registers via the user computer 126 over the computer network 114 with the exchange computer 102 via a web site. The user enters into the user computer 126 user information that includes reward account information for at least one reward program in which the user is previously enrolled. The reward program is operated by an issuer 108 via an issuer computer 130 and provides reward points to a reward account 132 of the user stored in association with the issuer computer 130 as a result of a transaction previously executed between the user and the issuer.

Figure 1D:
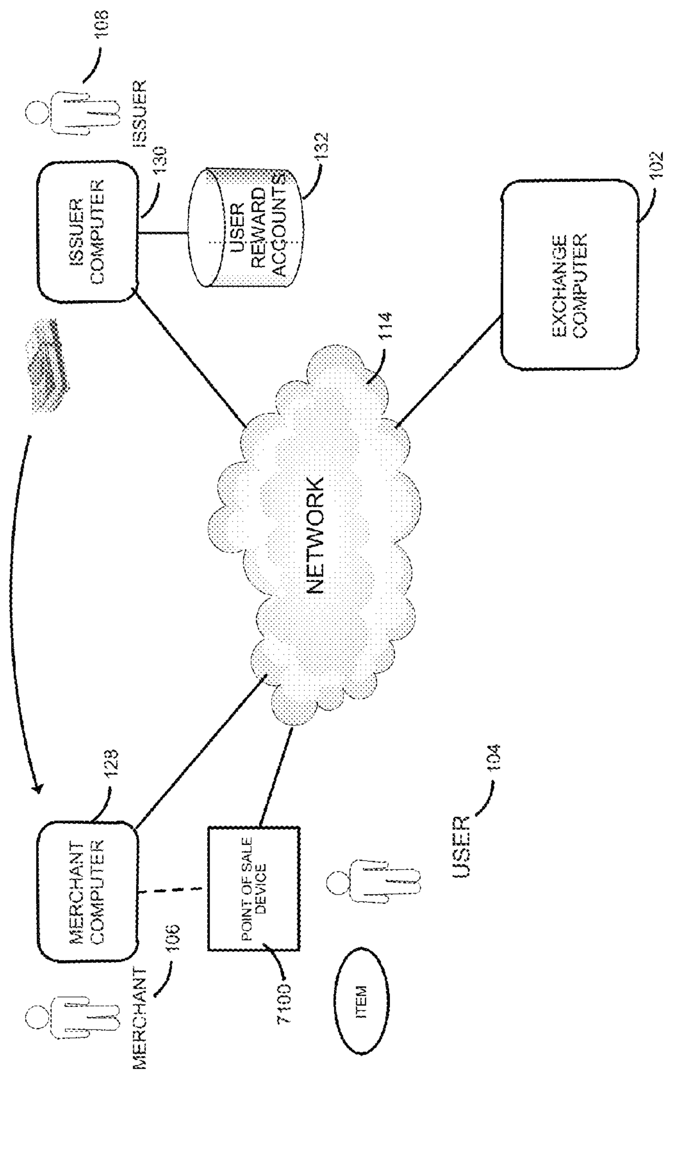
FIG. 1*d* is a system diagram of an alternative embodiment of the present invention utilizing a point of sale device.
Figure 1:
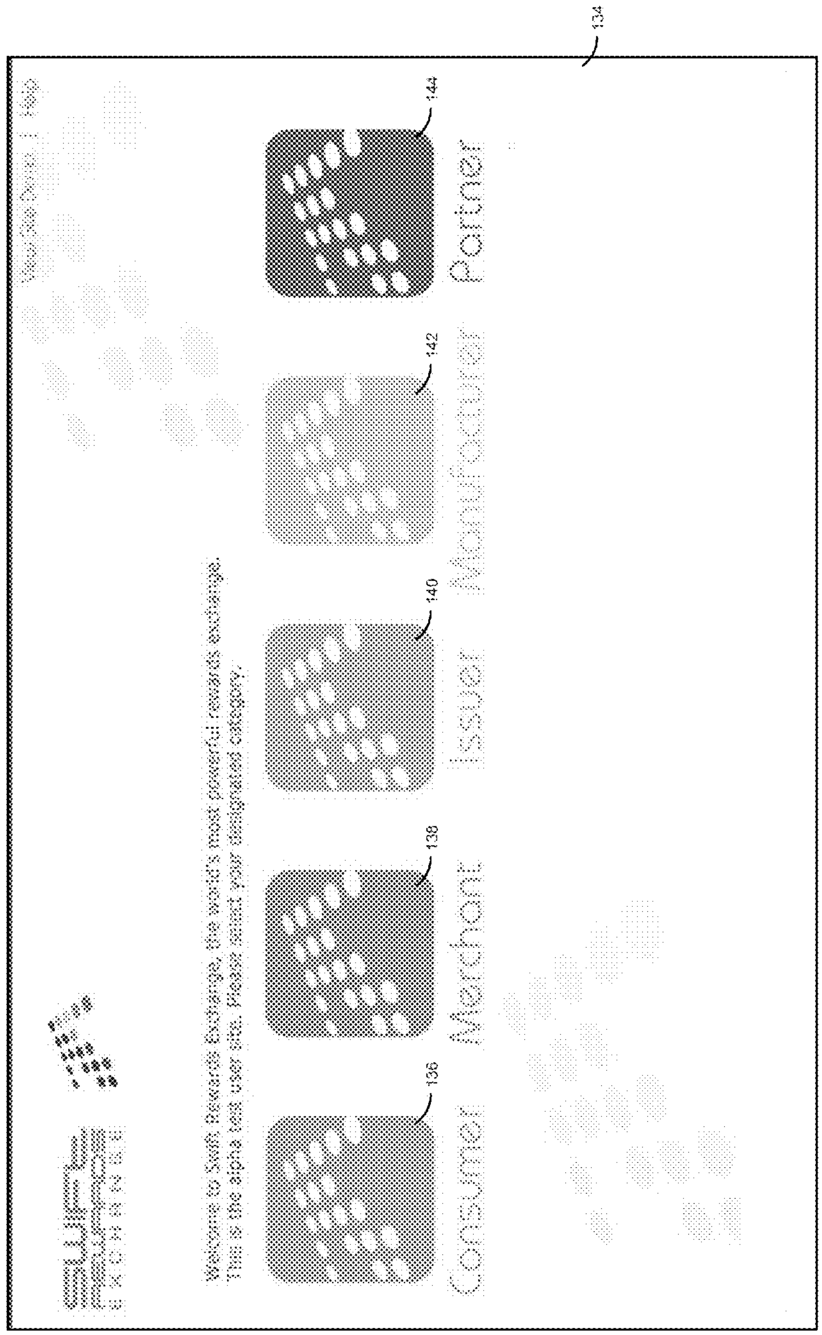
FIG. 1 is a screen shot of a home page of the reward exchange system in one alternative embodiment.
Figure 2:
FIG. 2 is a screen shot of a direct user login page in another alternative embodiment.

FIG. 2 is a screen shot of a user login web page 200 that is served from the exchange computer 102 to the user computer 126 accessed when selecting the consumer/user button 136 in FIG. 1. In an alternative, the user will be able to access the exchange computer 102 directly by entering the URL of this particular user login page 200.

In a preferred embodiment, the user may enter or be ported to the exchange computer 102 web site directly by selecting a button or other control from a reward issuer web site or from a merchant web site that is offering a desired product available via the exchange. So, for example, a user may be viewing a web catalog of a merchant such as BEST BUY, and view a DVD player of interest. If that merchant is also making that DVD player available via the exchange, then the merchant will also provide a link button with an image of the exchange and/or text such as "CLICK HERE TO BUY THIS PRODUCT VIA THE REWARDS EXCHANGE". In the case of a rewards issuer web page, the text may read "GET MORE FOR YOUR POINTS", "REDEEM FASTER", TURBOCHARGE YOUR REWARDS", etc. By clicking through this link, the user will be linked directly to the exchange computer 102 web site, automatically logged in, and a page that displays the desired product (along with reward point redemption options) is provided. If the user is not yet a member of the exchange he would be automatically registered with the exchange based upon the data contained within the existing entry site's database (reward issuer or merchant, as the case may be) or by some other means well known in the art and be directed to the exchange site's user home page or category page depending on the level of connectivity with the originating site; the exchange web page may be modified to reflect the attributes of the originating web page/site or be white labeled/custom banded to reflect the issuer or merchant. When entry is from a participating issuer, that issuer will be designated as the "primary market maker" of that transaction and may direct certain rules of redemption to apply. This direct link embodiment is further described below.

Figure 3:
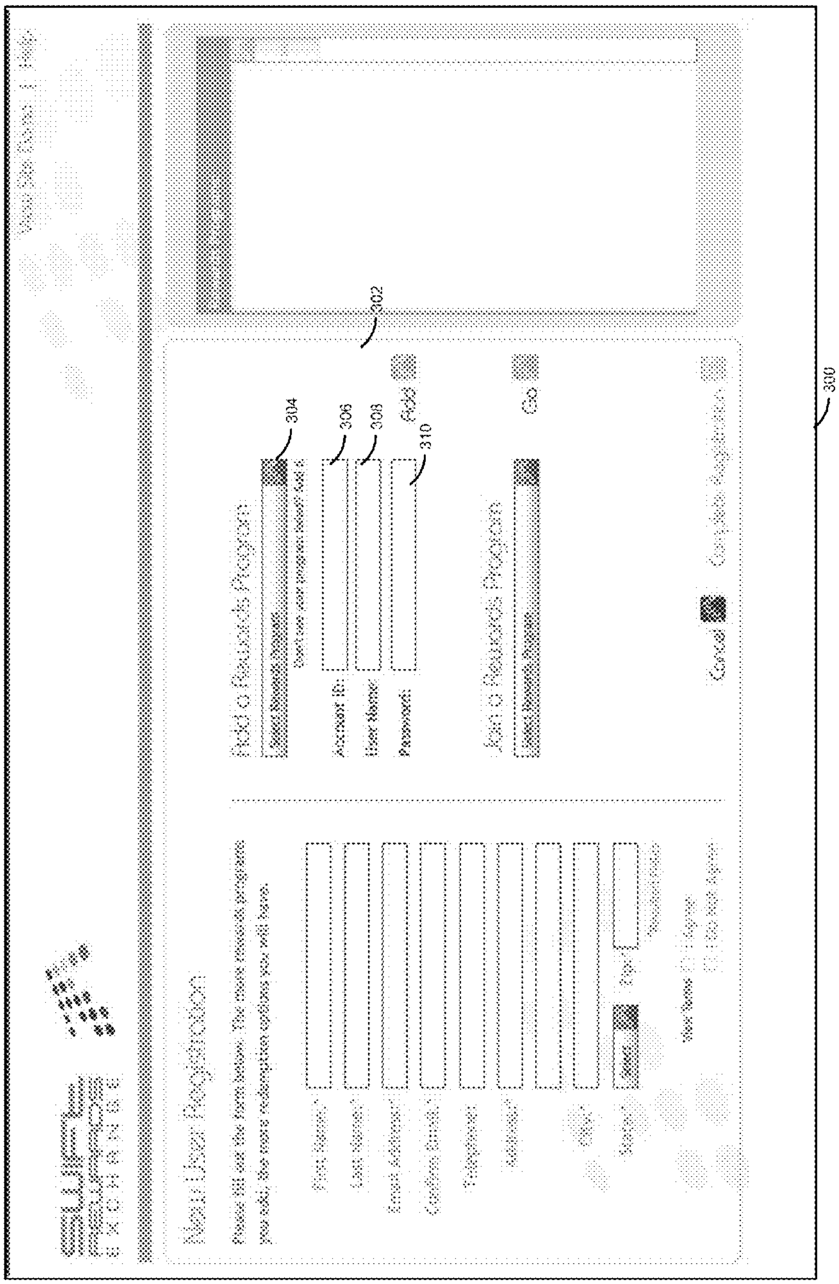
FIG. 3 is a screen shot of a new user registration page in which users may also add reward programs to their profile.
Figure 4:
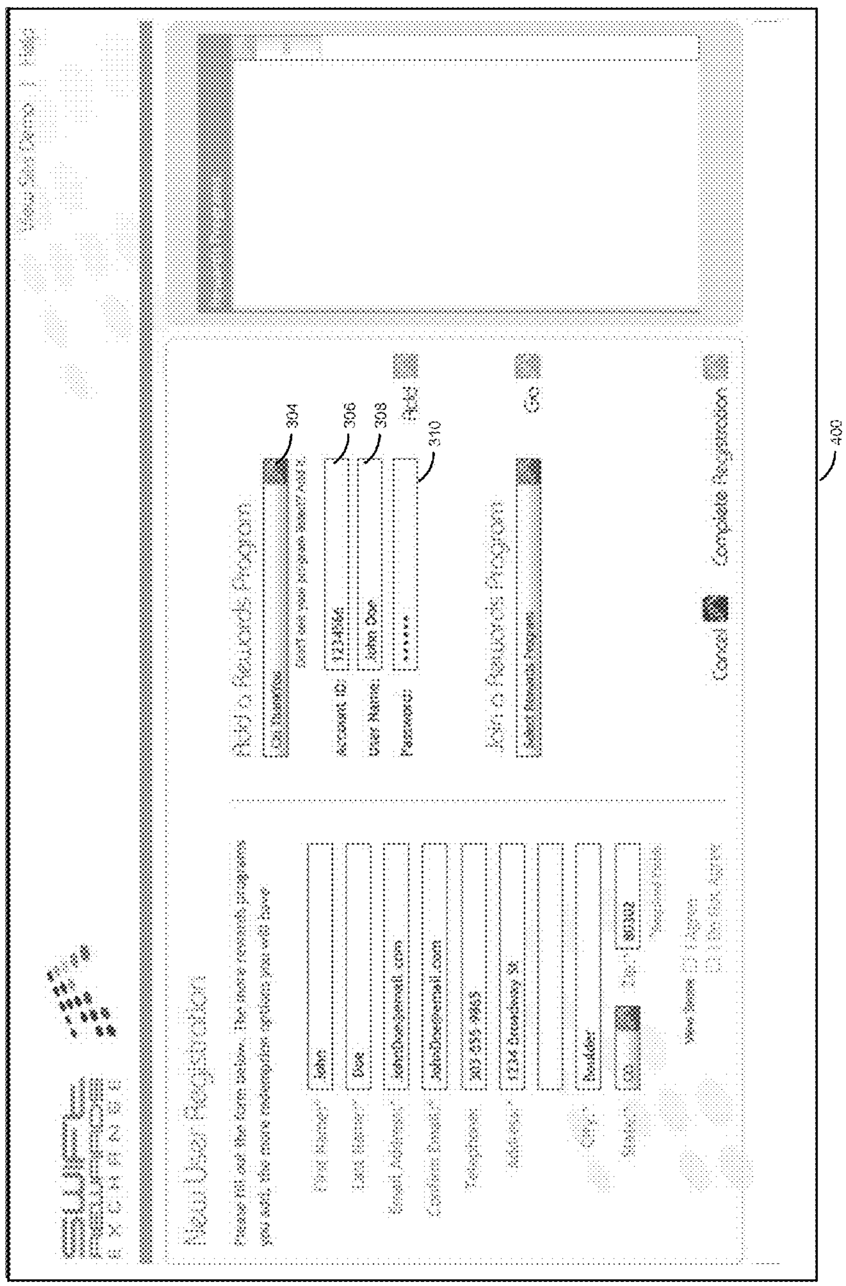
FIG. 4 is a screen shot of the page of FIG. 3 in which a reward program is being added to the profile.
Figure 5:
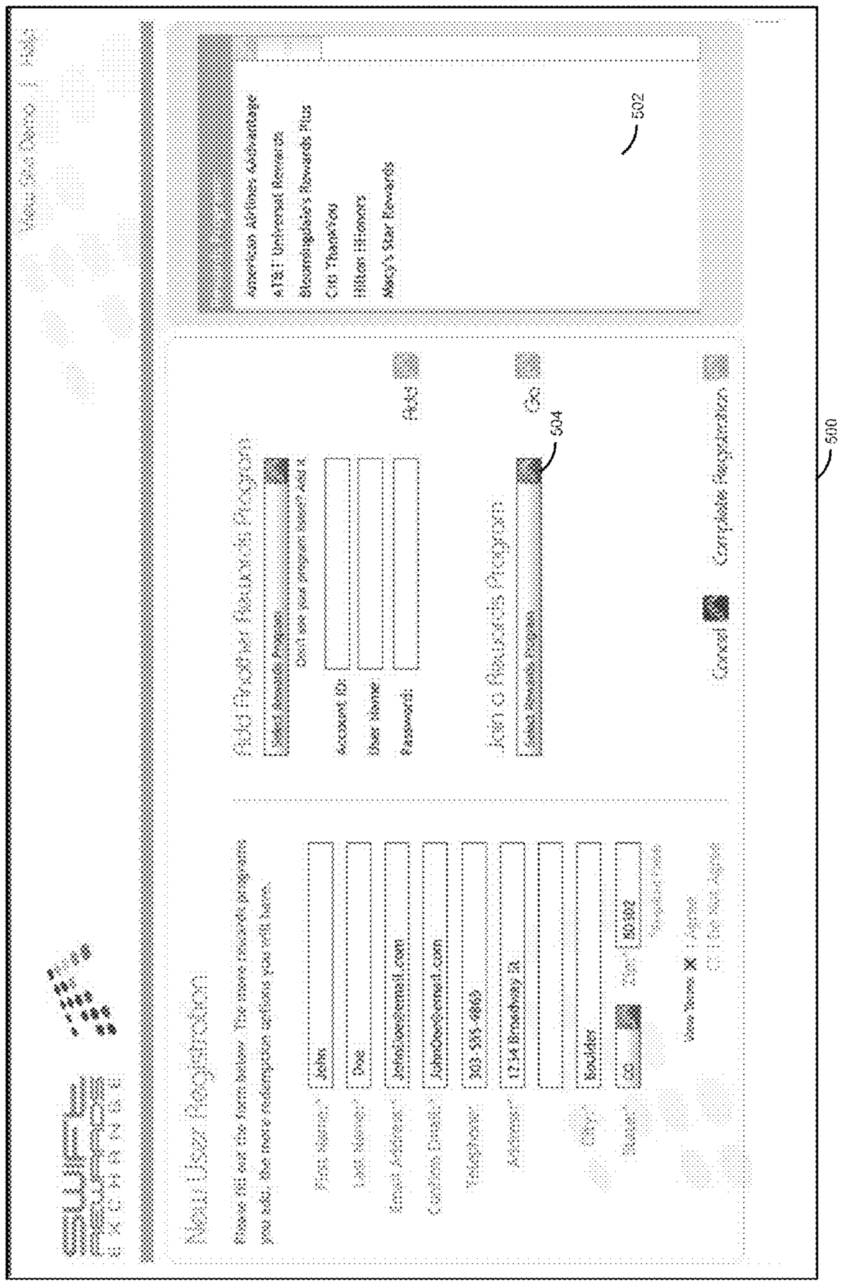
FIG. 5 is a screen shot of the page of FIG. 3 in which several reward programs have been added to the profile.
Figure 6:
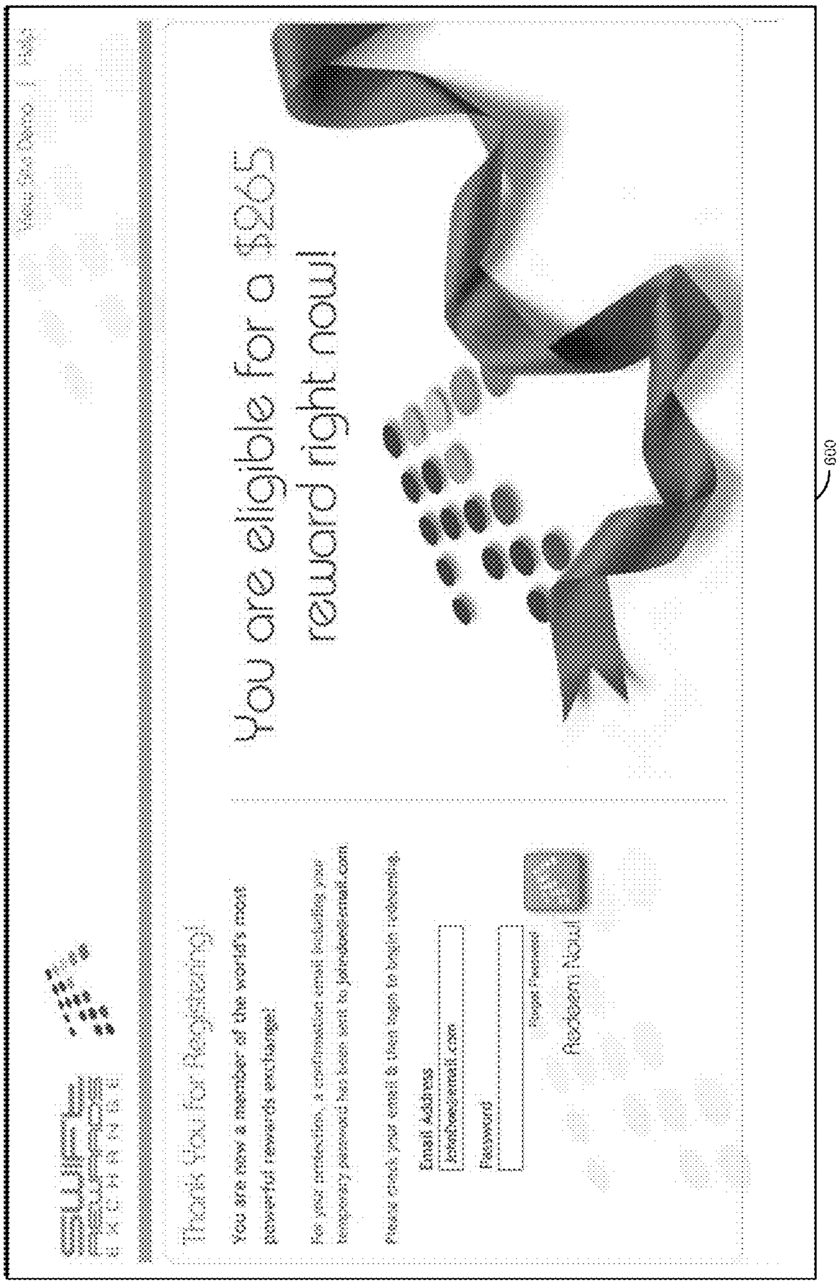
FIG. 6 is a screen shot of an instant reward offer.

Referring back to the user login page 200 of FIG. 2 that is displayed on the user computer 126, the user may login to the system as known in the art (name and password). If the user is a new user, he may register via the new user registration page 300 of FIG. 3. In FIG. 3, new users add their name and other contact information. Users may also add reward programs to their profile by selecting the Add a Rewards Program section 302, and then entering the required information including the name of the rewards program (from the drop down list 304), their account identification number in text box 306, their user name in text box 308, and their password in text box 310. FIG. 4 is a screen shot of a web page 400 in which a reward program is being added to the profile by selecting the program name (CITI THANKYOU), entering the account ID, user name and password. FIG. 5 is a screen shot of a web page 500 in which several reward programs have been added to the user's profile as shown in the column 502 at the right side. In addition to entering reward programs in which the user is already a member, the user may be given the option to join a rewards program by selecting it from the Join a Rewards Program drop down list 504. FIG. 6 is a screen shot of a web page 600 for an instant reward offer that is shown to the user after he has completed or updated his profile information as described above. The user may also login at this point where indicated.

All of the reward program and other user information that is entered by the user is stored in a user profile database 116 as shown in FIG. **1*b* in association with the exchange computer 102 for future use by the exchange computer 102** as described herein.

Once the user has entered all of his reward program information, the exchange computer 102 will communicate with each of the issuer computers 130 with which the user is enrolled with a reward account. The exchange computer receives reward account information 132 from each of the issuer computers 130 for the user 104. For example, the exchange computer 102 will request reward information from reward program 1 operated by issuer 1, from reward program 2 operated by issuer 2, from reward program 3 operated by issuer 3, etc., all of which have been entered by the user since the user is enrolled with each of those issuers. The exchange computer 102 then calculates a promotional wallet for the user, which comprises a total redeemable value for all of the user's reward accounts stored in the plurality of issuer computers. Thus, if the user has 3,000 reward points in reward program 1 that have a redeemable value of $30, and 5,000 reward points in reward program 2 that have a redeemable value of $50, and 10,500 reward points in reward program 3 that have a redeemable value of $105, then the total redeemable value in the user's promotional wallet is $185. The exchange computer then displays to the user via the user computer the user's promotional wallet, for example with a display that states "THE TOTAL REDEEMABLE VALUE OF YOUR PROMOTIONAL WALLET FOR ALL OF YOUR REWARD PROGRAMS IN THE AGGREGATE IS $185."

The user's promotional wallet may be revised from time to time in order to show changes in the value. For example, if a user earns more reward points with an issuer, or if a user redeems reward points either through the exchange or directly with an issuer, then the number of reward points available for redemption will change and of course the value of the promotional wallet will change accordingly. Similarly, if a user adds a new reward program to his user profile, the value of the reward points in that newly added account will be added to the promotional wallet. The promotional wallet may be recalculated periodically or when any of these events may occur, as desired.

In the example given above, it has been assumed that the reward points have a redeemable value of one cent per point. However, the redeemable value may be different based on a value set by the issuer. In an alternative embodiment, the redeemable value of the reward points from an issuer may be different for redemptions with different merchants, based on a trading agreement between an issuer and a merchant, as discussed below. For example, issuer 1 may assign a value of one cent per point for transactions with merchant 1, but it may assign a value of 0.9 cents per point for transactions with merchant 2, etc. Conversion or exchange rates used to calculate the various values may be stored by the exchange computer, the merchant computer, and/or the issuer computer.

The user may of course always modify his user profile to provide any other reward programs information as desired. For example, the user may subsequently register with a new reward program, which may be added to the user profile so he can access that reward program via the exchange system. In addition, the system may be configured to periodically check its user list against issuers in its issuer profile database 118 to see if any of the users may be already enrolled in one of its issuer's reward programs but not entered by the user in his profile. For example, if a user neglects to enter his CHASE VISA reward program into the system, and CHASE VISA is a registered issuer, then the system can check with CHASE VISA to see if that user has a reward program there. If so, the exchange system may invite the user to enroll that program with the system, or it may be adapted to do so automatically via the CHASE VISA reward server if desired.

Figure 7:
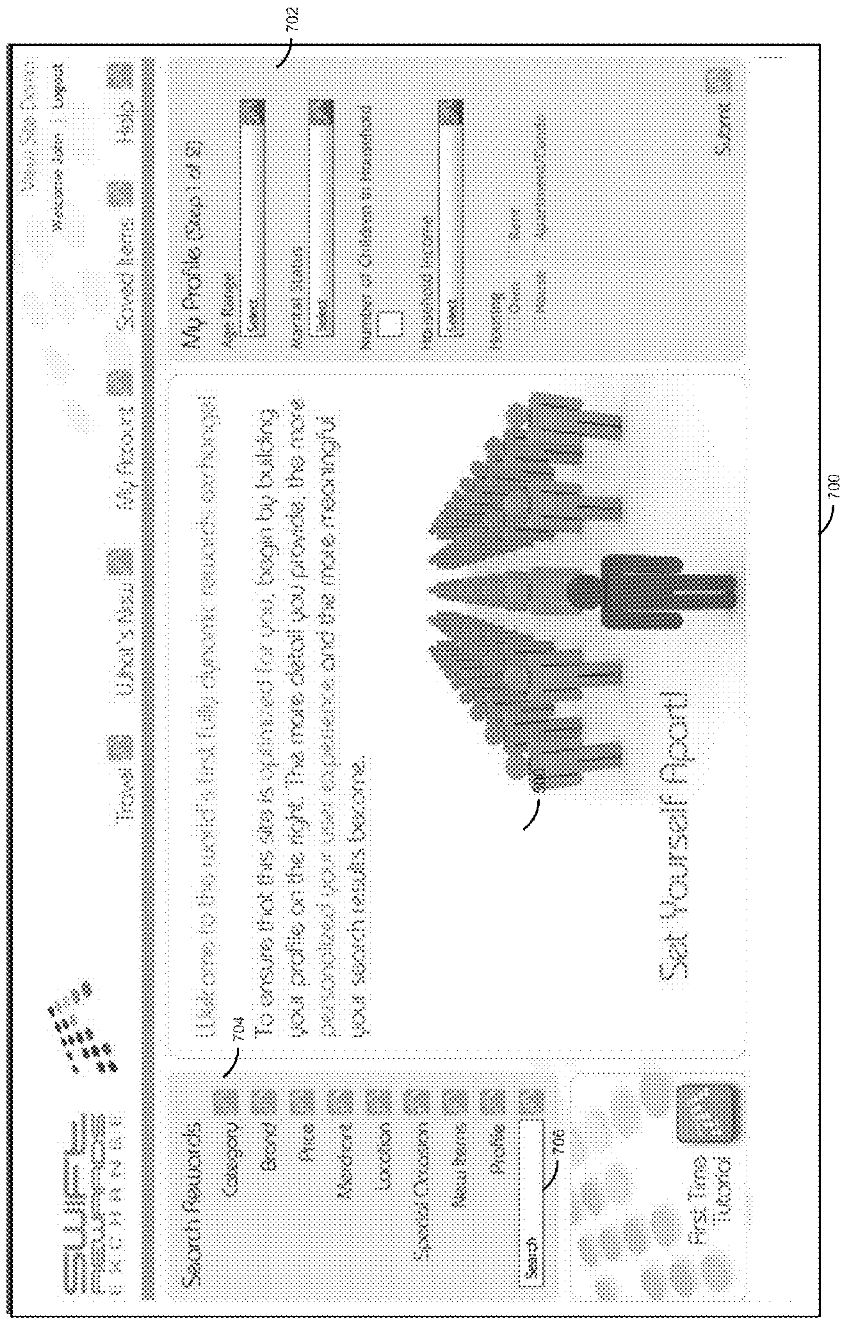
FIG. 7 is a screen shot of the user's home page.
Figure 8:
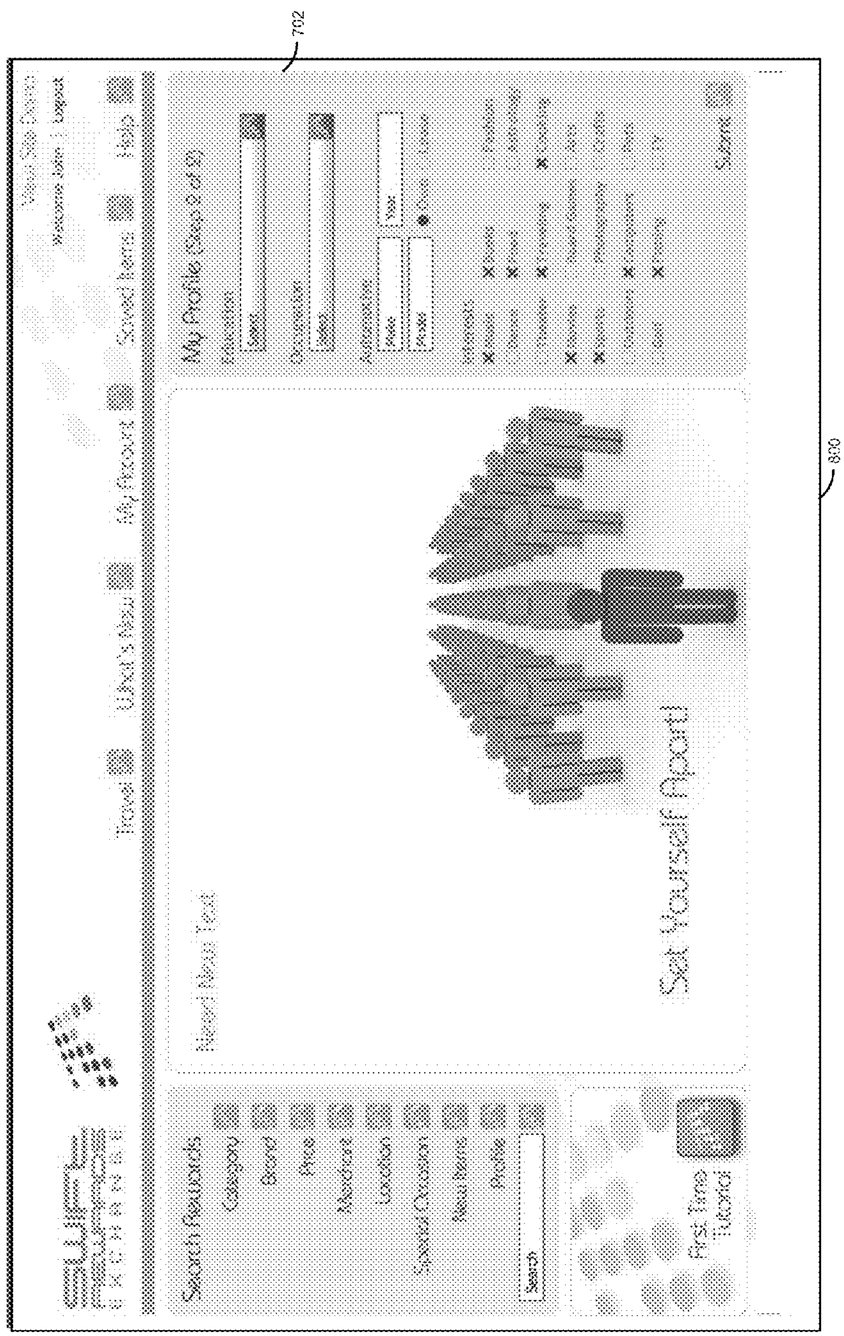
FIG. 8 is a screen shot of the user's home page with a user profile entry section.

FIG. 7 is a screen shot of the user's home page 700 that is accessed after logging in. There, the user can enter additional user profile information in the My Profile section 702 on the right side, as shown in web page 800 of FIG. 8.

In a preferred embodiment, independent web sites of merchants and manufacturers that engage in the reward activity will use the exchange system logo as a button link with a tag line such as "REDEEM FASTER". When the user selects this link, he is linked to the exchange web site and automatically logged in (if he is already a member) or invited to register or optionally automatically registered (if he is not a member). In this case, the user will not see the web page 134 of FIG. 1, but may be linked directly to the web page 900 of FIG. 9 for example to begin his search or directly to a product information page 2100 such as in FIG. 21 if he has already selected a product from the merchant's independent web site that linked him to the exchange computer 102. This allows users to utilize a more natural shopping behavior.

Referring back to FIG. 7, the user's home page 700 enables the user to perform various searches for desired goods or services. The Search Rewards menu 704 at the left side provides the ability to begin a search based on category, brand, price, merchant, location, special occasion, new items, or profile. A free-form search text entry box 706 is also provided.

Figure 9:
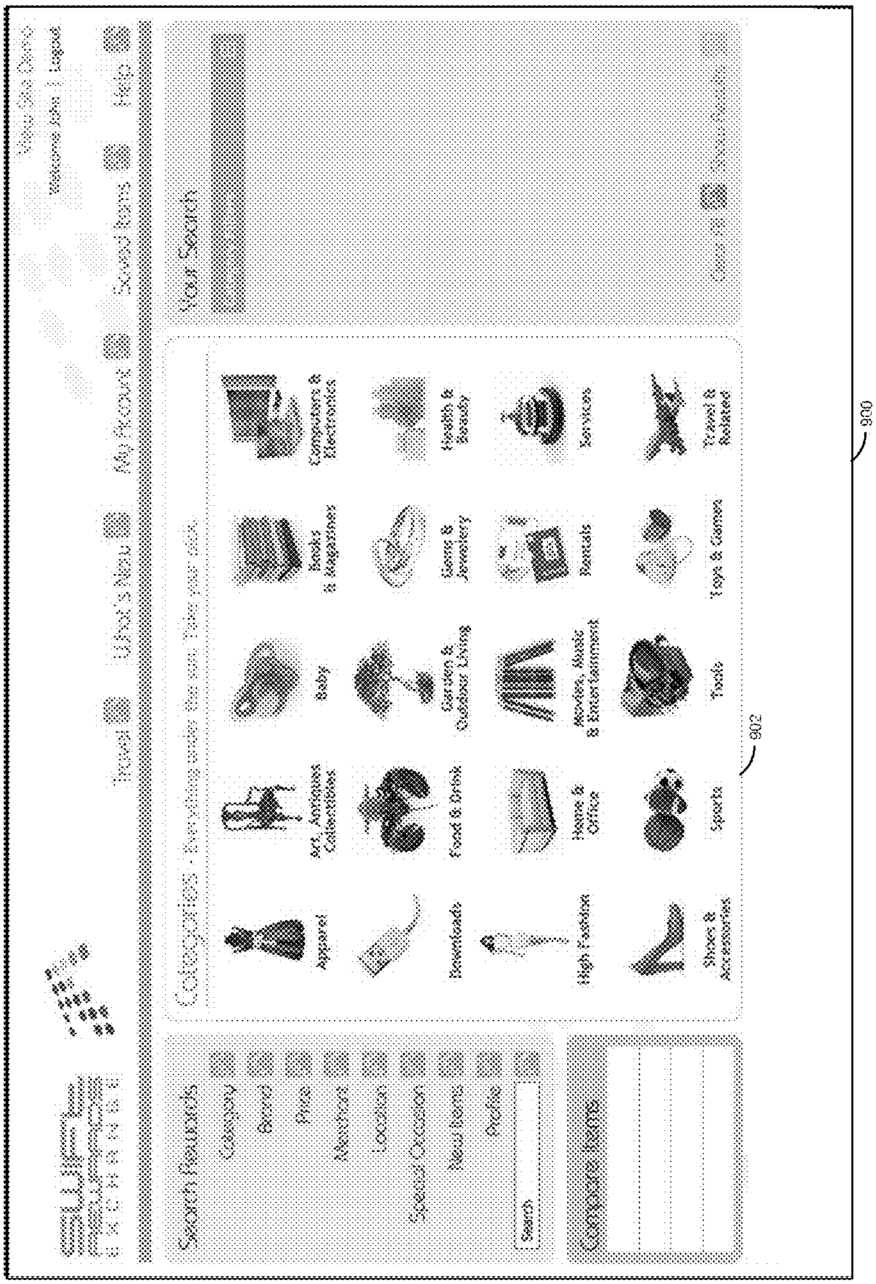
FIG. 9 is a screen shot of a user redemption item search page with category selections.
Figure 10:
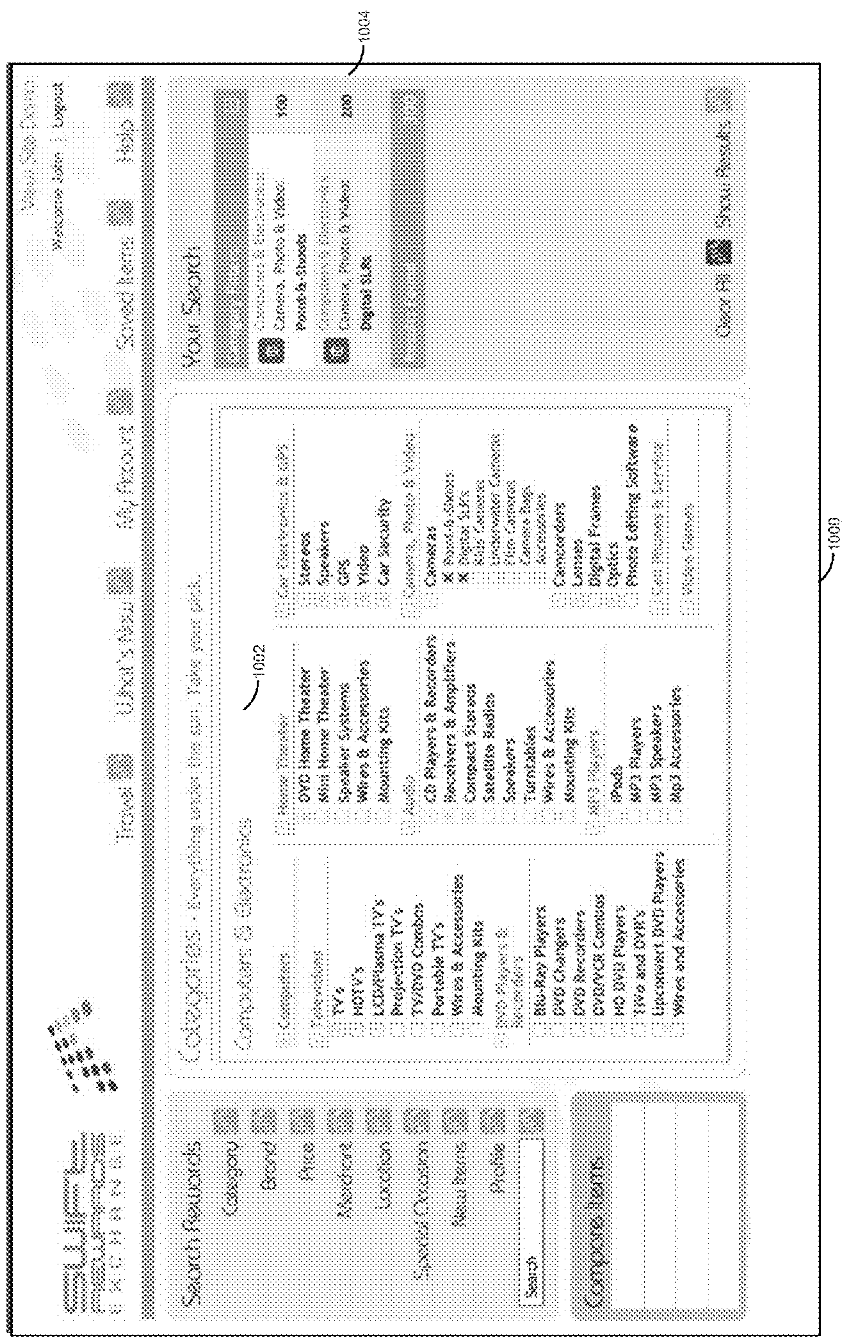
FIG. 10 is a screen shot of a user redemption item search page based on a category with a detailed sub-category listing.

FIG. 9 is a screen shot of a user redemption item search page 900 with category selections 902. There, various major categories are presented in text and icon view. If the user for example selects Computers and Electronics, then the web page 1000 of FIG. 10 is presented on the user computer with numerous drill-down sub-categories 1002 of more detail. In FIG. 10, the user has selected cameras:point-and-shoot and cameras:digital-SLRs. These selections then are presented in the search results box 1004 on the right side, along with the number of results for each sub-category after the exchange computer has searched product database 117 as shown in FIG. 1*b*.

Figure 11:
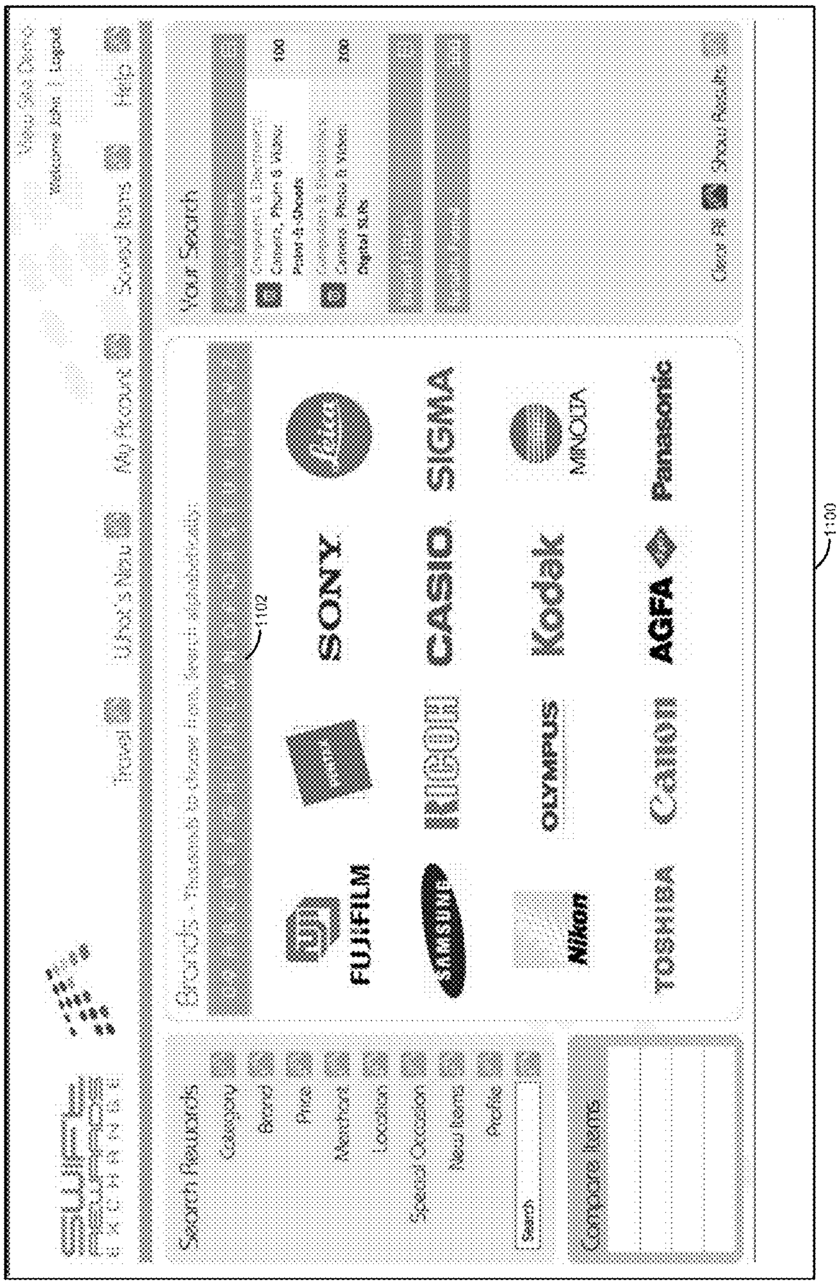
FIG. 11 is a screen shot of a page the enables searching for items by featured brand name.
Figure 12:
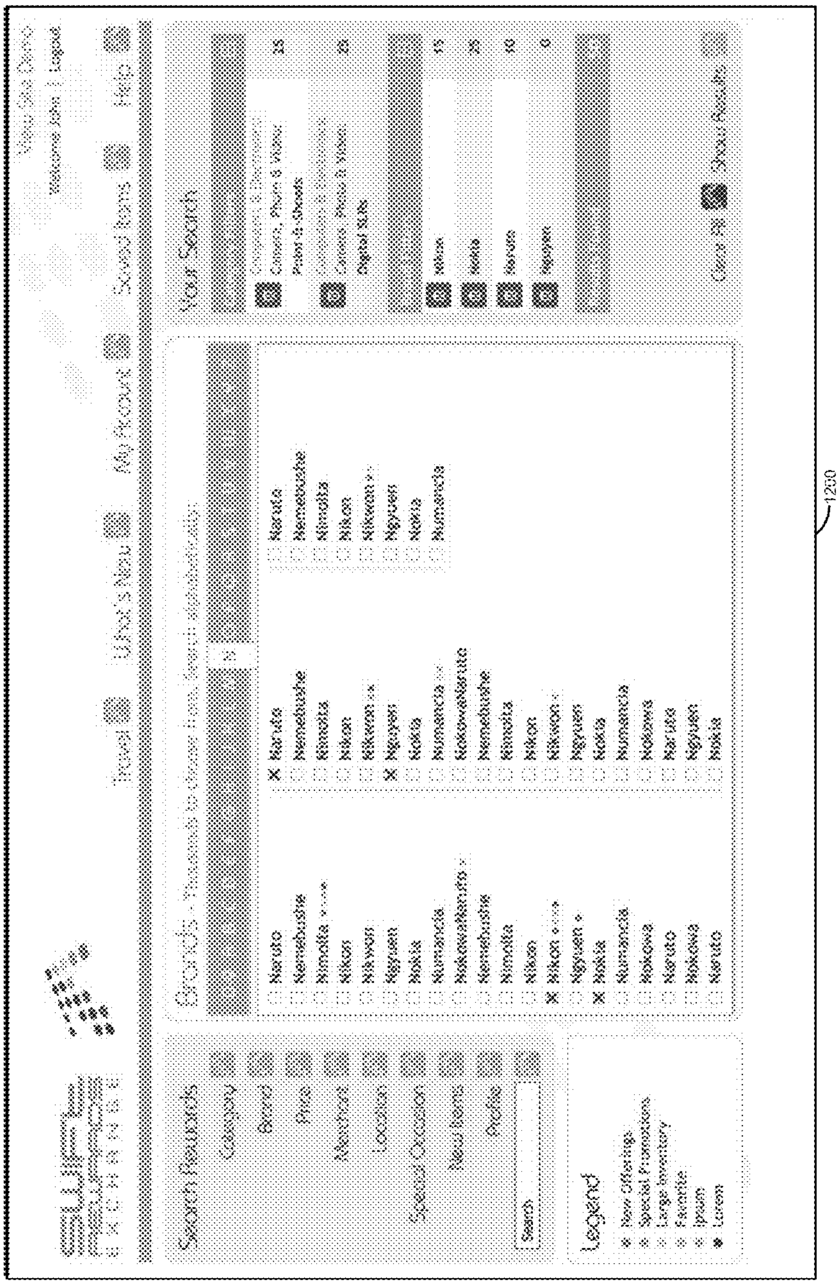
FIG. 12 is a screen shot of a page that enables searching for items by a detailed brand name selection.

FIG. 11 is a screen shot of a web page 1100 the enables searching for items by featured brand name such as SONY or KODAK. Since the user has selected two "cameras" categories, the system provides featured brand names of only those companies that can provide cameras. In addition, the user may select from numerous other brands by selecting the alphabetical bar 1102 as shown. FIG. 12 is a screen shot of a web page 1200 that enables searching for items by a detailed brand name selection, wherein "N" has been selected and the brands available in that grouping are presented. In the web page 1200 of FIG. 12, several "N" brands have been selected. The search results on the right side are now narrowed as shown. That is, the results have provided 50 hits that can be viewed by the sub-category previously selected as well as by brand name as shown.

Figure 13:
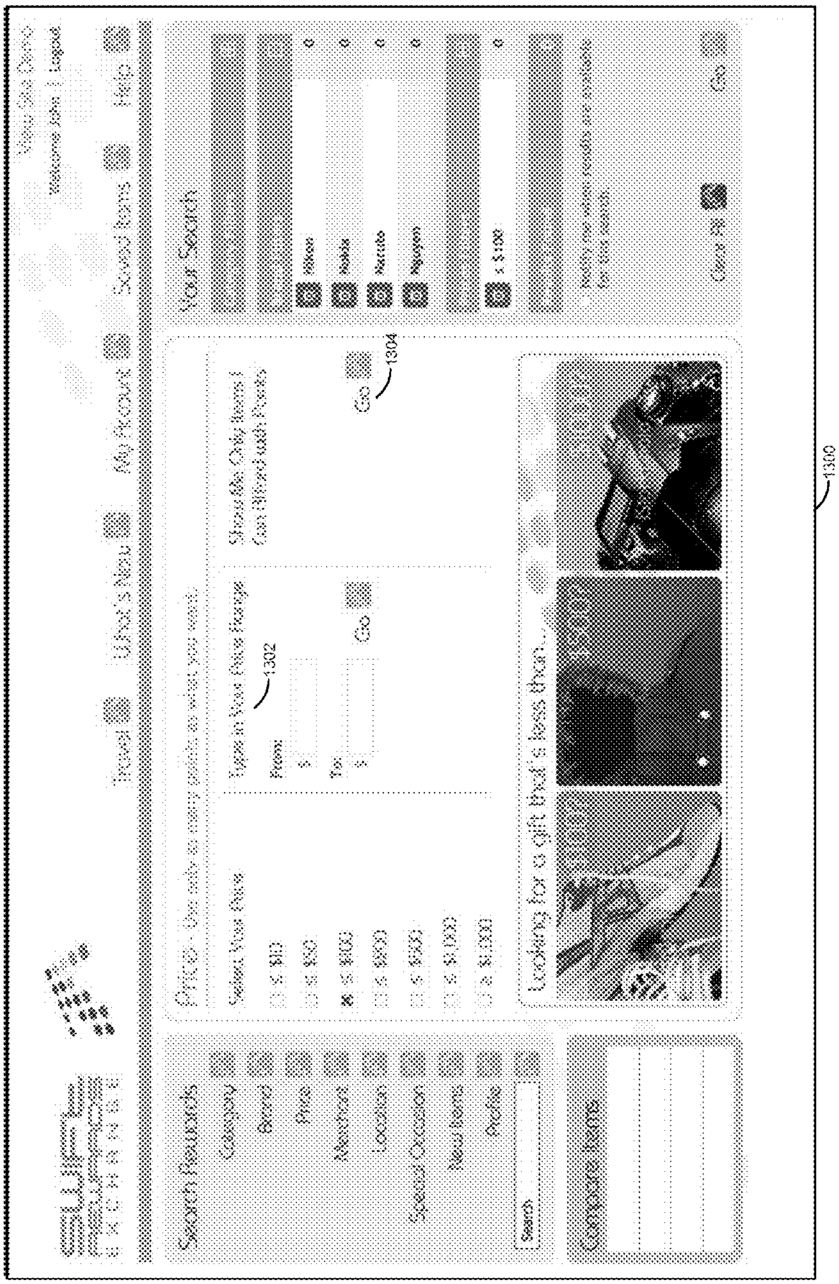
FIG. 13 is a screen shot of a page that enables searching by item price.

FIG. 13 is a screen shot of a web page 1300 that enables searching by item price. Here, the user has selected less than one hundred dollars, but no hits are returned for any of the previously selected brands and sub-categories. The user could if desired enter a price range into section 1302, or he could also force the search engine to show only those results that can be obtained with points with selection 1304. If this is selected, then the search engine 162 operating on the exchange computer 102 must first calculate the monetary value of the user's reward points in all accounts referenced by user profile 116 (the promotional wallet) and then use that value as a search criteria into the product database 117.

Figure 14:
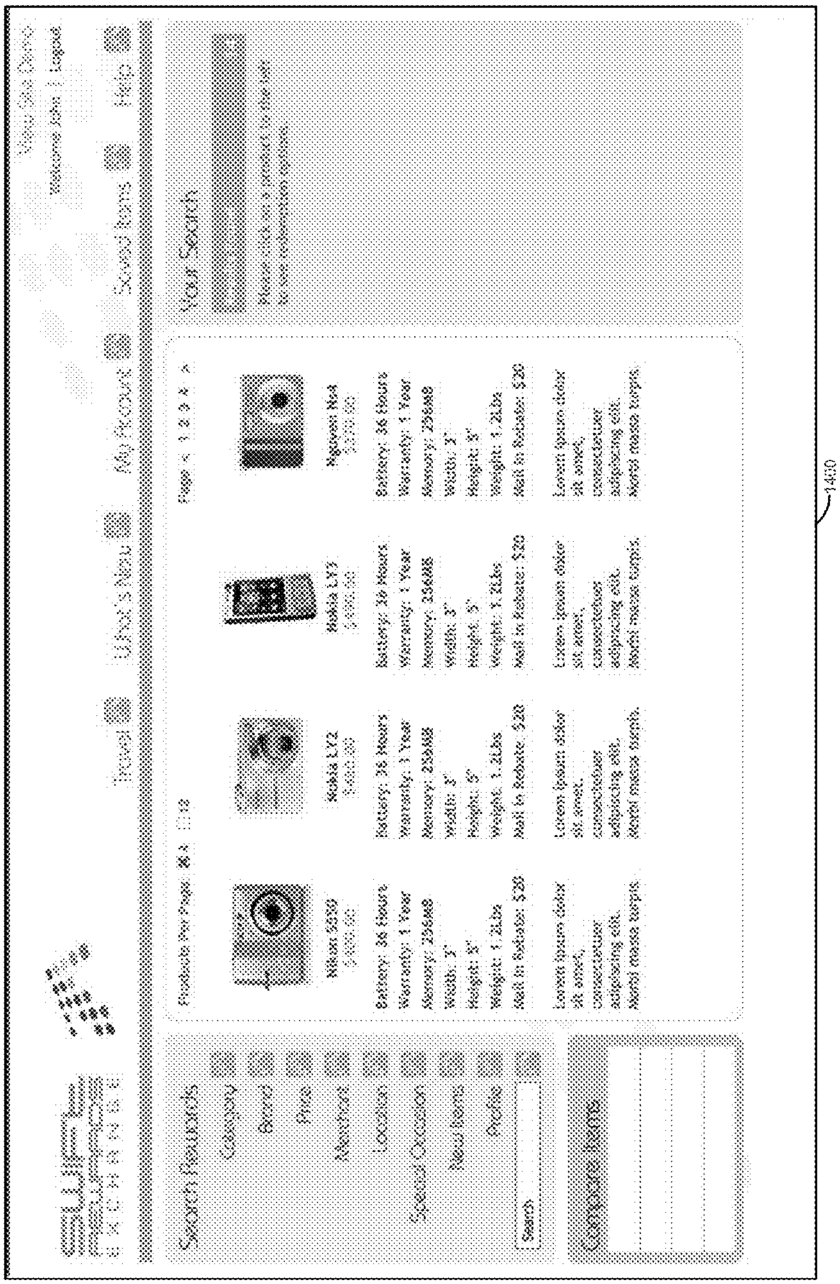
FIG. 14 is a screen shot of a web page that has several available items for redemption.
Figure 15:
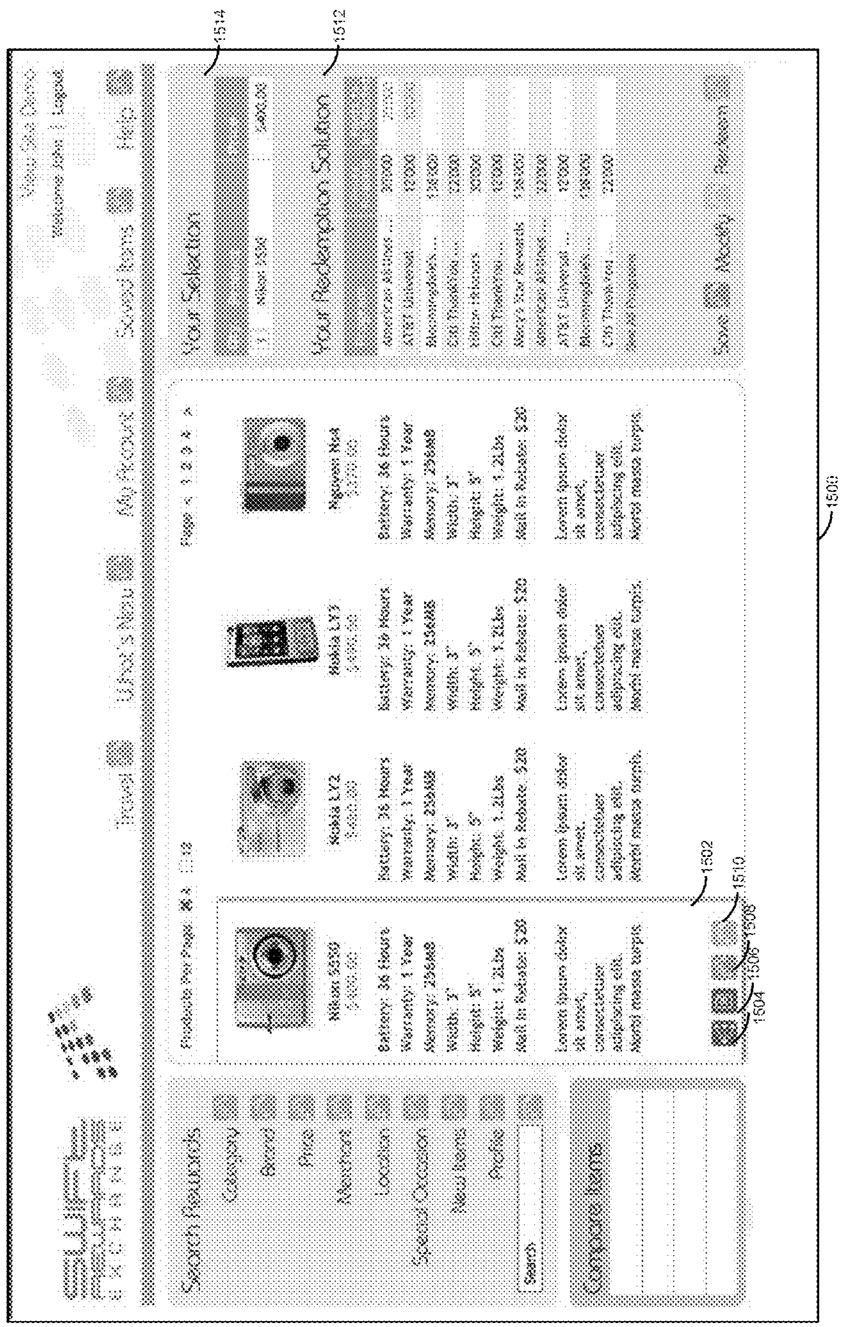
FIG. 15 is a screen shot of a web page with an item selected by a mouse rollover.

FIG. 14 is a screen shot of a web page 1400 that has several available items for redemption based on previously entered search criteria. The user may select to see only four products per page or 12 products per page. As can be seen, there are 14 total products in the product database 117 that met the user's search criteria. FIG. 15 is a screen shot of a web page 1500 with an item 1502 selected by a mouse rollover or the like. Once the user selects an item 102 by rollover, several options appear at the bottom of the item description. The first button 1504 is to select that item for a comparison, the second button 1506 is to fetch more detailed information about that item, the third button 1508 is to select that item for purchase, and the fourth button 1510 is to save that item for future viewing.

As the user is browsing through the various web pages that provide product information, the exchange computer tracks this activity as points of interest. That is, even though a user may not select a particular product to purchase as he browses, a product he is viewing is considered to be a point of interest since the user has shown some interest in that product (or brand, category, or price). The exchange computer tracks these points of interest for the user and analyzes the points of interest over time (which may be only a given browsing session, or over several browsing sessions, etc.). The exchange computer may also dynamically display to the user computer a quantity of products available for redemption that correspond to each of the points of interest selected by the user.

For example, a user may be browsing a category of cameras and select a point and shoot camera to review as well as a digital SLR camera to review. The exchange computer stores and analyzes these points of interest and ascertains that the user may be interested in a third type of camera, and then presents the user with an option to review this new product page if desired.

The exchange computer may provide a proposed redemption solution to the user computer, which designates at least one reward program previously registered in the exchange computer by the user and a quantity of reward points to be redeemed for the purchase of the item by the user. This is displayed in Redemption Solution window 1512 on the right side, which appears once the item 1502 is selected by the user. The user may then either accept the proposed redemption solution, or modify the proposed redemption solution as desired.

The exchange computer 102 will use the cost of the selected item 1502 ($400) and analyze the user's available reward points in reward accounts with which the merchant has an exchange agreement in place (to be described later). The exchange computer will then make a suggestion, which may be modified by the user, as to the points that may be redeemed to pay for the selected item 1502. For example, in this case as shown in section 1512, the exchange server has determined that this user may be able to use 20,000 of his American Airlines points and 10,000 of his AT&T points to pay for the selected item 1502.

The exchange computer determines the proposed redemption solution by any or all of: (1) referencing a user profile stored in an associated user profile database that indicates user preferences as to which of a plurality of reward programs is desired to be used for reward redemption, (2) analyzing prior reward redemptions by the user stored in an associated reward redemption database to ascertain a preferred reward program, (3) ascertaining by reference to a merchant profile database a preferred redemption partner of the merchant from which the user is making the product purchase, (4) referencing an exchange rules profile stored in an exchange rules profile database that indicates exchange preferences as to which of a plurality of reward programs is desired to be used for reward redemption, and/or (5) referencing an issuer rules profile stored in an issuer rules profile database that indicates issuer preferences as to which of a plurality of reward programs is desired to be used for reward redemption.

In the scenario where the exchange computer references a user profile (stored in profile database 116), the user profile contains user preferences that specify which of the reward programs the user wants to use for redemption. For example, a user may specify in his profile to first use the reward points from his CITIBANK reward account, and then use reward points from his AMERICAN EXPRESS reward account when the CITIBANK points are exhausted. In this case CITIBANK is considered to be the primary issuer and AMERICAN EXPRESS is considered to be a secondary issuer. In addition to specifying a preference to redeem the reward points of a primary issuer before redeeming reward points of issuers other than the primary issuer, other scenarios may exist. For example, a preference may be specified by the user in his profile to redeem the reward points of a primary issuer after (rather than before) redeeming reward points of issuers other than the primary issuer.

Similarly, the user may specify a preference to redeem the reward points of a primary issuer up to a specified amount or up to a certain percentage, after which the points of issuers other than the primary issuer will be redeemed. For example, he may specify to redeem points from CITIBANK up to the first $50 of the cost of the item, and then redeem points from other issuers to make up the difference. Further, the user may specify a preference to redeem the reward points of a issuers other than a primary issuer up to a specified amount or up to a certain percentage, after which the points of the primary issuer will be redeemed.

In the alternative to referencing a user profile to determine a proposed redemption solution, the exchange computer may analyze prior reward redemptions by the user stored in an associated reward redemption database 124 in order to ascertain a preferred reward program of the user. So, if the user has not specified in his profile that CITIBANK is his primary or preferred issuer, the exchange computer may be able to ascertain that the user has redeemed CITIBANK reward points in his prior redemptions and then suggest the use of CITIBANK reward points for subsequent redemptions.

In a further alternative, the exchange computer may refer to a merchant profile database 120 in order to ascertain a preferred redemption partner of the merchant from which the user is making the product purchase. So, for example, if the user is requesting a purchase of a TV from BESTBUY, the BESTBUY merchant profile may indicate that CHASE is a preferred redemption partner of BESTBUY. The exchange computer determines this and then checks if the user has registered a reward program with CHASE in his profile. If CHASE has been registered with that user, then the exchange computer will propose a redemption solution that would utilize the user's reward points from his CHASE reward account since CHASE is the preferred redemption partner of BESTBUY.

In a further alternative, the exchange computer may refer to an exchange rules profile stored in an exchange rules profile database 122 that indicates exchange preferences as to which of a plurality of reward programs is desired to be used for reward redemption. An issuer may have preferred status with the exchange system such that its reward program would be first proposed to the user when making a purchase transaction. Likewise, in another alternative, an issuer rules profile stored in an issuer rules profile database 116 may be referenced, that indicates issuer preferences as to which of a plurality of reward programs is desired to be used for reward redemption.

Figure 16:
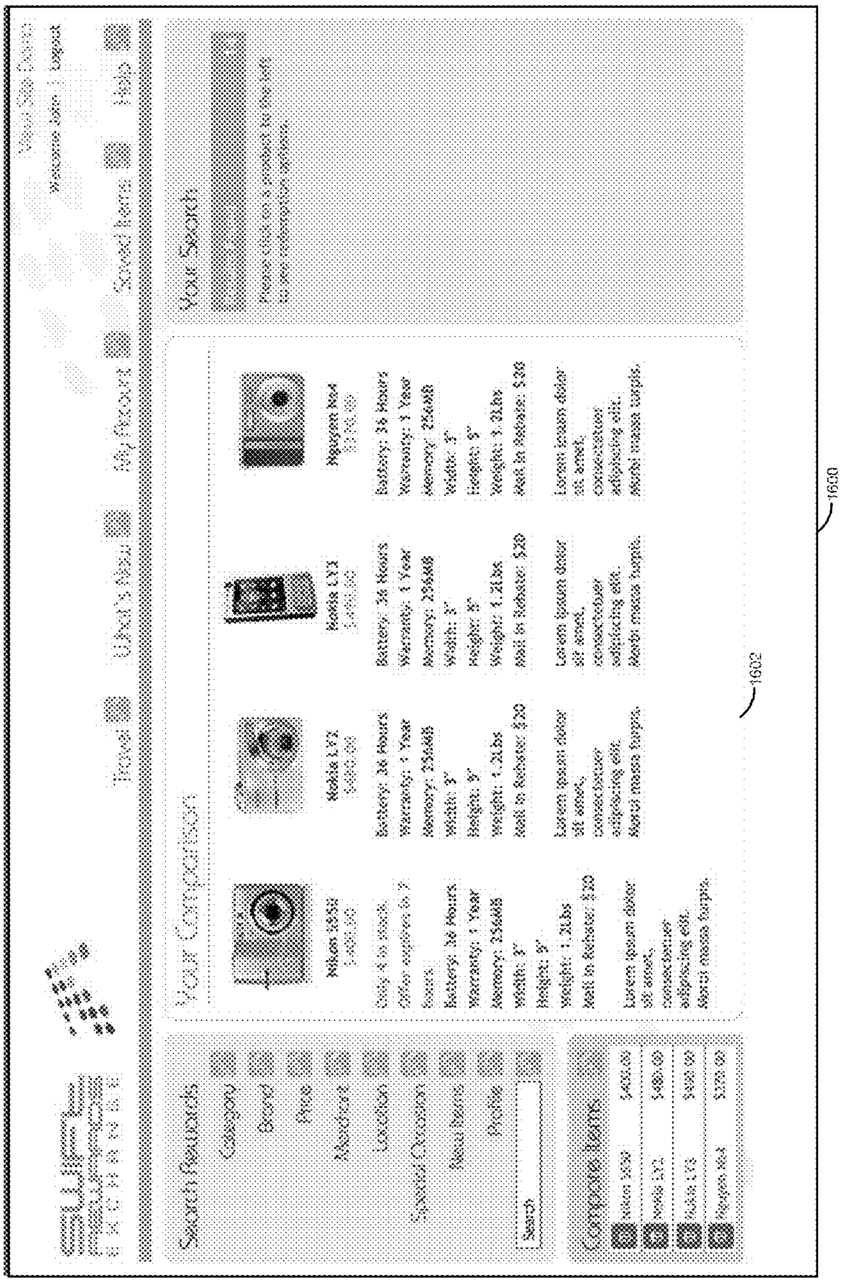
FIG. 16 is a screen shot of a web page with several items selected for comparison viewing.
Figure 17:
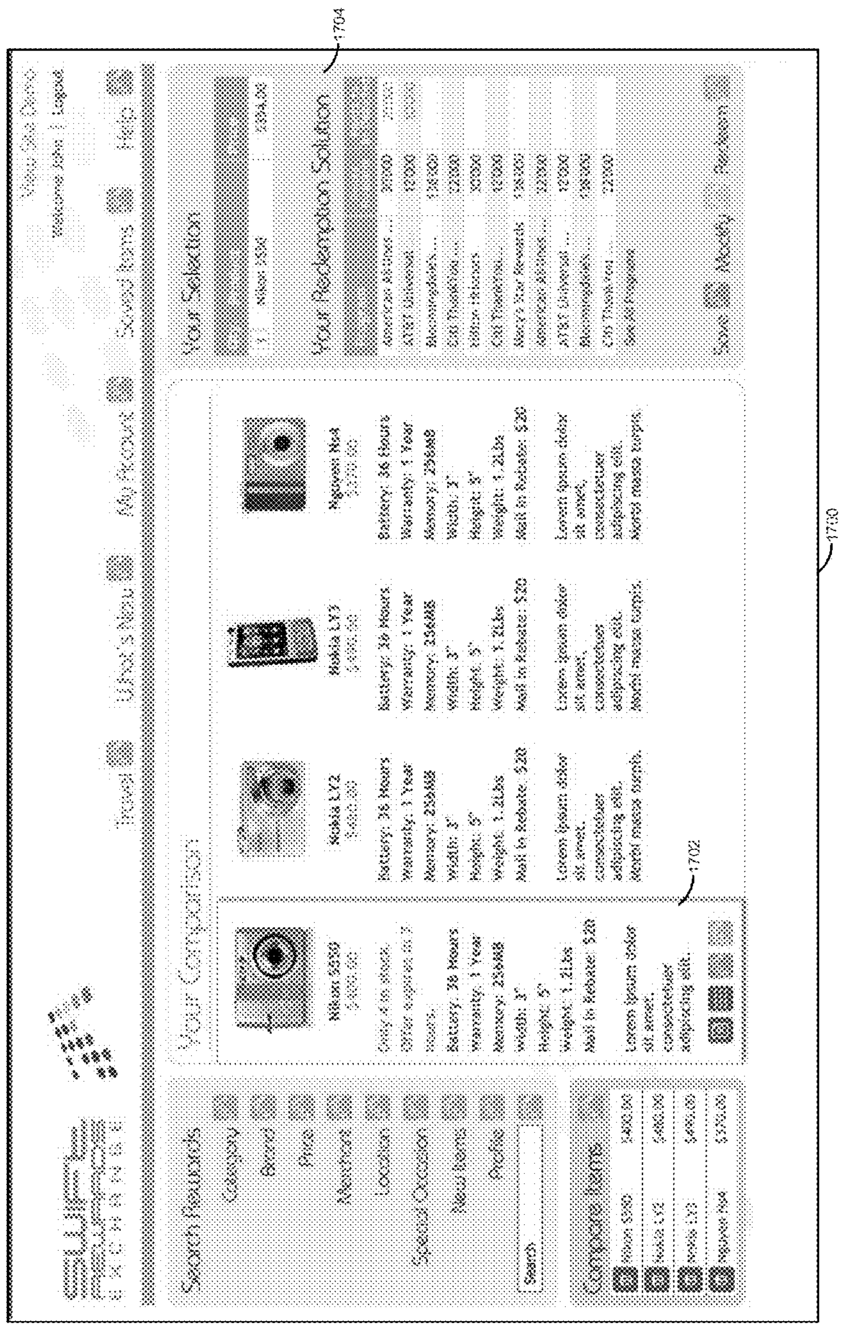
FIG. 17 is a screen shot of a web page with a selected product from the product comparison along with a suggested points redemption solution for obtaining that selected product.
Figure 18:
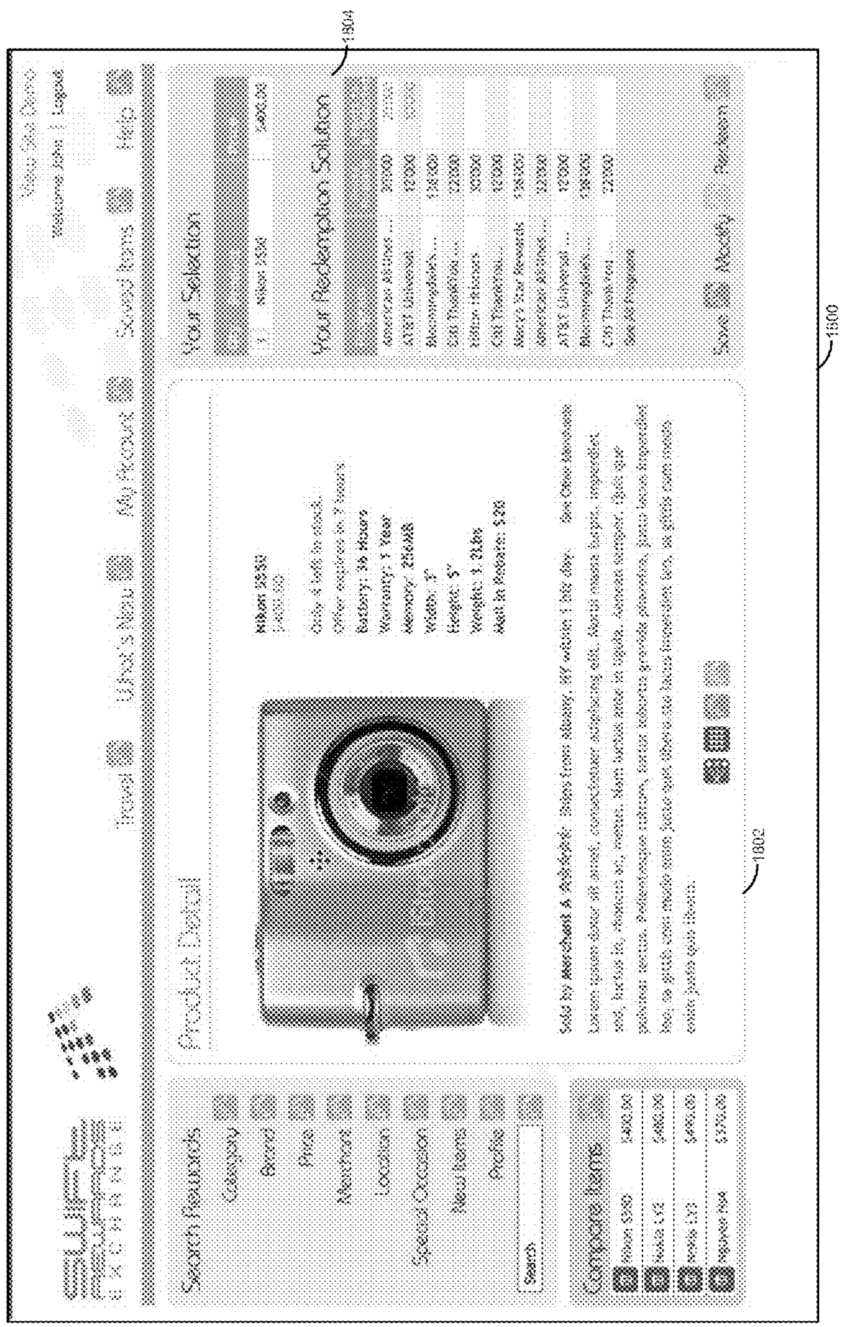
FIG. 18 is a screen shot of a web page with detailed information about a selected product from the product comparison along with a suggested points redemption solution for obtaining that selected product.
Figure 19:
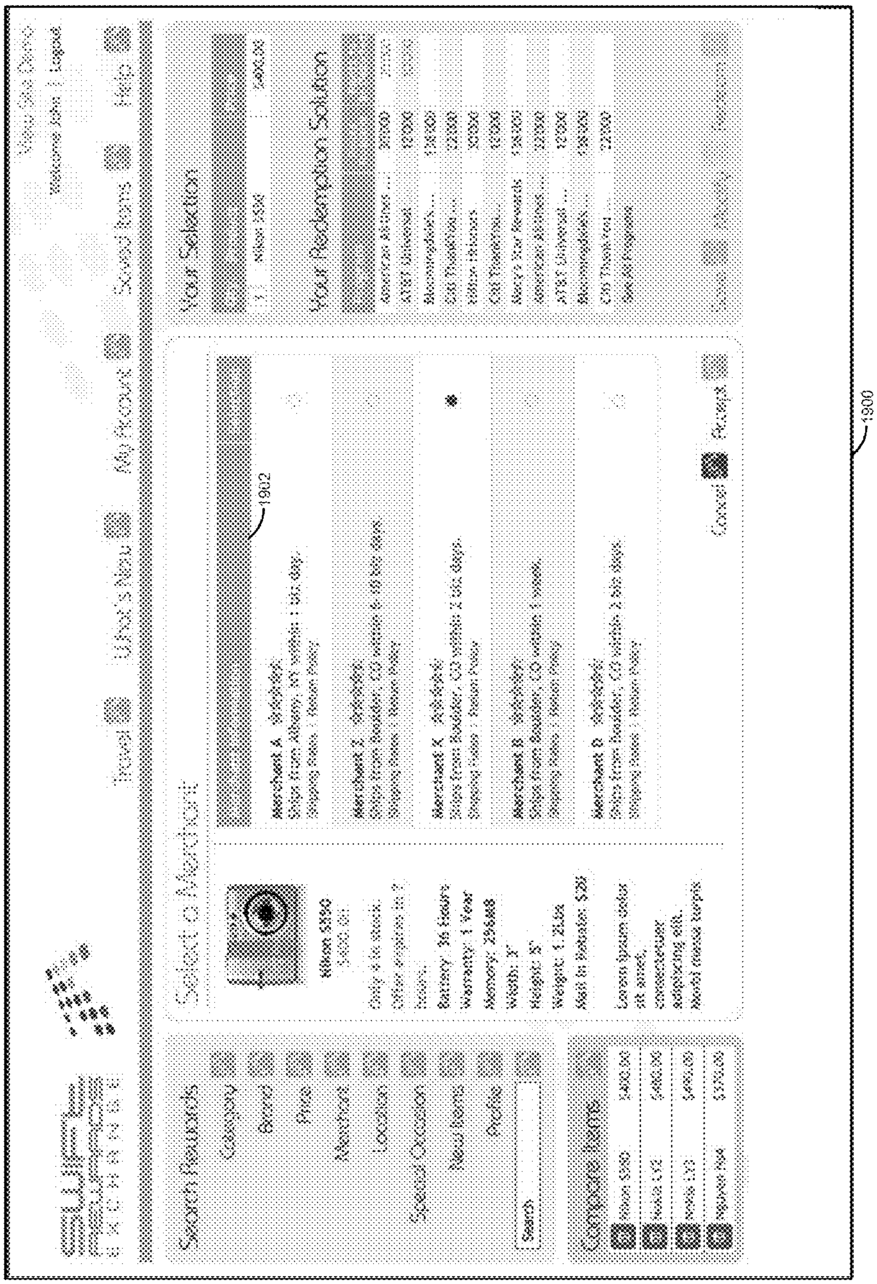
FIG. 19 is a screen shot of a web page with various merchants that can supply the user with the selected product.
Figure 20:
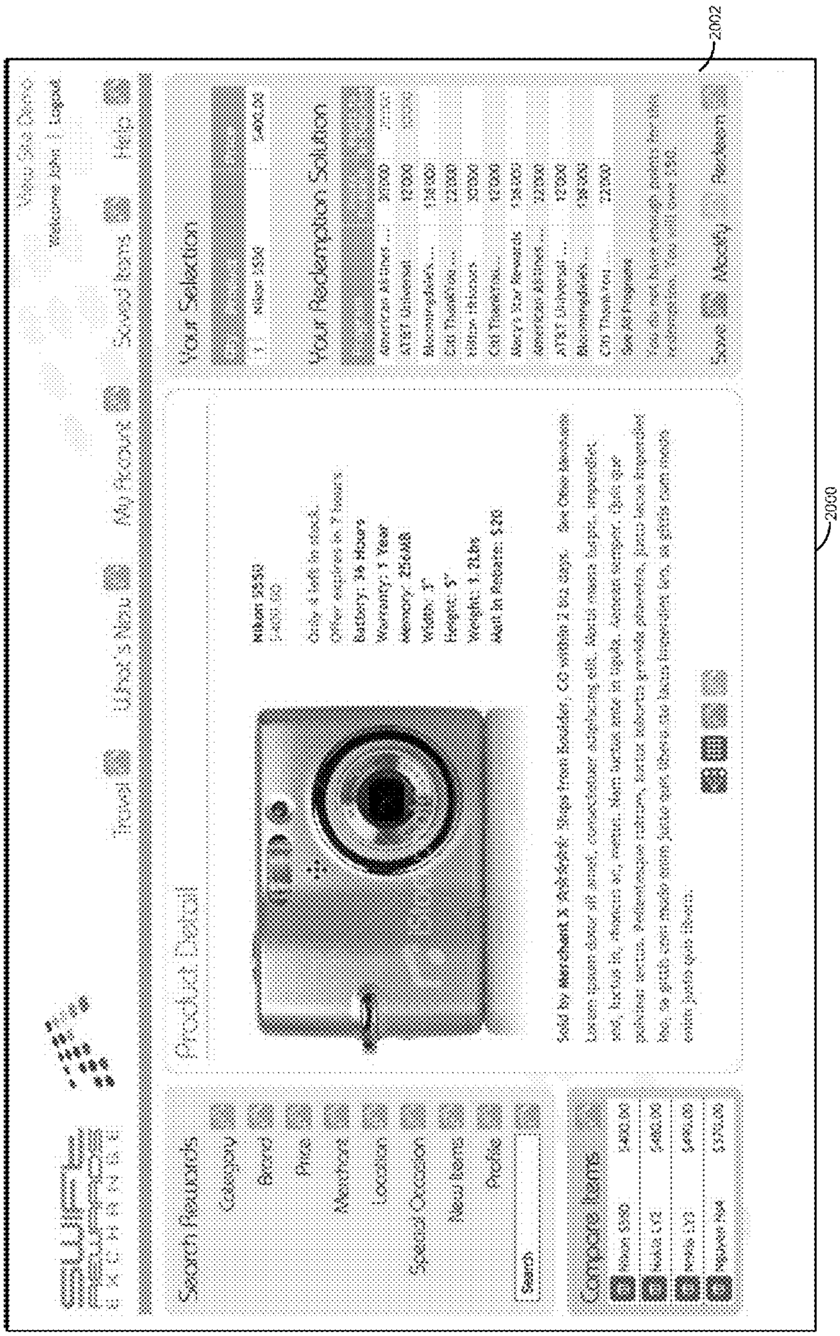
FIG. 20 is a screen shot of a web page in which the user is informed his redemption options do not provide enough points for obtaining the selected items.

FIG. 16 is a screen shot of a web page 1600 with several items selected for comparison viewing in box 1602. FIG. 17 is a screen shot of a web page 1700 with a selected product 1702 from the product comparison along with a suggested points redemption solution 1704 for obtaining that selected product 1702. FIG. 18 is a screen shot of a web page 1800 with detailed information 1802 about a selected product from the product comparison along with a suggested points redemption solution 1804 for obtaining that selected product. FIG. 19 is a screen shot of a web page 1900 with a list 1902 of various merchants that can supply the user with the selected product. FIG. 20 is a screen shot of a web page 2000 in which the user is informed in box 2002 that his redemption options do not provide enough points for obtaining the selected items.

Figure 21:
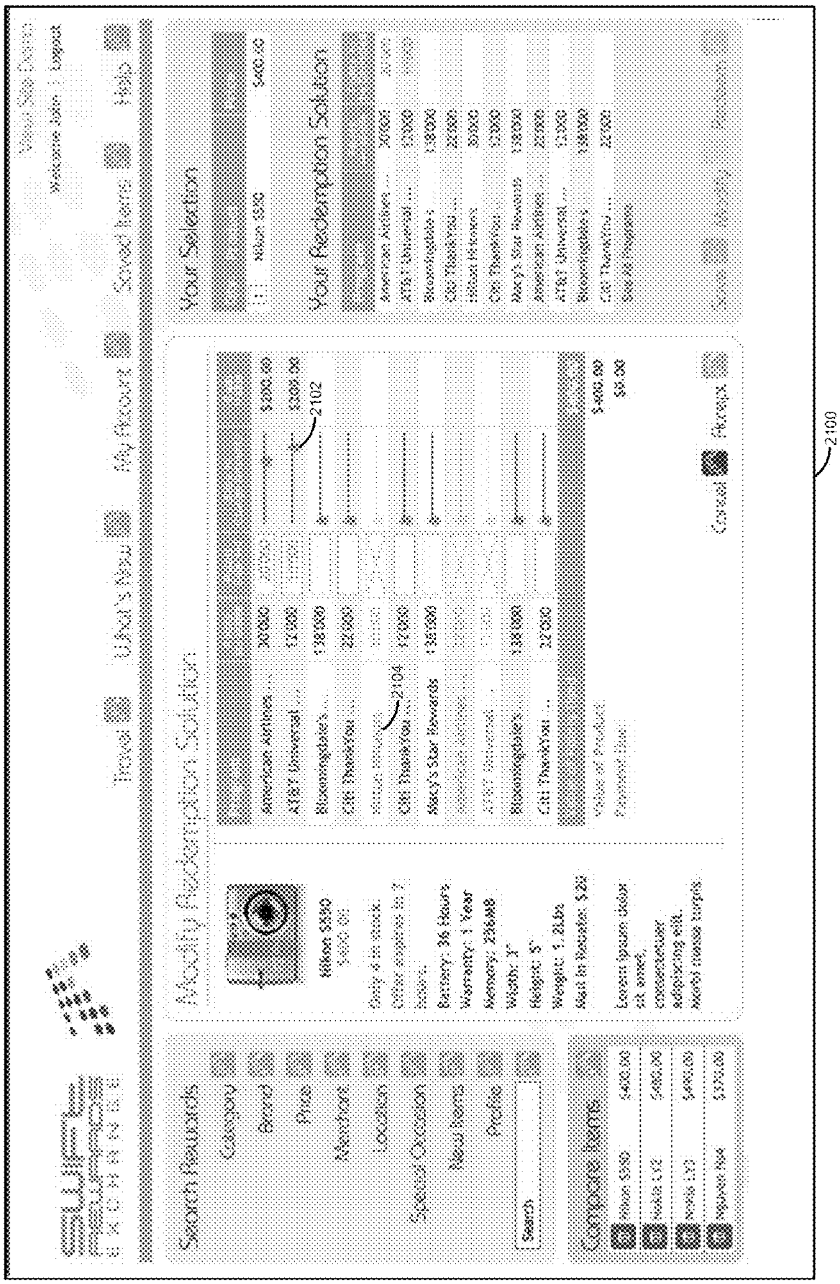
FIG. 21 is a screen shot of a web page that provides the user with slider options for modifying his redemption scenario.
Figure 22:
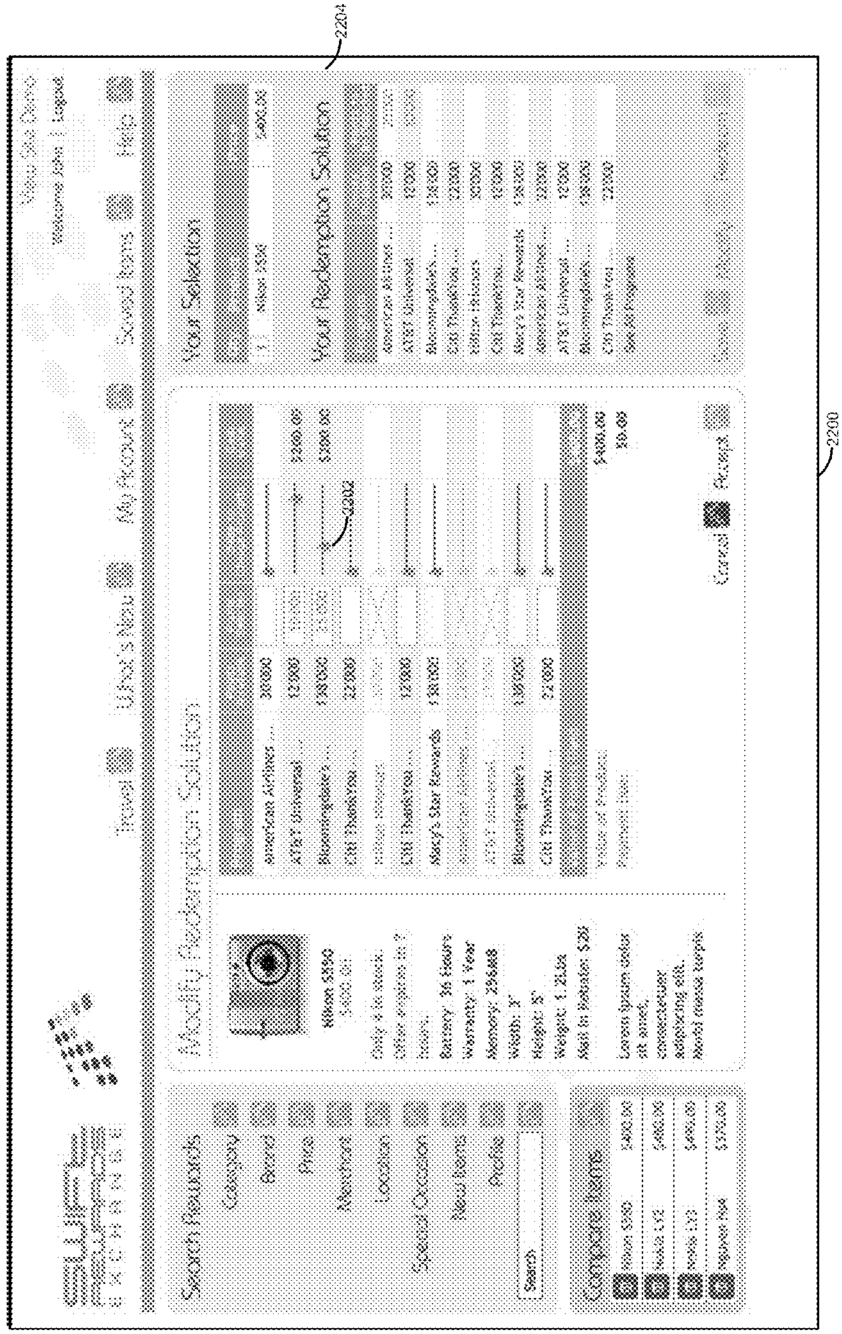
FIG. 22 is a screen shot of a web page that illustrates a modified redemption scenario.

FIG. 21 is a screen shot of a web page 2100 that provides the user with slider controls 2102 for modifying his redemption solution. As previously explained, the exchange computer 102 has analyzed the user's available reward points and rules and determined that an optimal reward scenario is to use 20,000 of his American Airlines points and 10,000 of his AT&T points to pay for the selected item. However, the user may now modify this exchange scenario as desired. For example, the user may want to use none of his American Airlines points, and thus will use the mouse to slide the slider 2102 all the way to the left side to zero (see the resulting web page 2200 of FIG. 22). He may then opt to use some or all of his 138,000 Bloomingdale's reward points by grabbing the slider 2202 and sliding to the right until the desired dollar amount equivalent is displayed (in this case $200 as in FIG. 22). This equates to 25,000 Bloomingdales points as shown. He can then modify his redemption scenario in the same manner with any other available reward programs as shown in FIGS. 21 and 22. The section 2204 labeled Your Redemption Solution at the right side of the web page 2200 page will show the elected redemption options.

Some of the reward programs in the user's profile are shown in grayed out format 2104 in FIG. 21. Although these programs are in the user's profile, they are unavailable for exchange with the selected merchant since there has been no exchange/trading agreement executed via the exchange with the selected merchant and those issuers. This is explained in further detail below.

Figure 23:
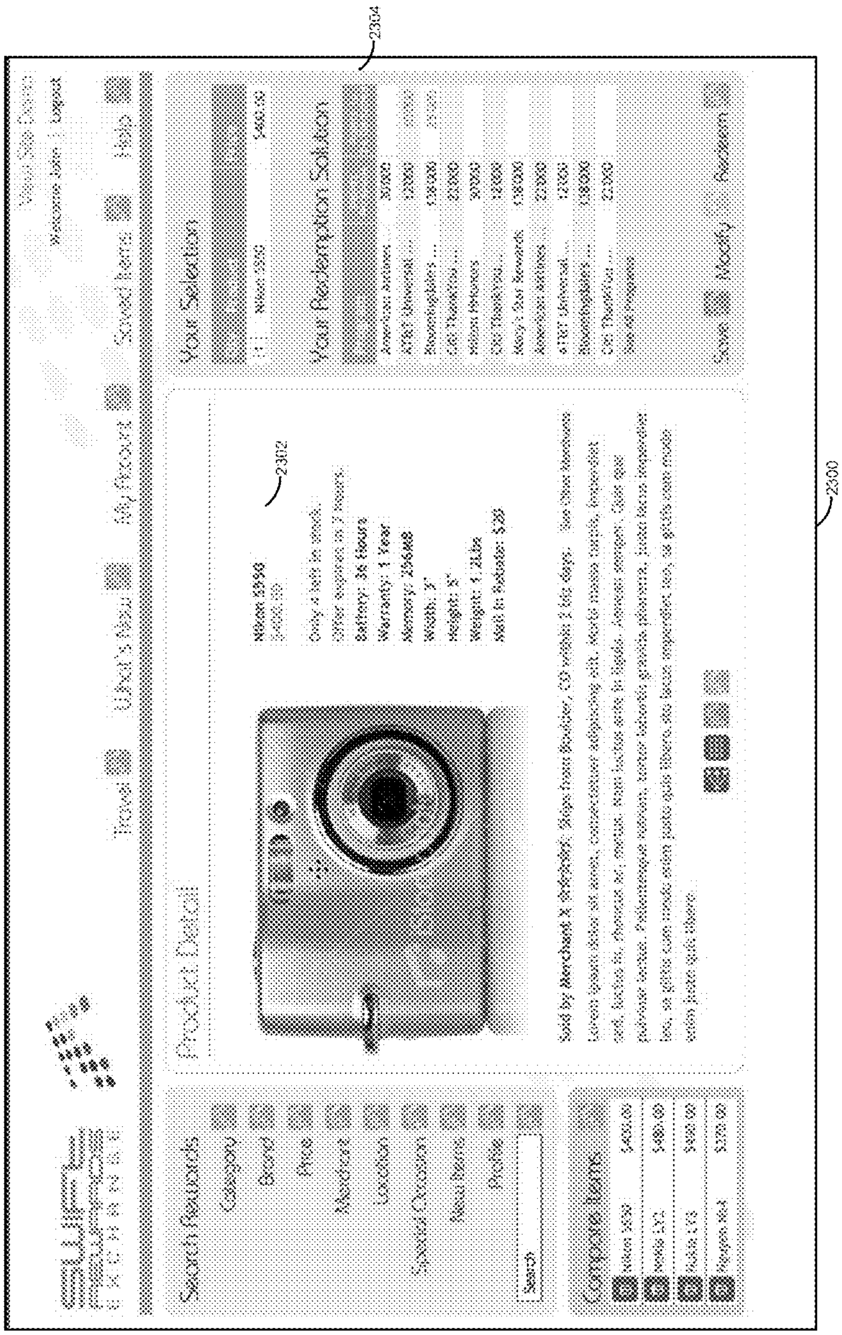
FIG. 23 is a screen shot of a web page that illustrates a selected product along with a modified redemption scenario.
Figure 24:
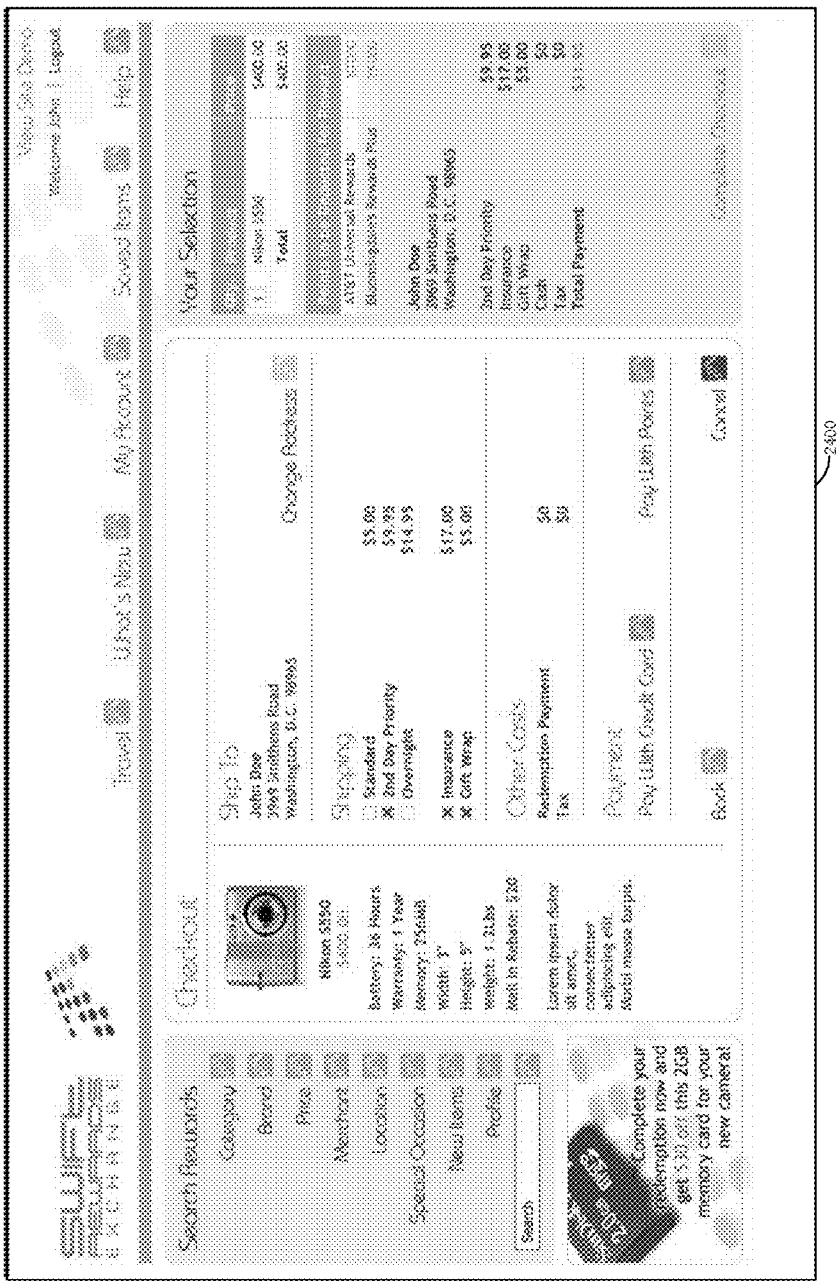
FIG. 24 is a screen shot of a checkout web page.
Figure 25:
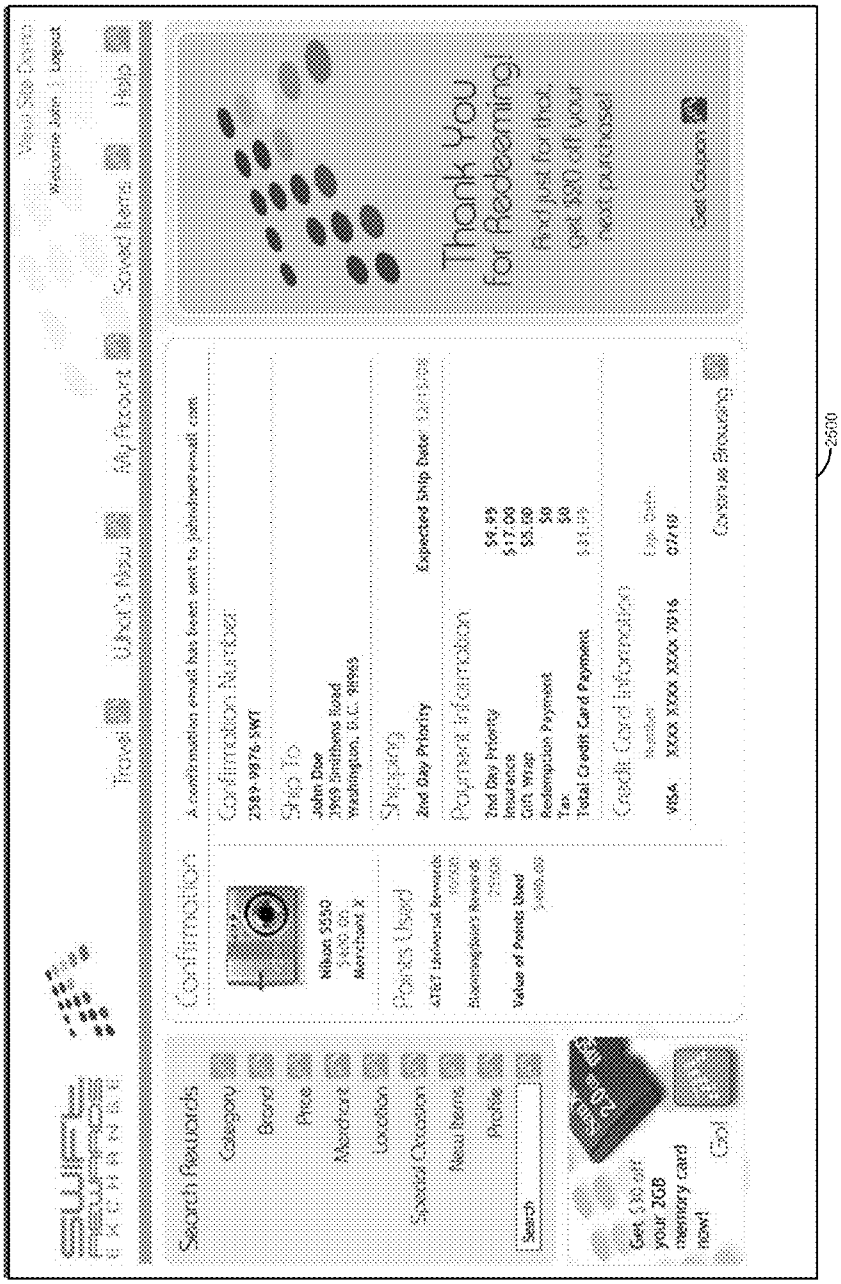
FIG. 25 is a screen shot of a web page showing confirmation of the redemption transaction using points and a credit card.
Figure 26:
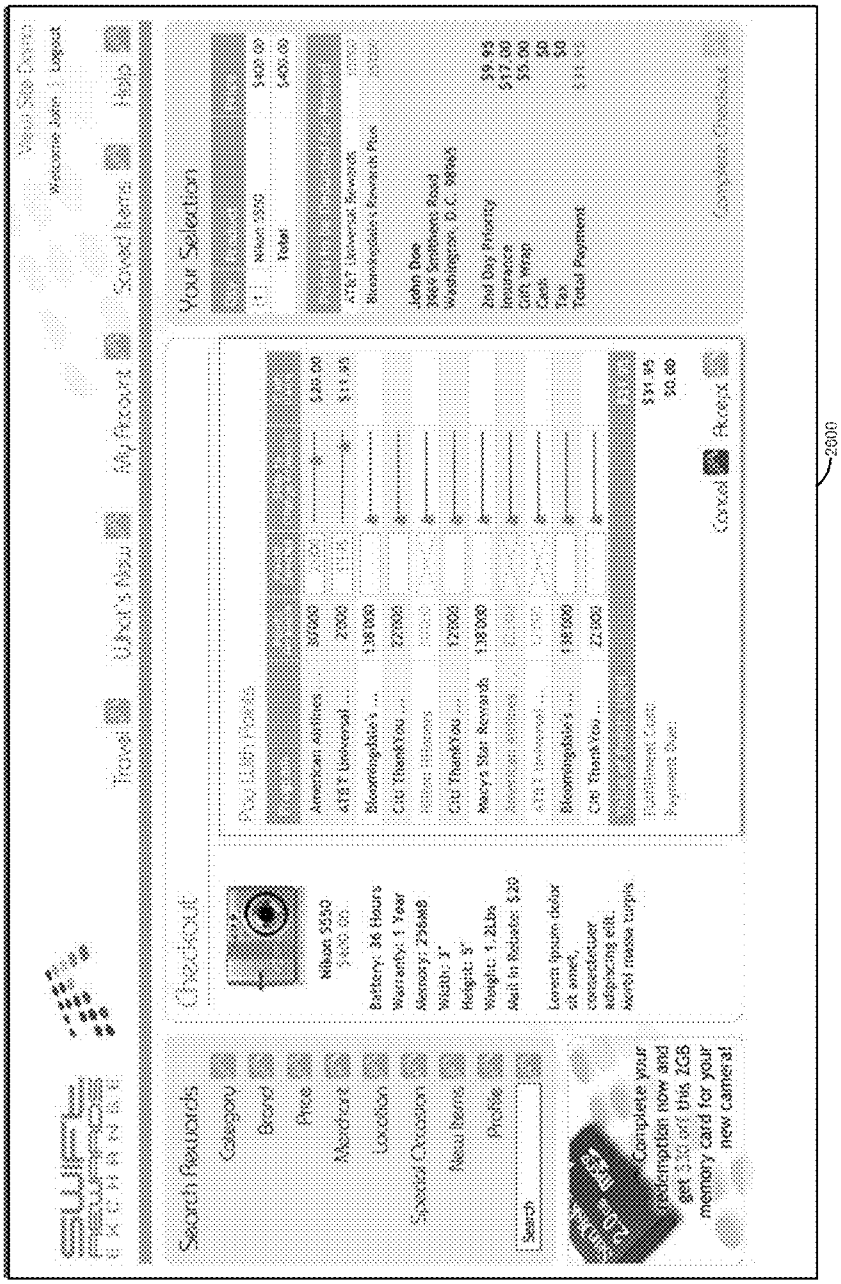
FIG. 26 is a screen shot of a checkout web page for payment with points only.

FIG. 23 is a screen shot of a web page 2300 that illustrates the selected product 2302 along with the modified redemption scenario 2304. FIG. 24 is a screen shot of a checkout web page 2400 in which the selected product price and extra costs such as tax and shipping are presented. This gives the option of paying the extra costs with a credit card or with more reward points. FIG. 25 is a screen shot of a web page 2500 showing confirmation of the redemption transaction using points and a credit card for the extra costs. FIG. 26 is a screen shot of a checkout web page 2600 for payment with points only so that the user may pay for the extra costs with points in the same manner that he pays for the selected item with points.

In sum, the reward redemption transaction may be executed by the user selecting the item for purchase from a merchant (for example by utilizing the dynamic search filter presented by the web page that enables the user to select a desired product category, manufacturer, and/or price range). The item is purchased at least partially by the redemption of reward points from at least one issuer. The user selects via the web page at least one reward program previously registered in the exchange computer by the user and a quantity of reward points to be redeemed for the purchase of the item by the user. The exchange computer then causes a purchase transaction to be executed for the item selected by the user using at least the quantity of reward points from the reward program selected by the user. Cash or other consideration may be combined with selected reward points if desired in order to complete the transaction.

Several ways exist for enabling the transaction to be executed. In one embodiment, the exchange computer mediates the transaction and causes the purchase transaction to be executed for the item selected by the user using at least the quantity of reward points from the reward program selected by the user by the exchange computer requesting the issuer computer associated with the selected reward program to (I) reduce the reward account associated with the user by the quantity of reward points selected by the user for execution of the reward redemption transaction, and (II) convey consideration to the exchange computer corresponding to the quantity of reward points selected by the user for execution of the reward redemption transaction. The exchange computer then conveys consideration to the merchant computer selected by the user in exchange for the associated merchant providing to the user the selected item. So for example, the redemption transaction specifies that a DVD will be purchased by the user from BEST BUY (the merchant) using 1500 reward points from the user's reward account with CHASE (the issuer), for which CHASE will pay one penny per point redeemed. In this case, the exchange computer instructs the CHASE issuer computer to reduce the user's reward account by 1500 reward points. In exchange, CHASE will convey consideration with a value of $15.00 (one penny per point) to the exchange computer, either in real time or by crediting an account that the exchange computer maintains with the CHASE issuer computer via the Settlement Service 162. The exchange computer will request the BEST BUY merchant computer 128 to execute a purchase transaction for the selected DVD, such that the DVD is shipped to the user as known in the art of ecommerce. The exchange computer will convey consideration to the BEST BUY merchant computer 128 (e.g. $15.00), either in real time or by crediting an account that the exchange computer maintains with the CHASE issuer computer via the Settlement Service 162, in exchange for the DVD being shipped to the user. As a result, the exchange computer has brokered a transaction in which the user receives a DVD from the merchant BEST BUY by using reward points from his CHASE reward account, which would otherwise not be acceptable tender for this purchase transaction in the prior art.

In this simple example, the exchange computer conveys the same amount of consideration to the merchant that was received from the issuer ($15.00). It is envisioned that the exchange computer may charge a transaction fee for this service, which may be paid by any or all of the parties involved (the user, the issuer, and/or the merchant). For example, the user may be charged $1.00 by the exchange computer for executing the transaction. Or, the issuer may pay a service fee to the exchange computer in addition to the $15.00 conveyed for redeeming the reward points. Or, the merchant may only receive $14.00 from the exchange computer, wherein the exchange has retained $1.00 of the $15.00 conveyed by the issuer. Any scenario may be implemented as may be agreed to by the parties involved.

In an alternative embodiment, the exchange computer causes the purchase transaction to be executed by requesting the merchant to execute the purchase transaction directly with the issuer by first transmitting to the merchant computer (I) an identification of the item selected by the user and (II) an identification of the reward issuer selected by the user and the quantity of reward points selected by the user for redemption for the item. The merchant computer then directly requests the issuer computer associated with the selected reward program to (I) reduce the reward account associated with the user by the quantity of reward points selected by the user for execution of the reward redemption transaction, and (II) convey consideration to the merchant computer corresponding to the quantity of reward points selected by the user for execution of the reward redemption transaction. The issuer computer at some point (e.g. in real time or at a later time in batch mode) conveys consideration to the merchant in exchange for the merchant providing to the user the selected item. As applied to the purchase example above, the $15.00 consideration paid by the issuer would go directly to the merchant rather than through the exchange computer.

In these examples, only one reward account is being used by the user to redeem points in exchange for a product. Of course, if multiple reward accounts are chosen or redemption for the product, then each issuer is contacted in the same manner as described above. For example, if the user decides to redeem 1000 points from CHASE and 500 points from CITIBANK to pay for the DVD from BEST BUY, then CHASE will convey $10.00 in consideration to the exchange computer and CITIBANK will convey $5.00 in consideration to the exchange computer (each issuer reducing the user's reward account accordingly). The exchange computer may then convey the total consideration of $15.00 to BESTBUY in exchange for the DVD as described above. Likewise, the merchant computer may mediate the transaction directly with the issuer (bypassing the exchange computer) as described above.

Figure 27:
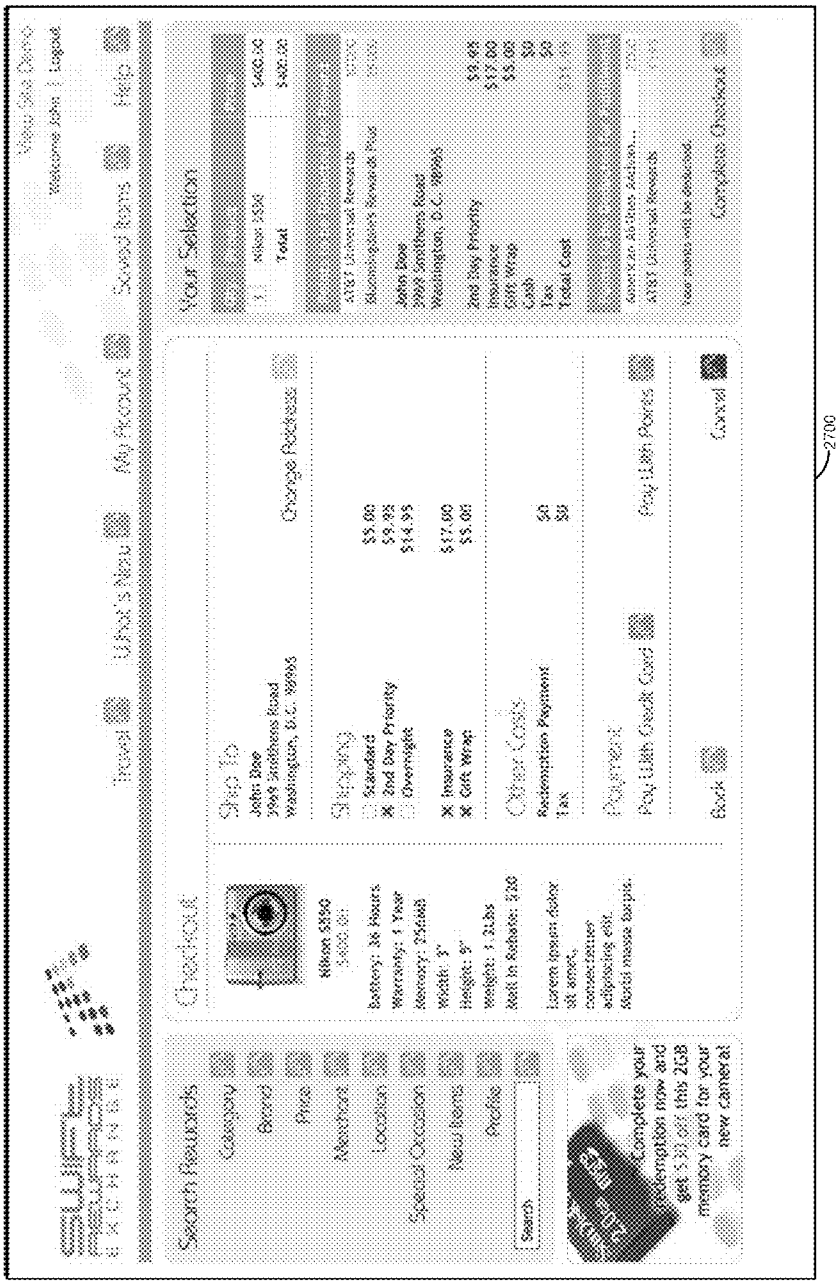
FIG. 27 is a screen shot of a web page showing confirmation of the redemption transaction with points only.
Figure 28:
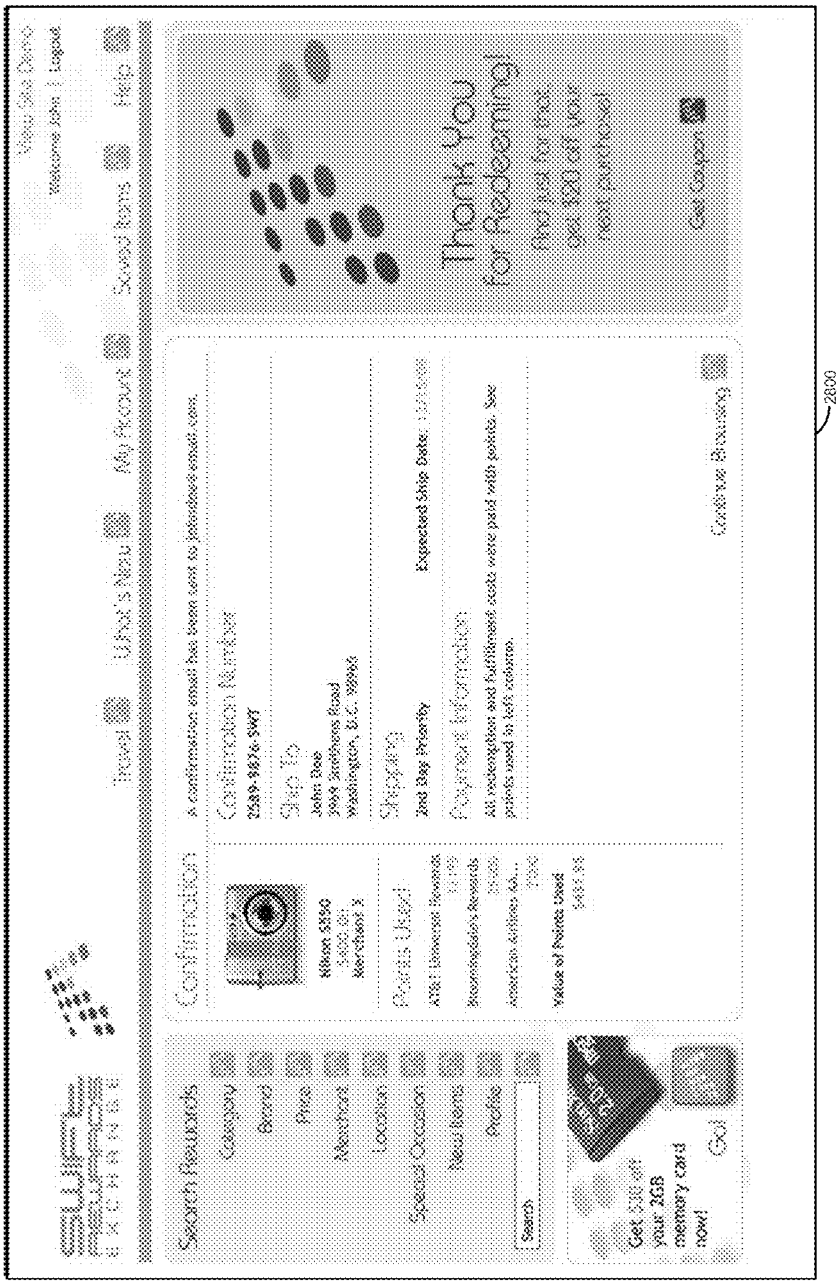
FIG. 28 is a screen shot of a web page showing completion of the redemption transaction with points only.

FIG. 27 is a screen shot of a web page 2700 showing confirmation of the redemption transaction with points only, and FIG. 28 is a screen shot of a web page 2800 showing completion of the redemption transaction with points only.

Figure 28A:
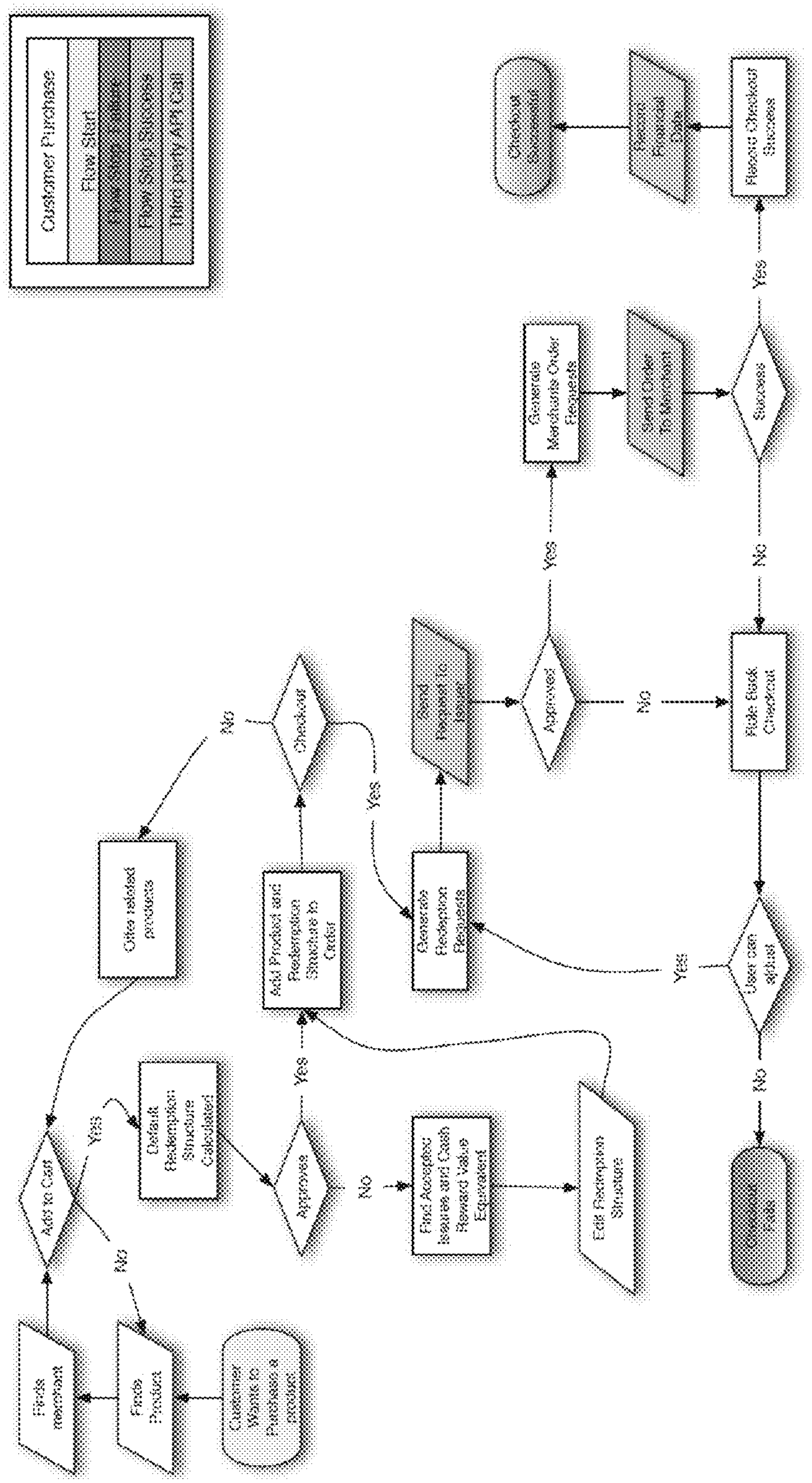
FIG. 28*a* is a flowchart illustrating a user purchase transaction.
Figure 28B:
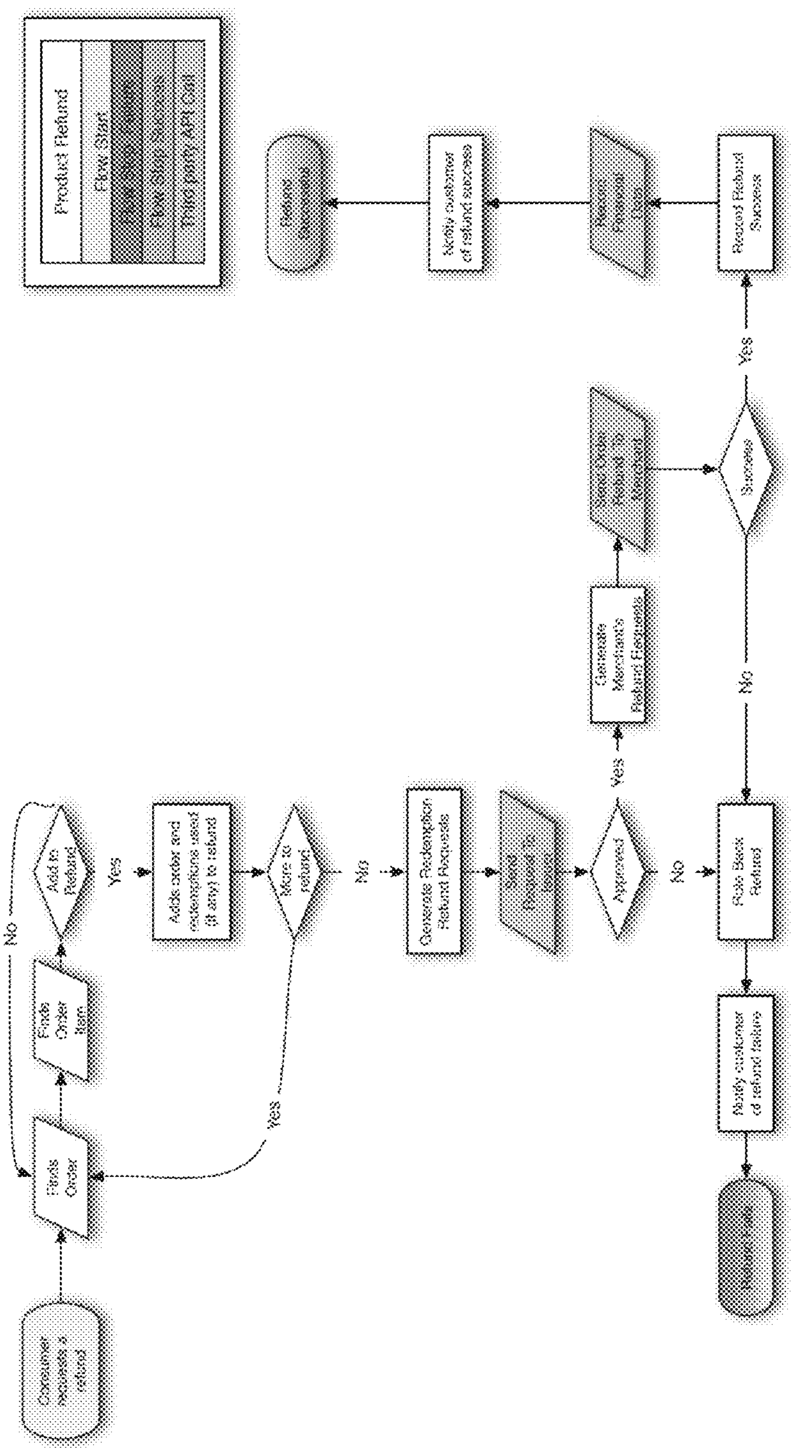
FIG. 28*b* is a flowchart illustrating a product refund process.

FIG. 28*a* is a flowchart illustrating a user purchase transaction under this embodiment. As described above, as a starting point, a user wants to purchase a product utilizing the exchange. After performing the searches of the product database and determining the desired product as well as the merchant from whom the product will be purchased, the product is added to the shopping cart. The user may continue to peruse the site for more products to be purchased, and at some point he or she will decide to execute the purchase transaction. The default or proposed redemption solution is determined by the exchange computer, and presented to the user computer for the user to consider. If the user approves of the proposed redemption solution, then the product and the approved redemption solution is added to the user's order. If the user does not approve of the proposed redemption solution, however, then the proposed solution may be modified before being added to the order. The user may then checkout or continue to add products to his or her shopping cart. During the checkout process, the reward point redemption request (or requests if multiple issuers are involved) is generated and sent to the issuer computer. The issuer computer may then approve or decline the request. If declined, then this is indicated to the user and the redemption scenario may be modified or the checkout aborted (fails). Assuming the issuer approves the redemption request, then the merchant purchase order request is generated by the exchange computer and sent to the merchant computer. If the merchant can't execute the transaction (e.g. the product is no longer available), then this is indicated to the user and the transaction may be modified or the checkout aborted (fails). Assuming that the merchant is able to execute the transaction, then the financial terms are logged (e.g. consideration conveyed by issuer and received by the merchant, transaction fees, etc.) and the product is shipped to the user. FIG. 28*b* is a flowchart of a typical product refund process.

Figure 28C:
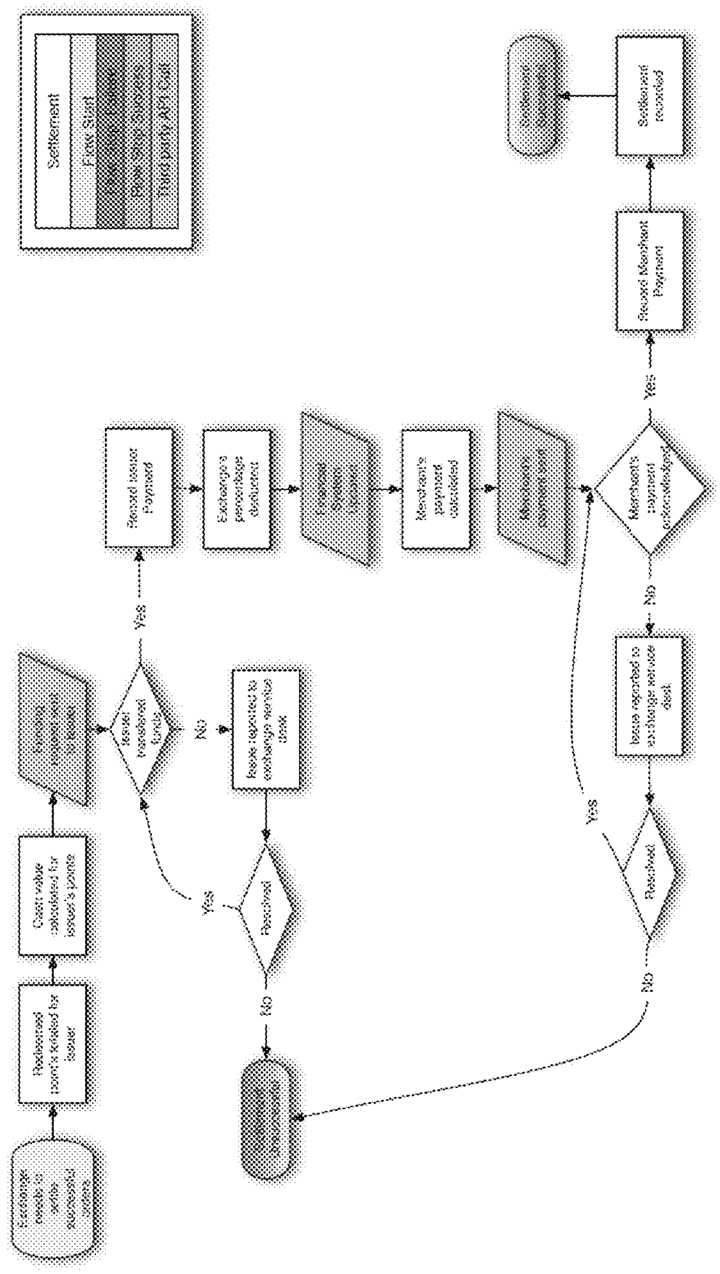
FIG. 28*c* is a flowchart illustrating a settlement process.

FIG. 28*c* is a flowchart illustrating a settlement process of an embodiment of the invention that is executed by the settlement service 162. As a starting point, the exchange needs to settle the completed orders. The total number of redeemed points for an issuer is determined, and the cash value for that issuer's redeemed points is calculated. A request for funds is then sent to the issuer computer for the amount calculated. Once the issuer has transferred the requested funds to the exchange computer, then this issuer payment is recorded in a transaction log. A transaction fee, which may be for example a percentage of the funds transferred in, is deducted from the amount received from the issuer and the records are updated. The associated payments that must be made to the merchant (s) are calculated based on the previously executed purchase transactions. Payment is then sent to the merchant. After acknowledgement of receipt by the merchant, the successful settlement transaction is logged as complete.

In addition to merchants, third party fulfillment centers may participate on the exchange. These third party fulfillment centers would offer products in exchange for reward points in the same manner as described herein with respect to merchants.

In one embodiment, the user may bid on a reward redemption transaction. After selecting an item for purchase from a merchant via the exchange computer web pages, the user selects at least one reward program previously registered in the exchange computer by the user and a quantity of reward points to be bid to be redeemed for the purchase of the item by the user. The user computer submits to the exchange computer a bid of the quantity of reward points that the user is offering for redemption for purchase of the item. The exchange computer, utilizing the bidding engine 154, submits the bid received from the user computer to the merchant computer, and the merchant computer either accepts or rejects the bid for purchase of the product. So, for example, if the user is bidding on a $1,000 plasma TV, he may submit a bid to the merchant for $900 to purchase the TV. The merchant may accept the bid, reject the bid, or make a counter offer (e.g. $950). The transaction may be executed once both parties agree on a purchase price.

Similarly, the exchange computer may submit the bid received from the user computer to the issuer computer, and the issuer computer either accepts or rejects the bid for purchase of the product. In the plasma TV example above, if the exchange computer indicates that the plasma TV will require redemption of 100,000 points from CHASE, then the user may submit a bid of 90,000 points for redemption. The exchange computer submits this bid to the CHASE issuer computer, which may then accept the bid, reject it, or make a counter offer. In the event that the issuer does agree to make the purchase by redeeming less points, then it would still convey the required consideration to the exchange computer, but would retire less points, thus placing a higher value on each point retired than it would otherwise.

The exchange computer may also split bids between the issuer and the merchant such that the merchant may agree to take less consideration than otherwise required, and the issuer may retire less points than otherwise required, in order to execute a desired transaction. For example, if the user bids 90,000 CHASE points to obtain the plasma TV from BEST BUY, then CHASE may agree to retire 90,00 points (rather than 100,000) but convey only $950, and BESTBUY may agree to accept the $950 rather than the listed price of $1,000.00.

In another aspect of the invention, a product purchase transaction is executed by a user first selecting an item for purchase from a merchant. Then, the exchange computer determines the lowest price that is being charged by the plurality of merchants for the item selected by the user. The exchange computer also determines the lowest number of reward points that may be redeemed from the plurality of issuers for the item selected by the user. The determined lowest price and the determined lowest number of reward points are displayed to the user via the user computer, and the user selects a mode of purchase of the item with either the determined lowest price or the determined lowest number of reward points. Then, a purchase transaction is executed for the item selected by the user by the mode selected by the user.

Figure 29:
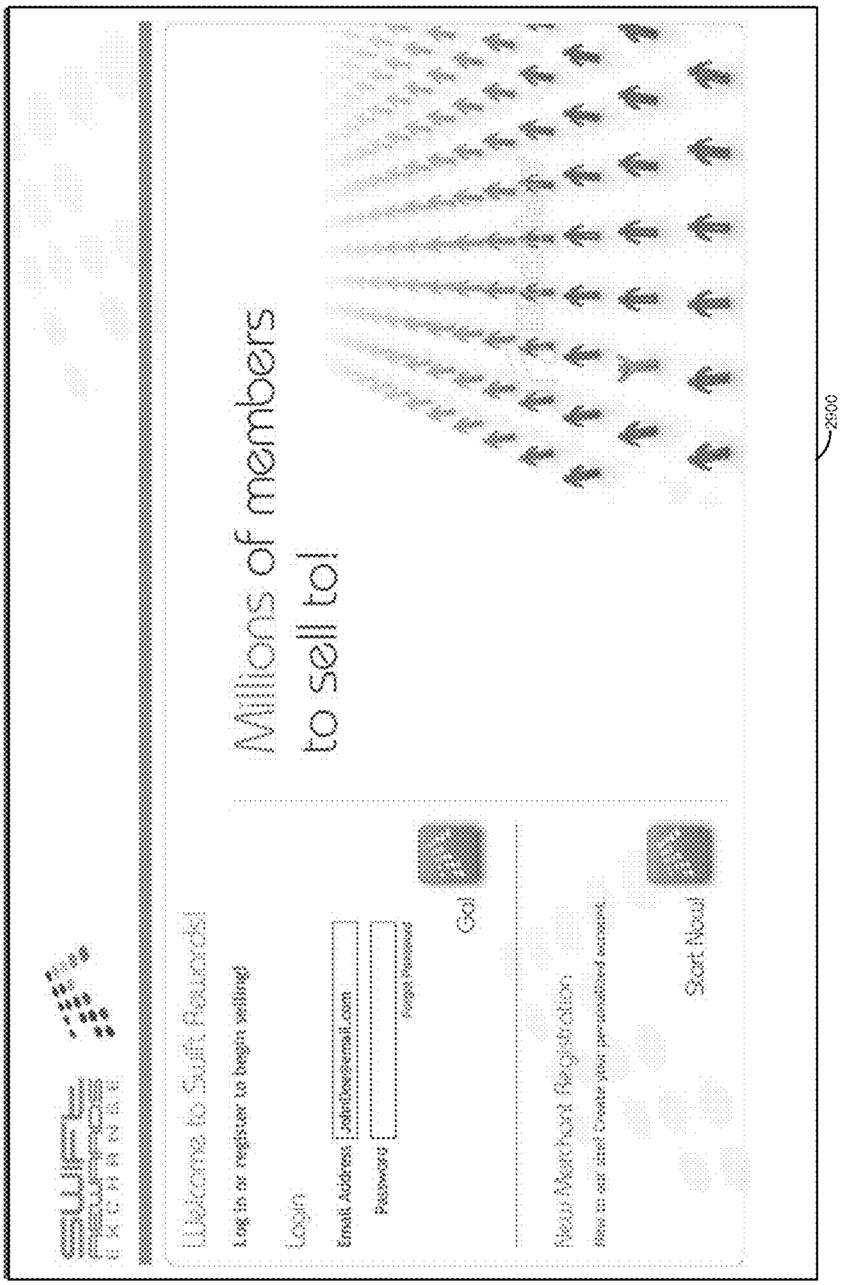
FIG. 29 is a screen shot of a merchant login page.
Figure 30:
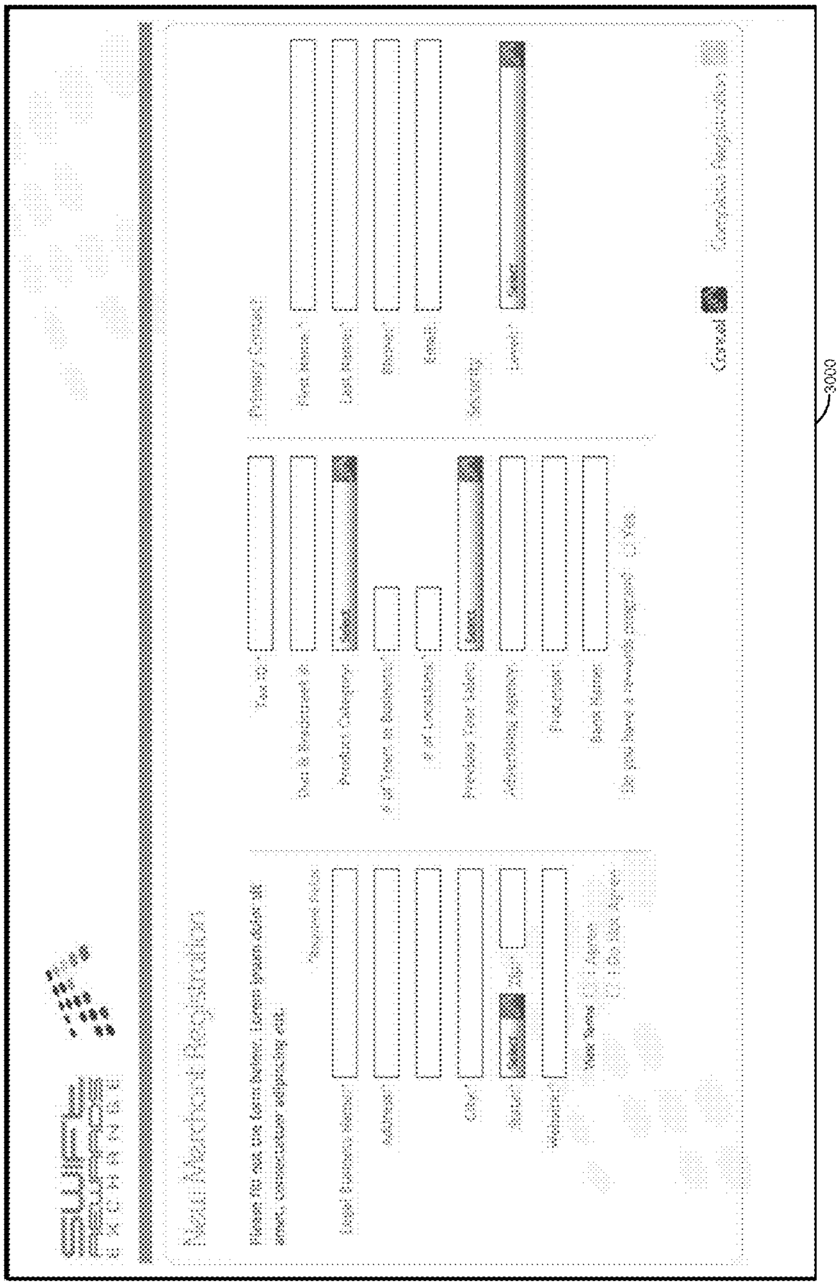
FIG. 30 is a screen shot of a new merchant registration page.
Figure 31:
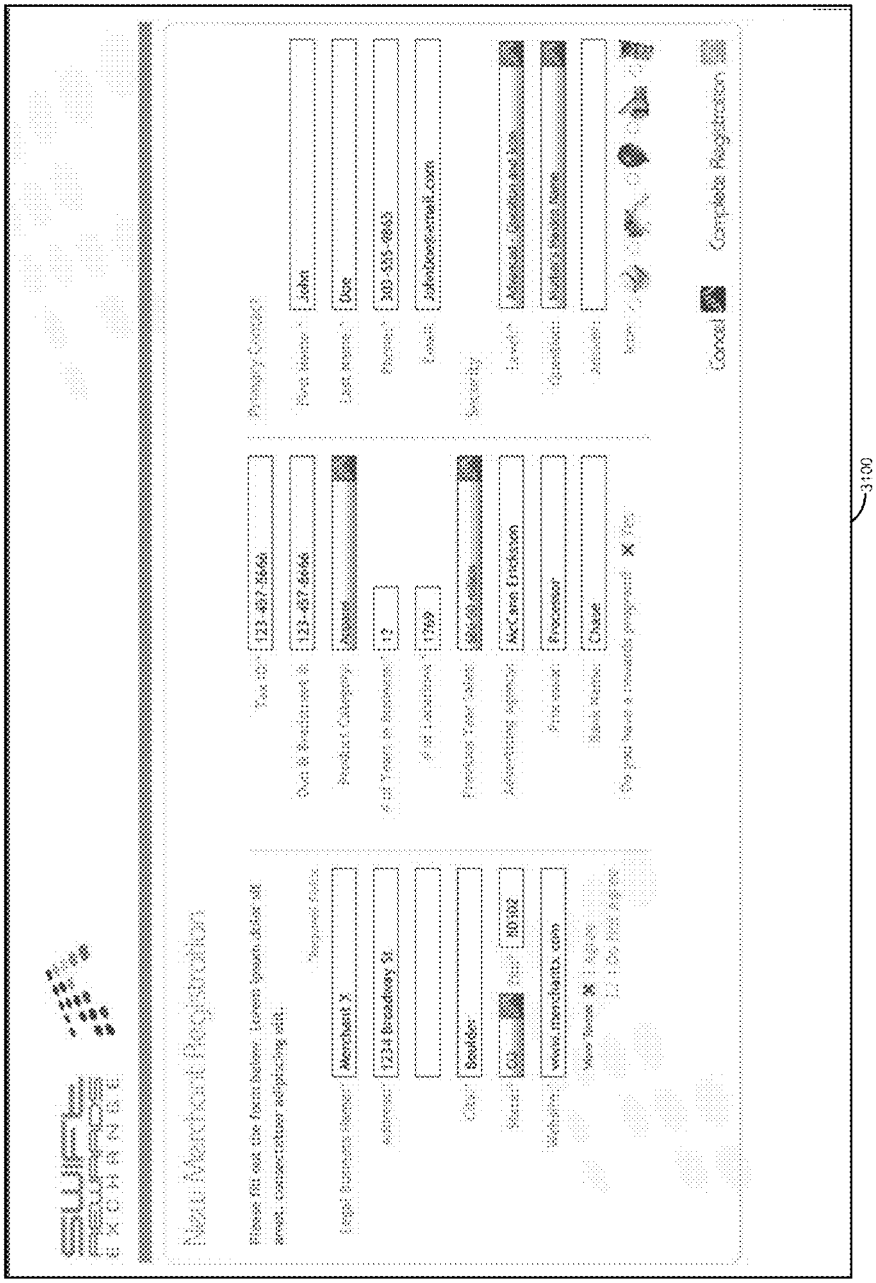
FIG. 31 is a screen shot of a new merchant registration page with filled in data.
Figure 32:
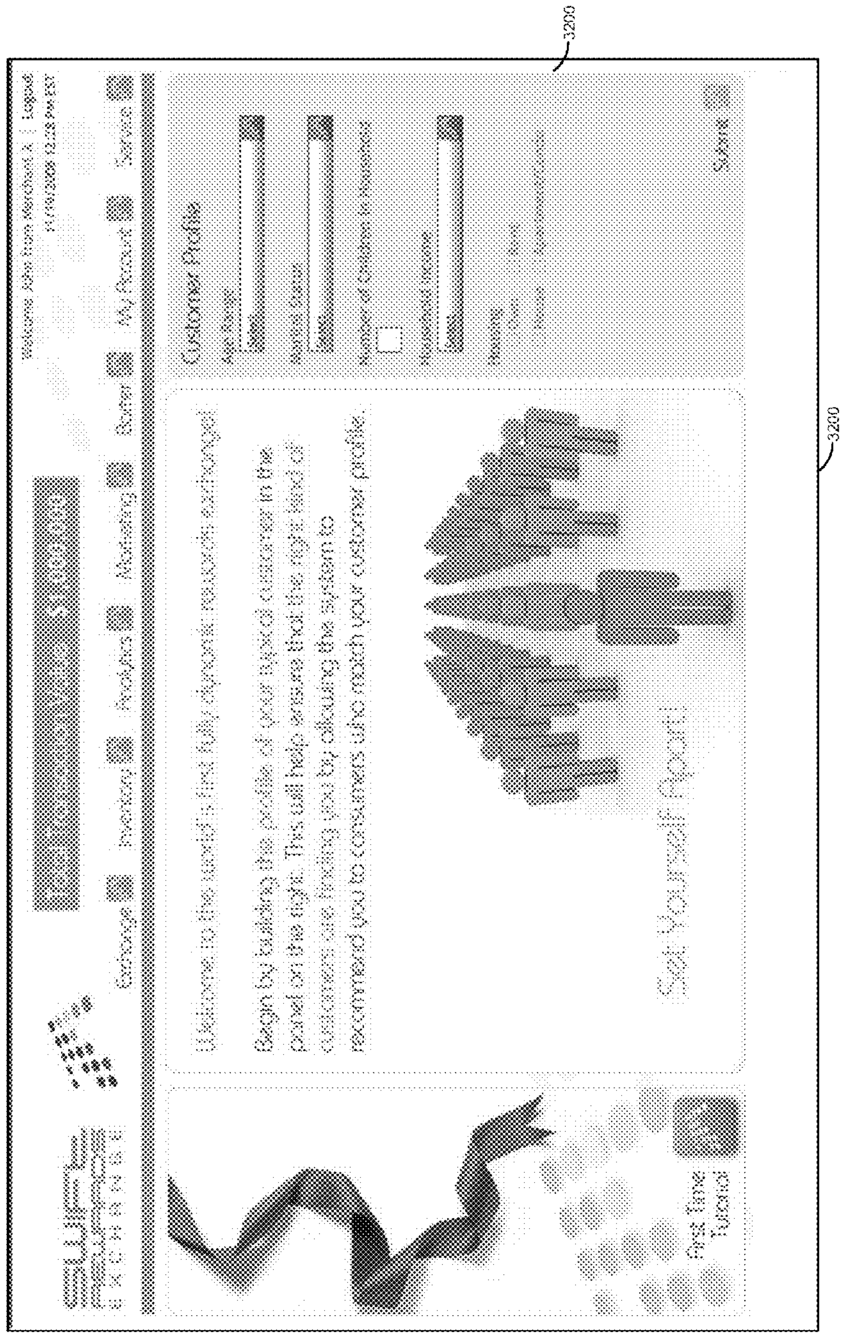
FIG. 32 is a screen shot of a merchant home page.
Figure 33:
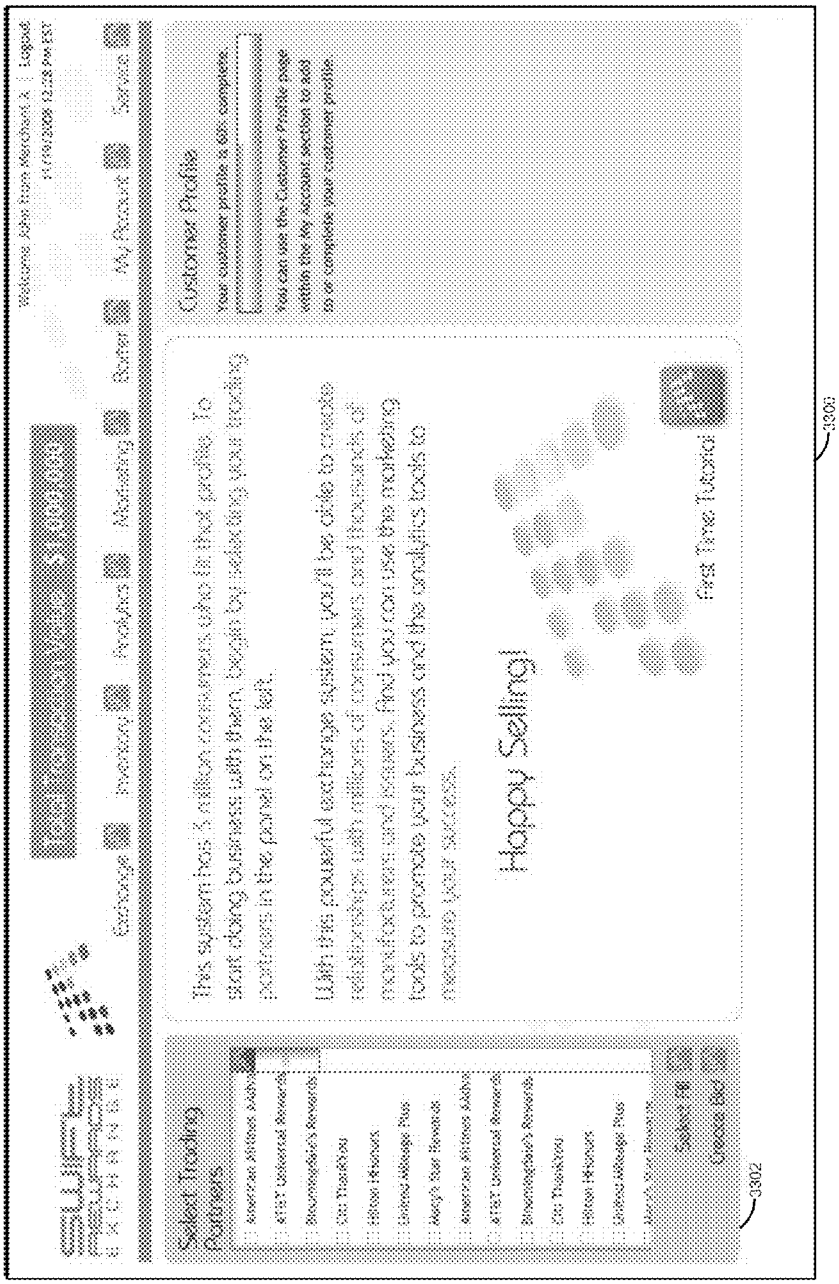
FIG. 33 is a screen shot of a merchant page with a trading partner selection portion.
Figure 34:
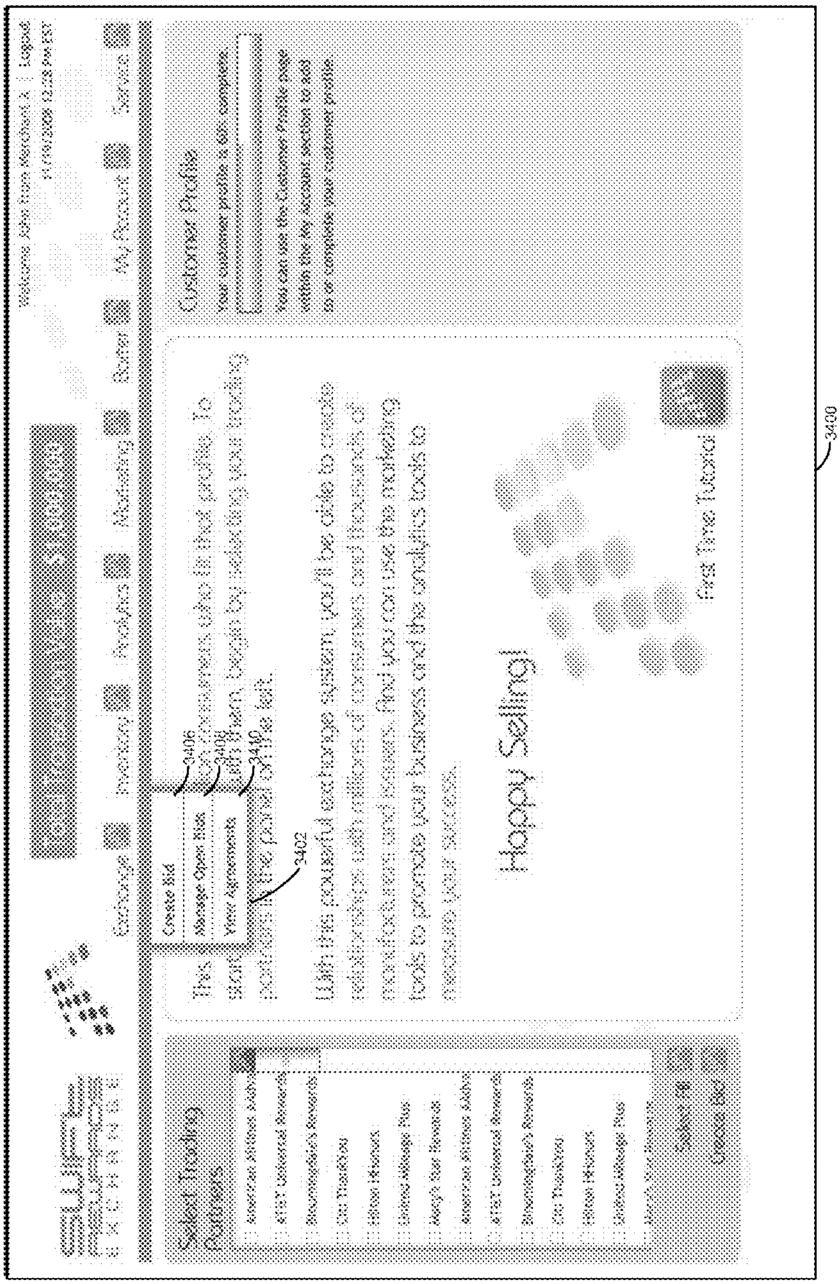
FIG. 34 is a screen shot of a merchant page with an Exchange menu item drop down list.

With respect to merchant interaction, a plurality of merchants also register with the exchange computer via the web site by using an associated merchant computer for providing merchant information that includes (i) product information that identifies at least one product to be offered for sale to the user via the exchange computer, and (ii) a designation of issuers registered with the exchange computer with which the merchant agrees to execute a reward redemption transaction when requested by the user. FIG. 29 is a screen shot of a merchant login page 2900 that is accessible by selecting the merchant button 138 from the home page of FIG. 1 or by direct entry of an appropriate URL. There, the merchant may login to the system as known in the art (name and password). If the merchant is new to the system, he may register via the new merchant registration page 3000 of FIG. 30. In FIG. 30, new merchants add their name and other contact information, the result of which is shown in the web page 3100 of FIG. 31. FIG. 32 is a screen shot of the merchant's home page 3200 that is accessed after logging in to the exchange computer 102. There, the merchant can enter desired customer profile information in the Customer Profile section 3202 on the right side, such as age range, marital status, income, etc. FIG. 33 is a screen shot of a merchant page 3300 with a trading partner selection portion 3302 on the left side. There, the merchant may select any or all of the issuers or other trading partners that are registered in the exchange system, such as Citi ThankYou, Hilton Honors, etc. FIG. 34 is a screen shot of a merchant page 3400 with an Exchange menu item drop down list 3402 that shows a Create Bid option 3406, a Manage Open Bids option 3408, and a View Agreements option 3410.

A merchant and an issuer may execute a trading agreement. The merchant may create a bid by selecting via the merchant computer a desired issuer from a group of issuers that are registered with the exchange, and entering into the merchant computer a desired redemption discount offer, the desired redemption discount offer being the amount that the merchant is willing to provide in a transaction with the selected issuer. The merchant submits the bid to the exchange computer, which then forwards the bid to the issuer computer of the desired issuer selected by the merchant in the bid. The issuer accepts the bid, rejects the bid, or counter proposes a modified bid in which a modified redemption discount is submitted to the exchange computer for forwarding to the merchant computer.

Figure 38:
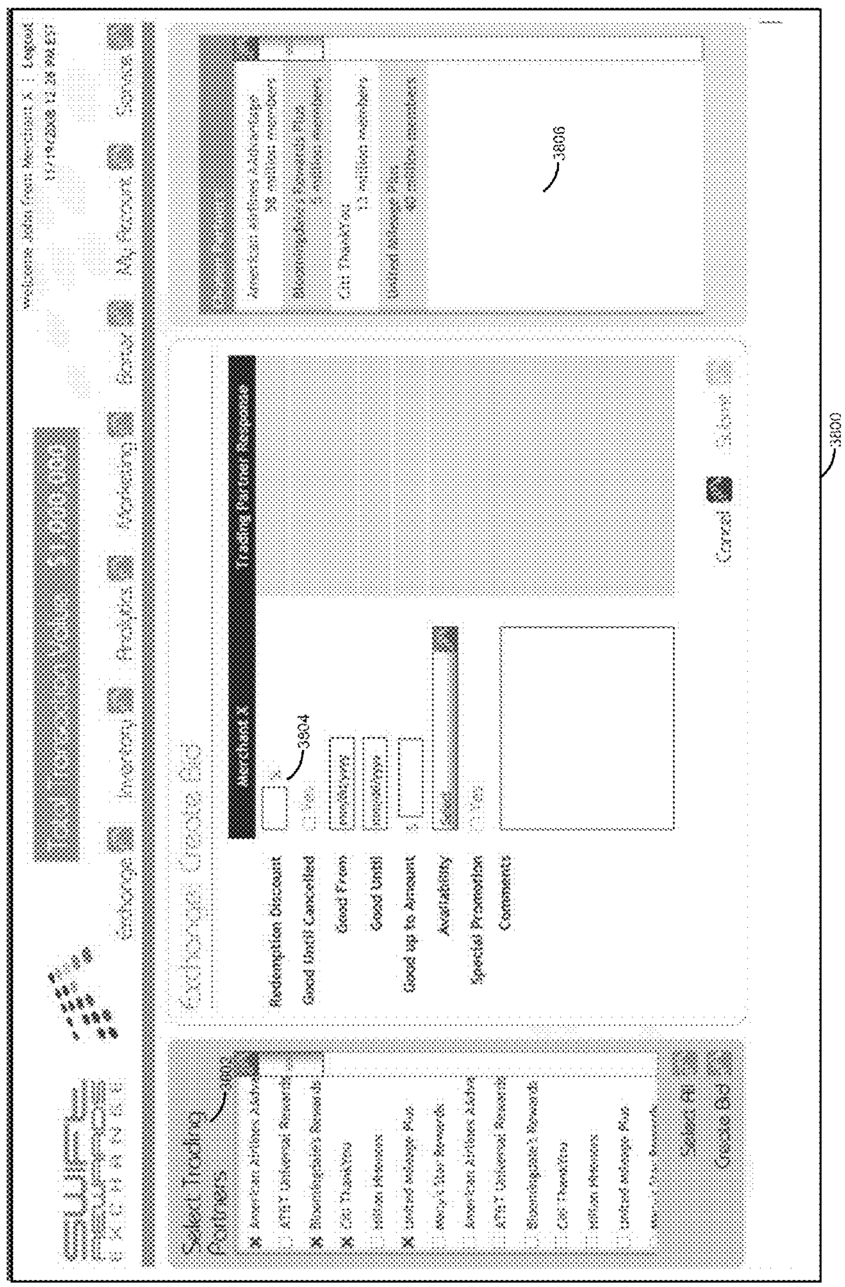
FIG. 38 is a screen shot of a merchant page for creating an exchange bid.
Figure 39:
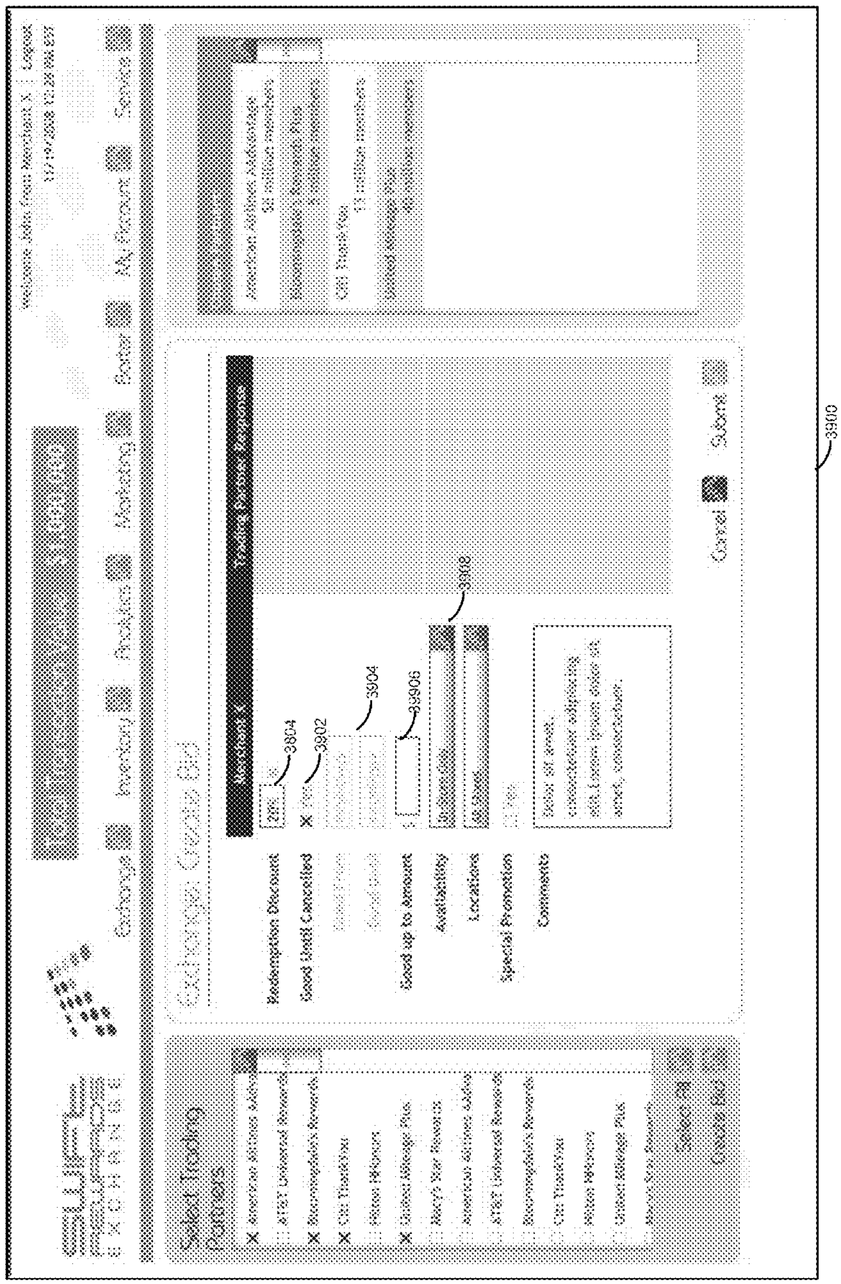
FIG. 39 is a screen shot of the merchant page of FIG. 38 in which bid data has been entered.

Thus, if the merchant selects Create Bid 3406, then the web page 3800 of FIG. 38 is presented. The merchant selects the desired trading partners on the Select Trading Partners section 3802 to whom the bid will be presented by the exchange computer 102. The merchant then enters the desired Redemption Discount 3804, which is the discount that the merchant is willing to provide in a transaction with the issuer selected in section 3802. For example, as shown in the web page 3900 of FIG. 39, the merchant has entered a desired 20% discount into box 3804. If this were accepted by the issuer(s) to whom the bid is submitted, then the merchant would only charge $80 for a $100 MSRP item, for example. The merchant can also select in box 3902 if it wants to keep the bid good (open) until cancelled or set a time frame for expiration in boxes 3904. The merchant can also set a cap up in box 3906 to which the amount of transactions can be executed at the set discount rate. The merchant can also set other options such as availability (e.g. in-store, web, etc.) in drop down list 3908 as well as special promotions. Once the bid data is entered by the merchant, the bid is submitted into the exchange computer 102 and stored in issuer/merchant bid database 119 as shown in FIG. 1*b*.

The bid is then forward to the trading partner selected by the merchant. Once the trading partner reviews the bid, it will submit a response to the exchange computer 102 that is forwarded back to the merchant and displayed in the Chosen Partners column 3806 indicated in FIG. 38. Chosen Partners column 3806 indicates the chosen trading partners as well as the number of members of that partner.

Certain parameters may exist in the system to automatically block bids from a merchant from being sent to the issuer. An issuer may have designated certain issuer preferences (for example stored in issuer profiles database 118) that indicate the issuer's rules for executing a trading partnership with a merchant. For example, an issuer may designate that it will not execute an agreement with any merchant having annual sales less than X amount. When the merchant submits a bid, the system can filter out the merchants that do not meet the issuer's criteria and automatically respond to the merchant without having to submit the bid to the issuer. This auto-reject criteria may be modified by the issuer as desired.

In an alternative embodiment, an issuer receives multiple requests/bids from merchants through the system which first does a credit check, removing those who do not meet the standards of the issuer, scans for blocked categories such as escort services, liquor or tobacco products and previously blocked merchants. Of the merchants who pass, the system then looks at the product category offered by the merchant, his geography and sales volume for desirability and is automatically approved, rejected with a minimum discount required to establish a trading relationship based upon the algorithms that establish the value of the merchant to the issuer.

Figure 40:
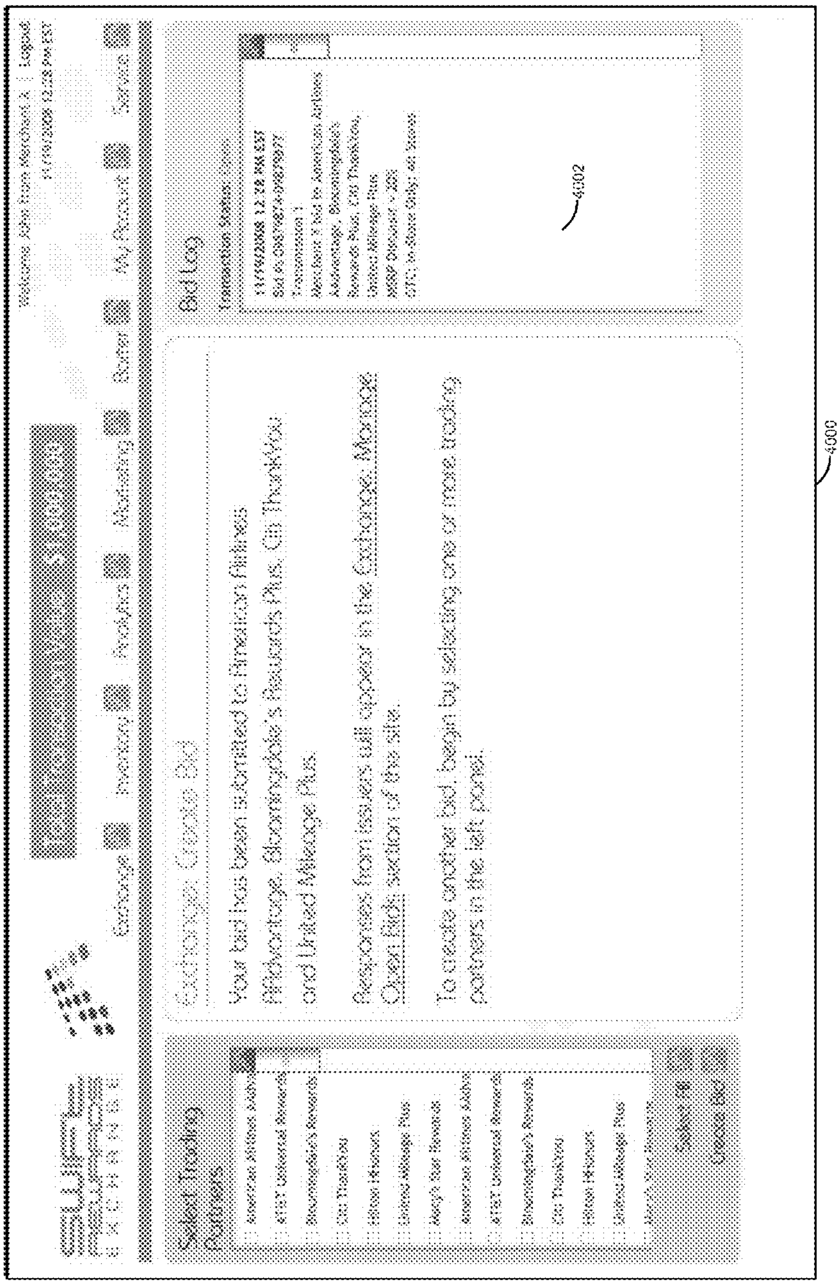
FIG. 40 is a screen shot of a merchant page in which the bid has been submitted.
Figure 41:
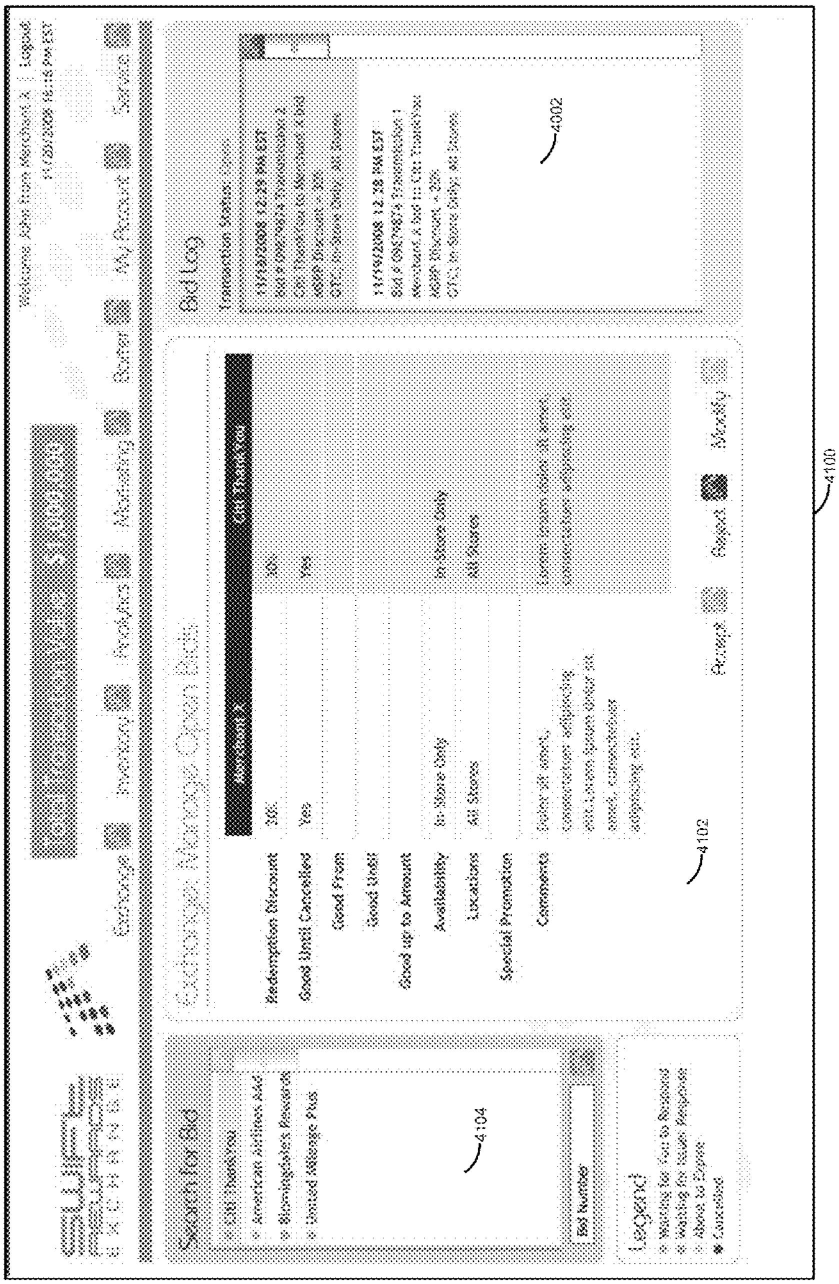
FIG. 41 is a screen shot of a merchant page in which open bids may be searched, selected and managed.

FIG. 40 is a screen shot of a merchant page 4000 in which the bid has been submitted. A Bid Log 4002 displays each bid made by the merchant, including pertinent details of that bid. FIG. 41 is a screen shot of a merchant page 4100 in which open bids may be searched in section 4104, selected and managed in section 4102. The Search for Bid section 4104 displays the open bids of that merchant. The merchant may select an open bid from that list and review its details. Shown in FIG. 41 is the detail in section 4102 of a bid made to Citi ThankYou, in which the issuer (Citi ThankYou) has made a counter-offer back to the merchant in the amount of a 30% discount. That is, Citi ThankYou has rejected the 20% discount offer and instead counter proposes that this merchant provide a 30% discount. The issuer would rather have the higher 30% discount since it means that it would only have to pay the merchant $70 for a $100 MSRP item, while retiring $100 worth of reward points of the user (e.g. 10,000 points). A log of the bids made back and forth will be displayed in the Bid Log 4002 on the right side.

Figure 42:
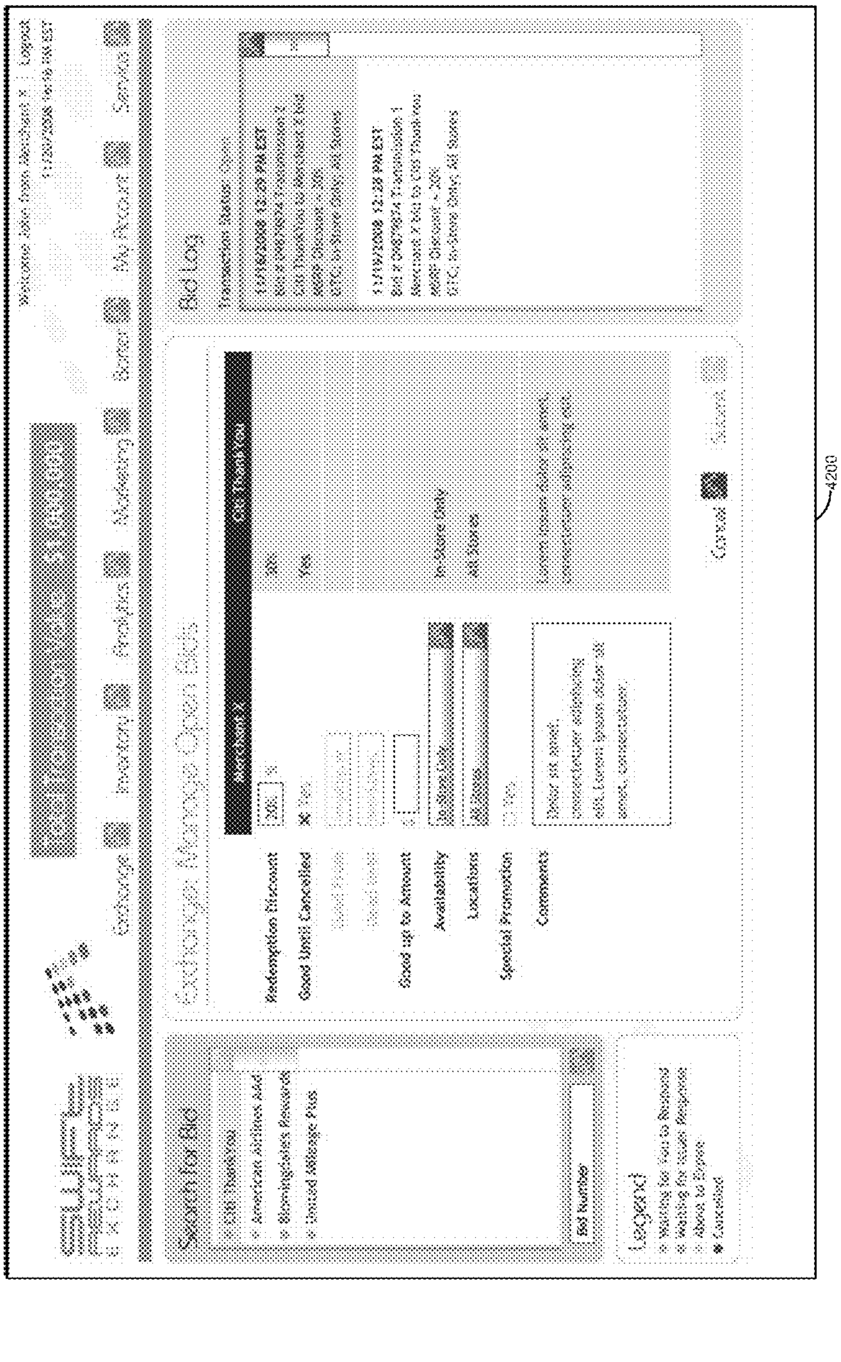
FIG. 42 is a screen shot of a merchant page in which a bid is selected for review.
Figure 43:
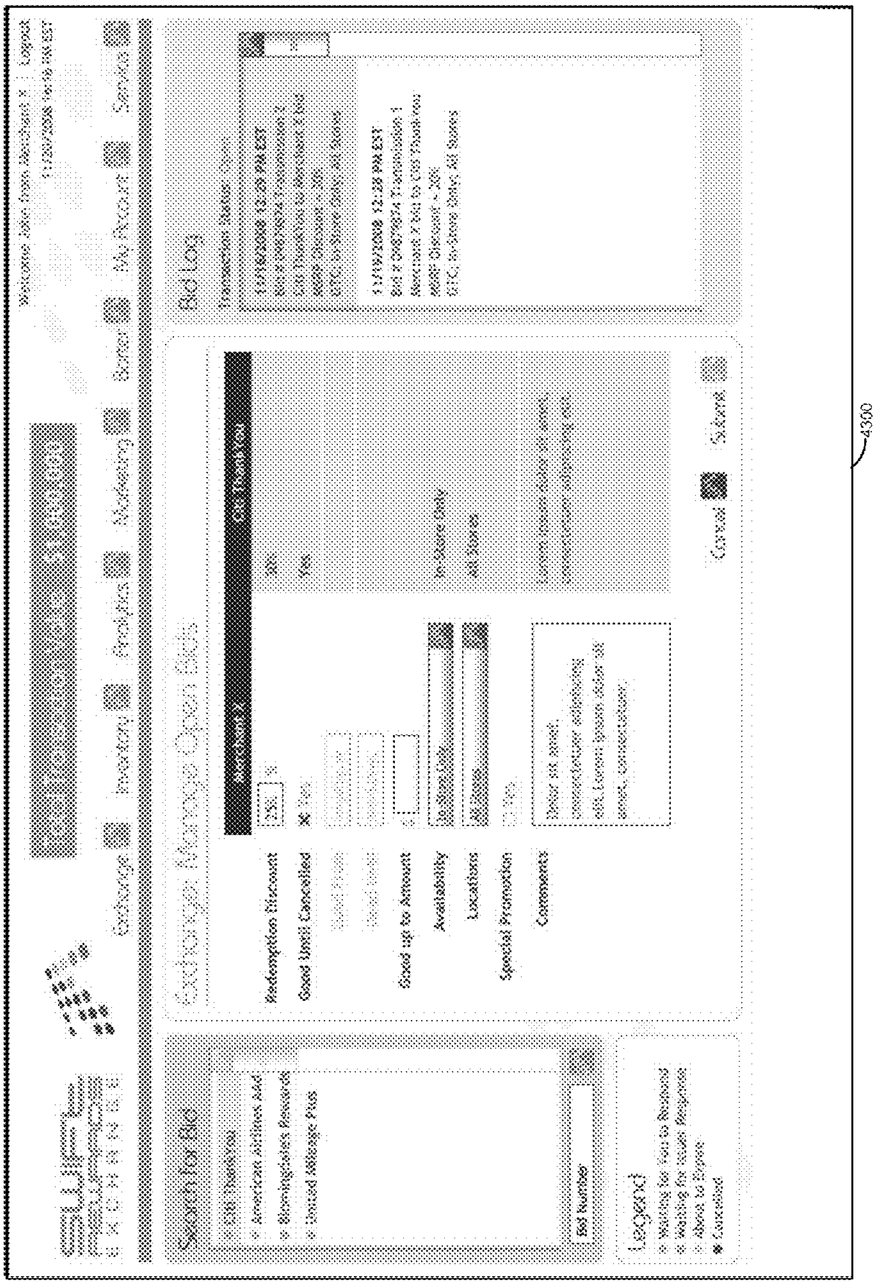
FIG. 43 is a screen shot of a merchant page in which a counter-offer is provided.
Figure 44:
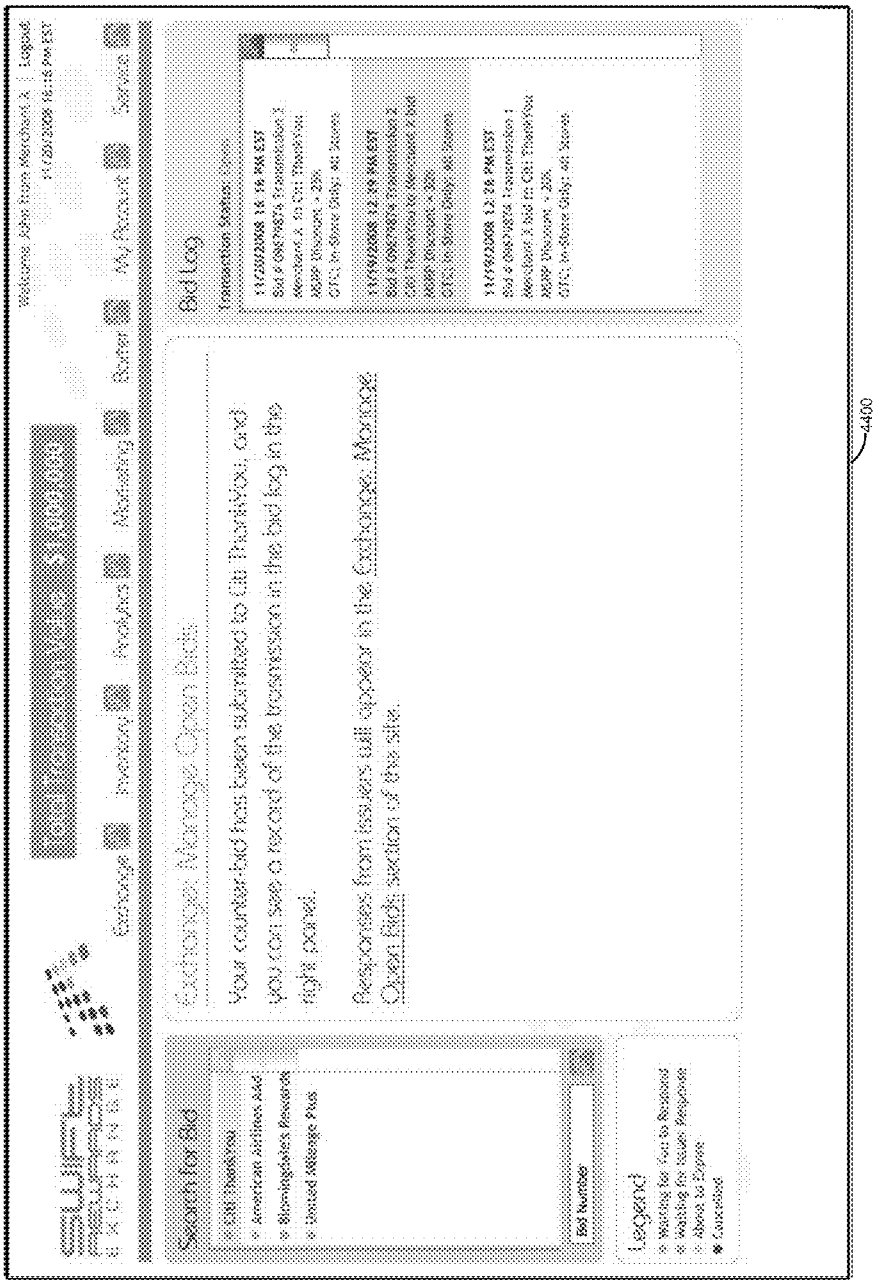
FIG. 44 is a screen shot of a merchant page in which a counter-offer is submitted.
Figure 45:
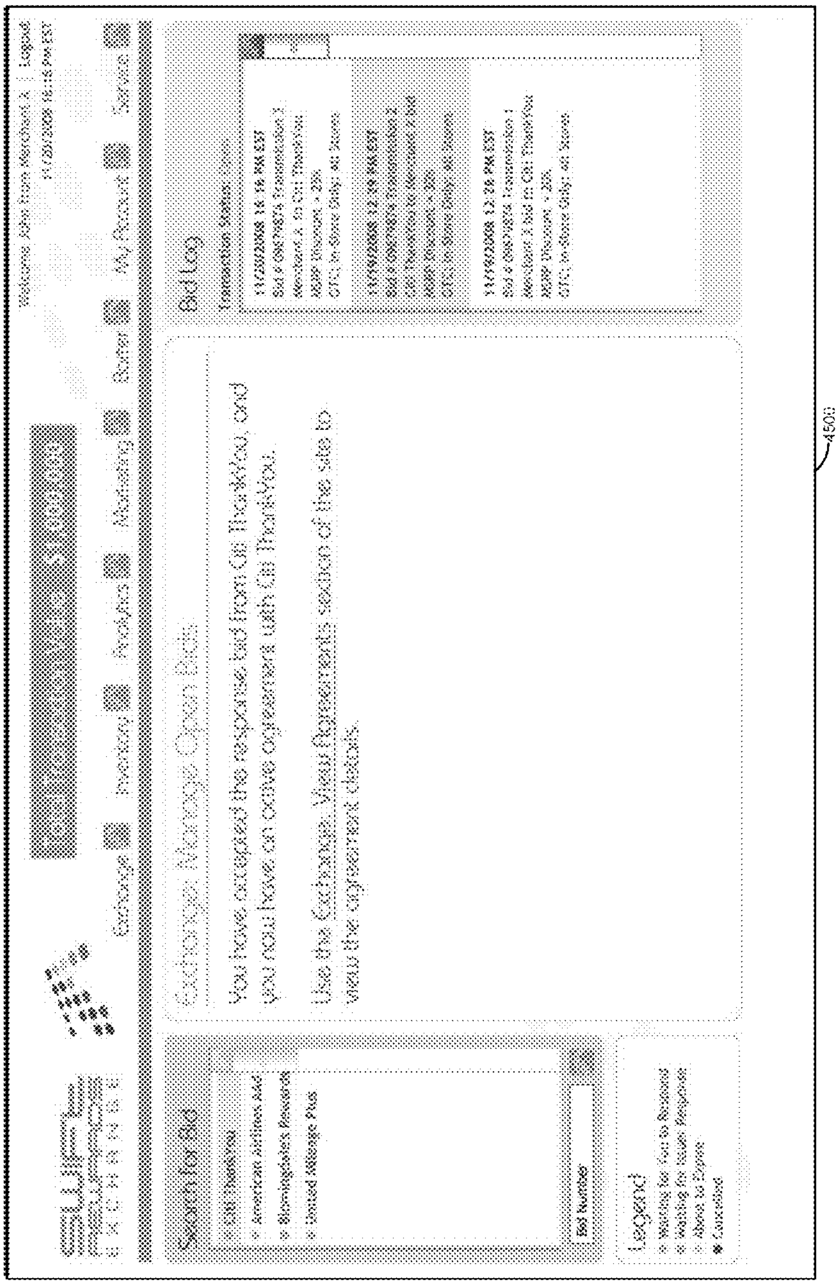
FIG. 45 is a screen shot of a merchant page in which a bid is accepted.

FIG. 42 is a screen shot of a merchant page 4200 in which a bid is selected for review. FIG. 43 is a screen shot of a merchant page 4300 in which a further counter-offer is provided, for example the merchant here has entered a proposed discount of 25%. This will be submitted back to the issuer via the exchange until the parties either reach an agreement or cease negotiations. FIG. 44 is a screen shot of a merchant page 4400 in which a counter-offer is submitted. FIG. 45 is a screen shot of a merchant page 4500 in which a response bid is accepted by the merchant.

Figure 46:
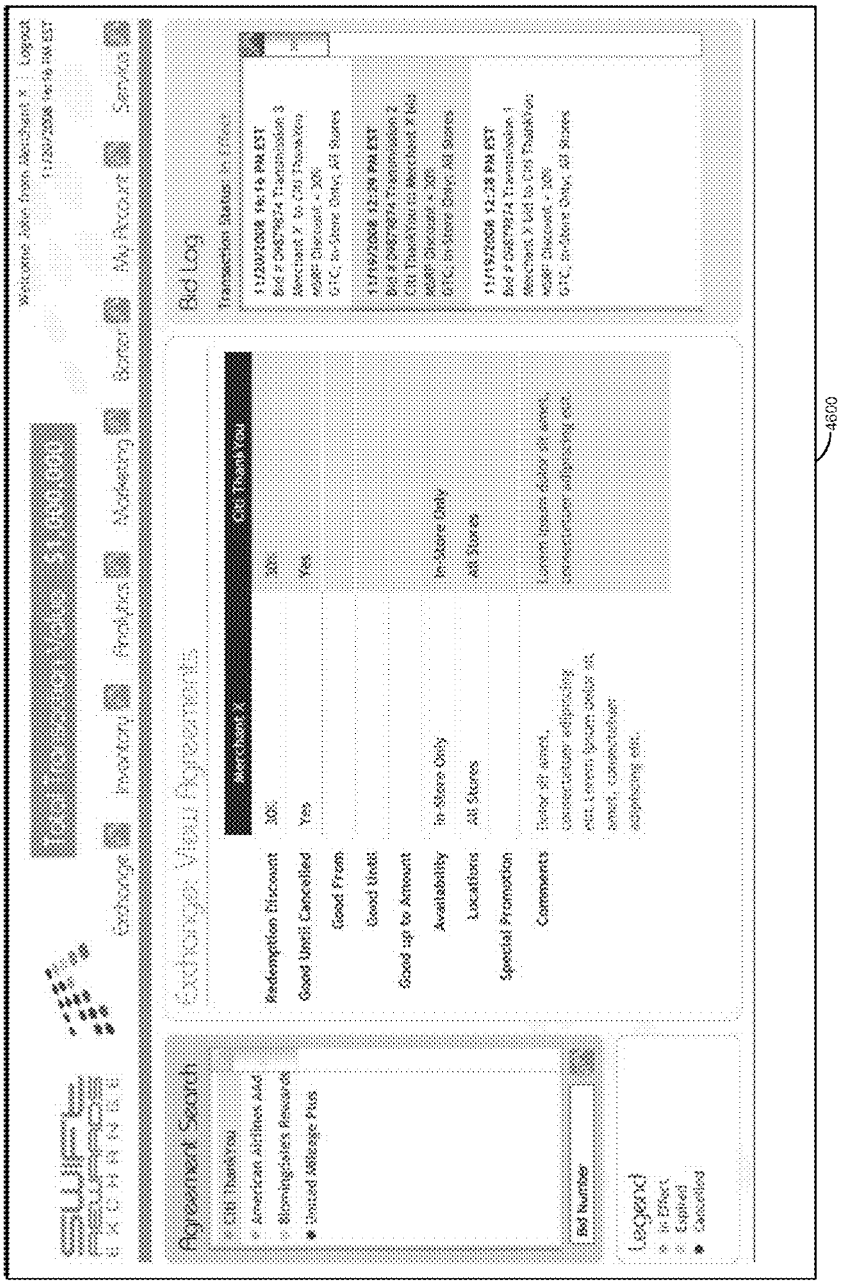
FIG. 46 is a screen shot of a merchant page in which accepted bid agreements may be viewed.

FIG. 46 is a screen shot of a merchant page 4600 in which accepted bid agreements may be viewed.

Figure 46A:
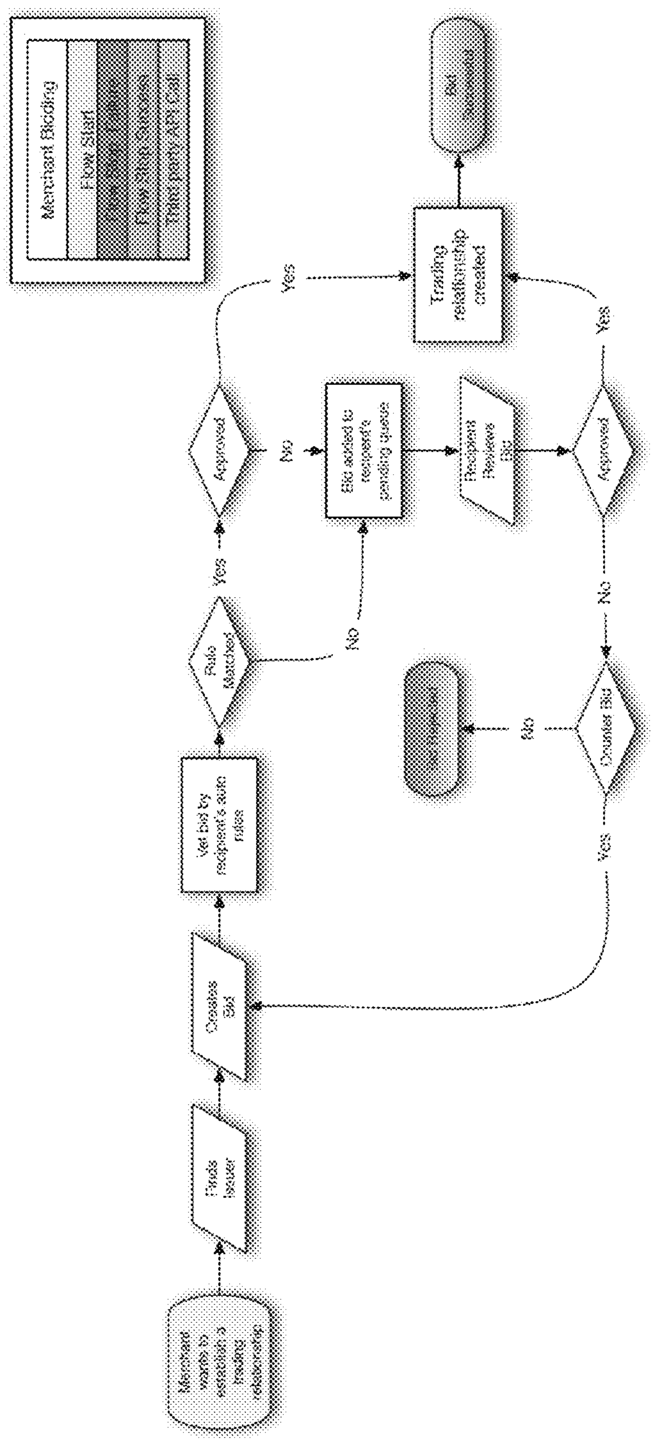
FIG. 46*a* is a flowchart illustrating the merchant bidding process.
Figure 46B:
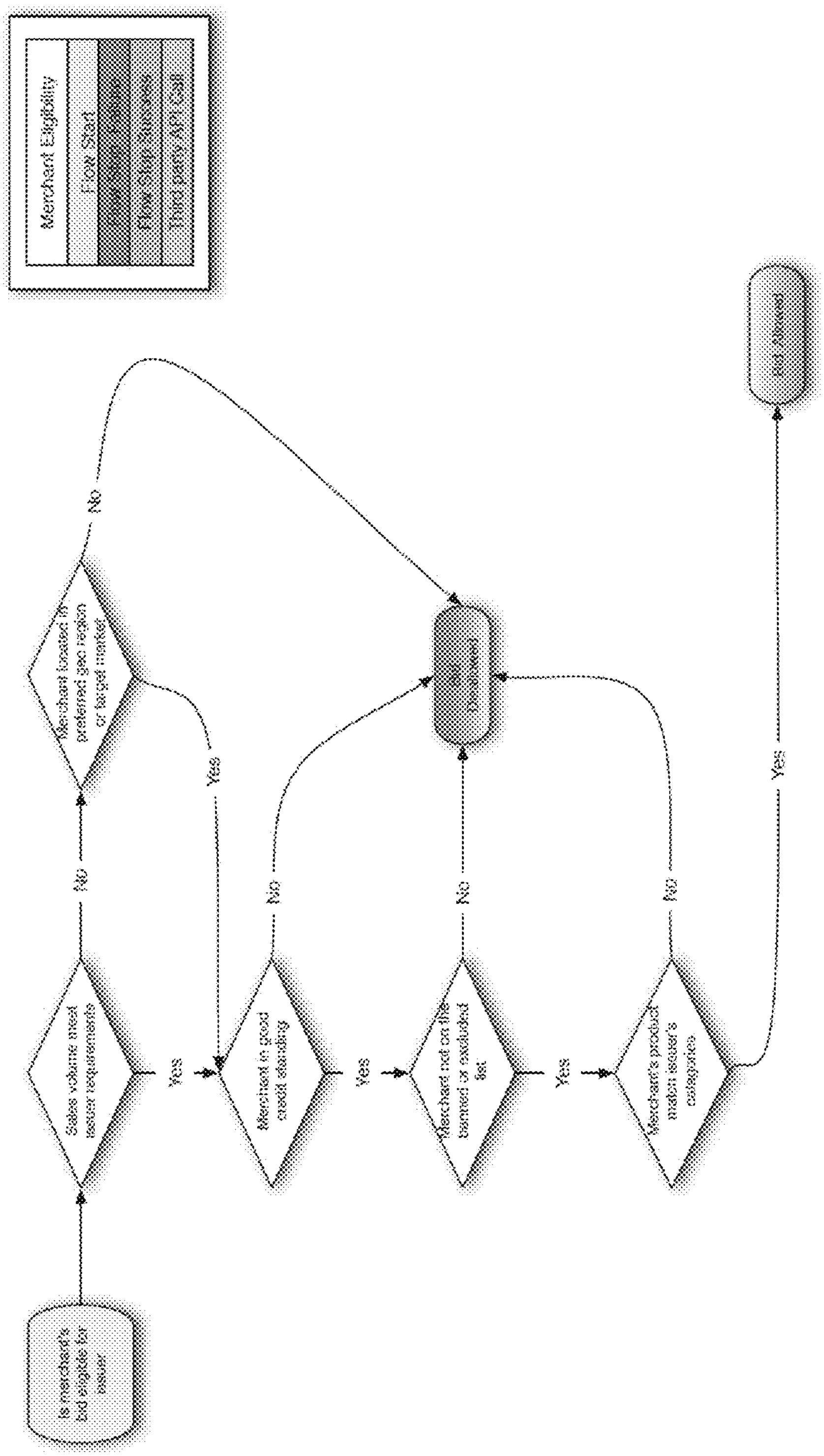
FIG. 46*b* is a flowchart illustrating the merchant eligibility process.

This bidding process described above is managed by the bidding engine 154 of the exchange computer 102 in association with the issuer/merchant bids database 119, which are shown in FIG. 1*b*. FIG. 46*a* also illustrates this process, in which a merchant that wants to establish a trading relationship with an issuer will find an issuer via the web page, then create the desired bid that is checked against the issuer profile in the issuer profile database 118. If the bid meets a predefined rule from that issuer's profile (such as "accept all bids under 10% discount), then the bid is approved an the trading relationship is automatically created. If the rule is not met then the bid is queued and sent to the issuer for review. The bid could be accepted or rejected, in which case a counter-bid may be made by the issuer and returned to the merchant via the exchange computer.

Further checks on the bid may be made with respect to merchant eligibility as illustrated in FIG. 46(*b*). In order to determine if the merchant's bid is eligible for the selected issuer, several criteria are reviewed. For example, the merchant's sales volume is checked to see if it meets the issuer's defined requirements. Also, the merchant must be in good credit standing (have the required credit rating). The merchant is cross-checked against a list of banned or excluded merchants. Finally, the merchant's products must match the issuer's stated categories. Assuming all of these (and perhaps other) criteria have been met, then the bid will be allowed to be made. If any criteria fail, then the bid is disallowed.

Figure 35:
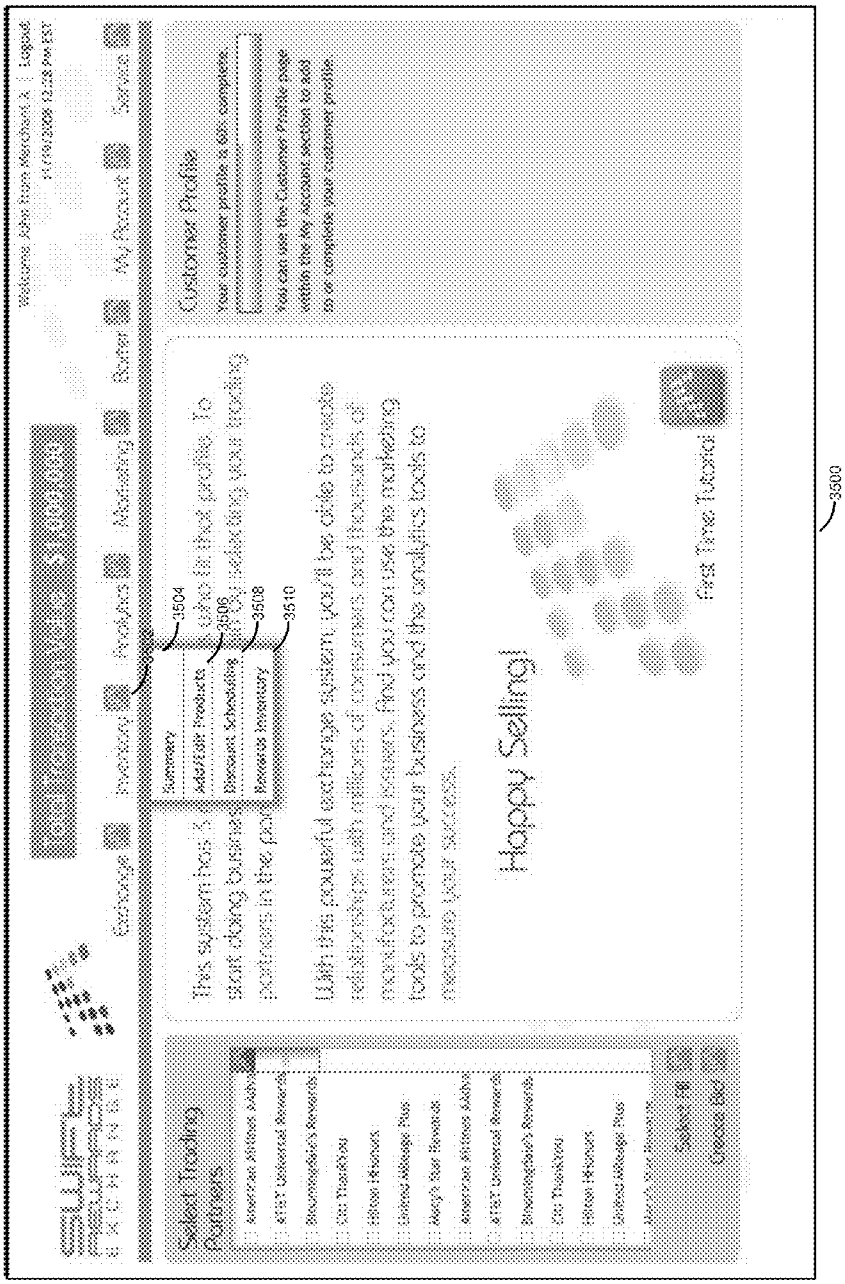
FIG. 35 is a screen shot of a merchant page with an Inventory menu item drop down list.
Figure 47:
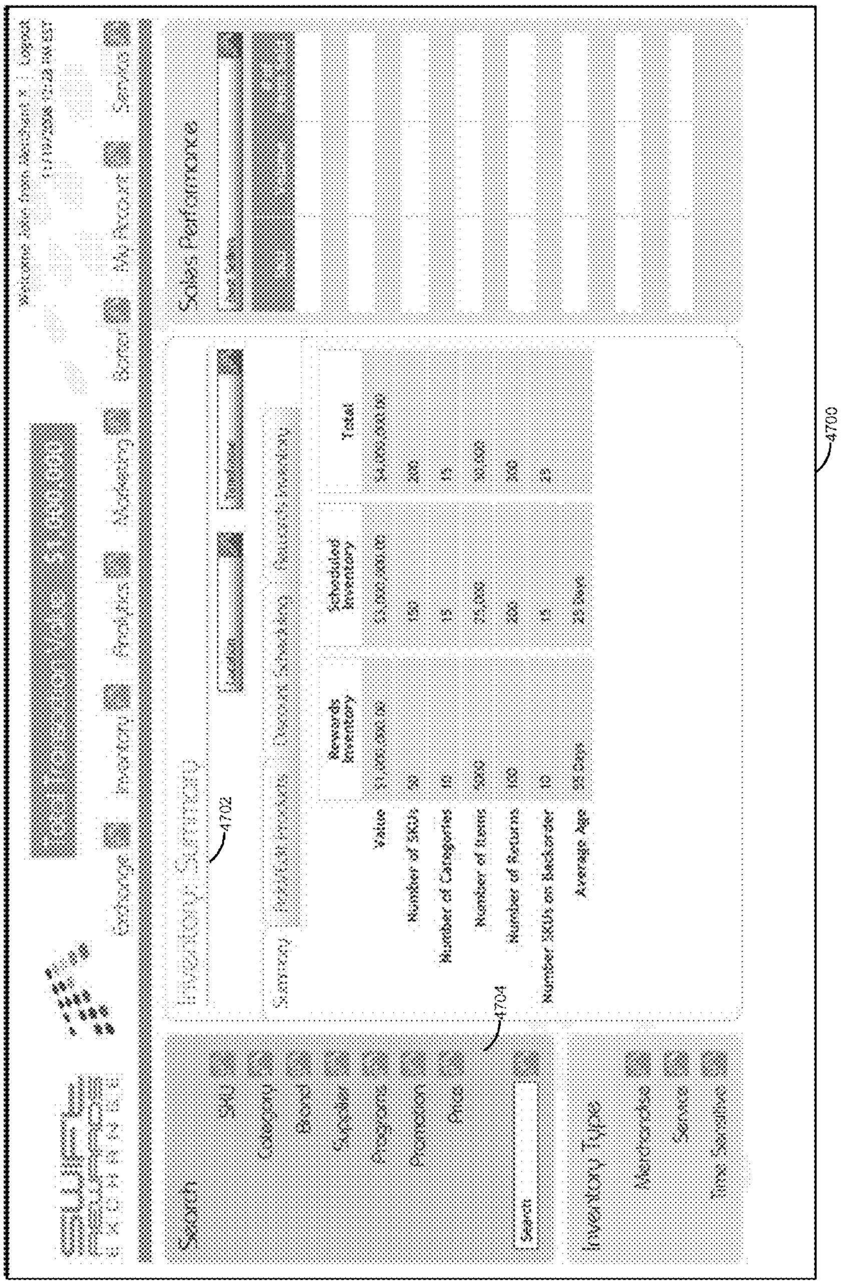
FIG. 47 is a screen shot of a merchant page in which the inventory summary is presented.

FIG. 35 is a screen shot of a merchant home page 3500 with an Inventory menu item drop down list 3502 that sets forth the options of Summary 3504, Add/Edit products 3506, Discount Scheduling 3508, and Rewards Inventory 3510. This is the vehicle by which merchants are able to enter their available products and services into the system for storage in the product database 117 and searching and subsequent purchase by an interested user as described above. For example, FIG. 47 is a screen shot of a merchant page 4700 in which the inventory summary is presented in section 4702. This displays a summary of the value of the reward inventory, the scheduled inventory, and the total inventory. Also shown for informational purposes are the number of SKUs, categories, items, returns, etc.

Also shown is a Search engine panel 4704 on the left side in which the merchant can search the inventory by SKU, category, brand, supplier, programs, promotion and price, as well as a free-form text entry search box. The merchant can also select to search for merchandise, services, or time-sensitive items as shown.

Figure 48:
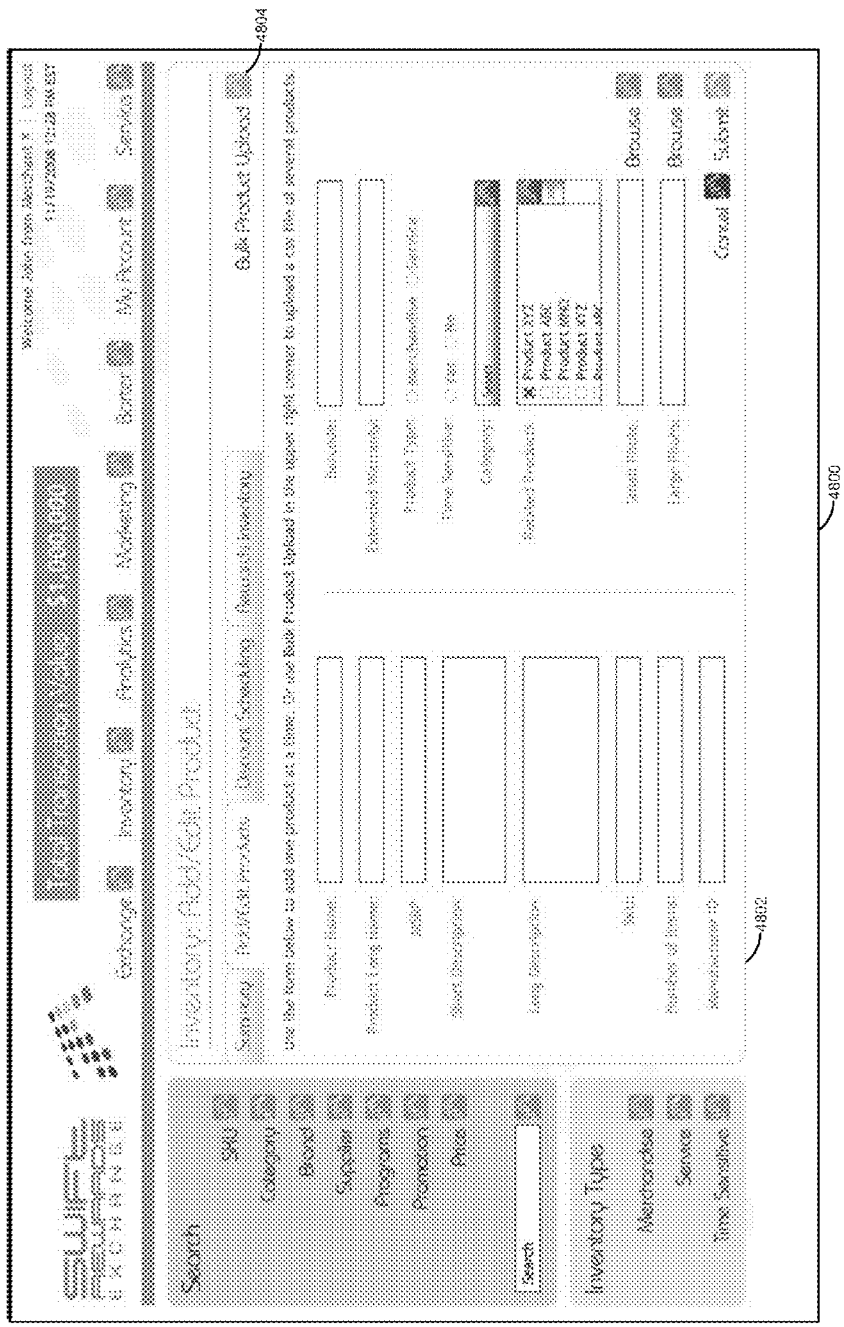
FIG. 48 is a screen shot of a merchant page in which inventory may be added or edited.
Figure 48A:
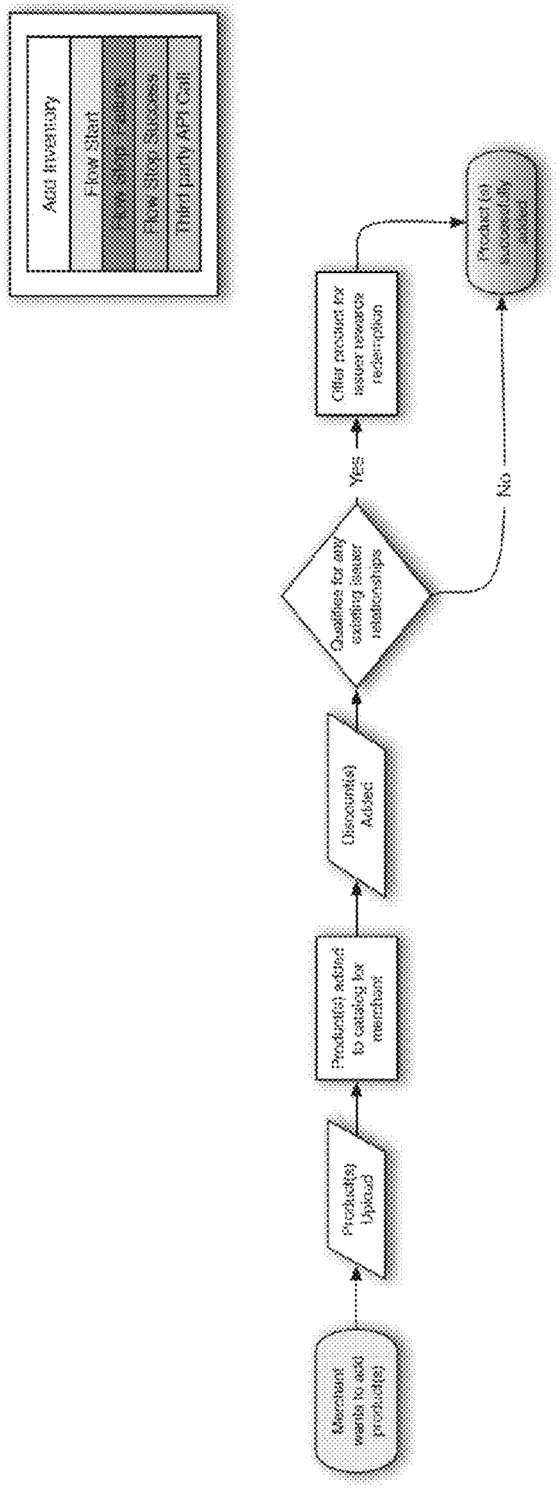
FIG. 48*a* is a flowchart illustrating the process of a merchant adding inventory.

FIG. 48 is a screen shot of a merchant page 4800 in which inventory may be added or edited. Reference is also made to the process flowchart of FIG. 48*a*. Entry fields are presented in section 4802 for product name and related information as shown. As such, product descriptions and quantities may be added by the merchant for all the products (and services) he wishes to make available on the exchange.

Figure 48B:
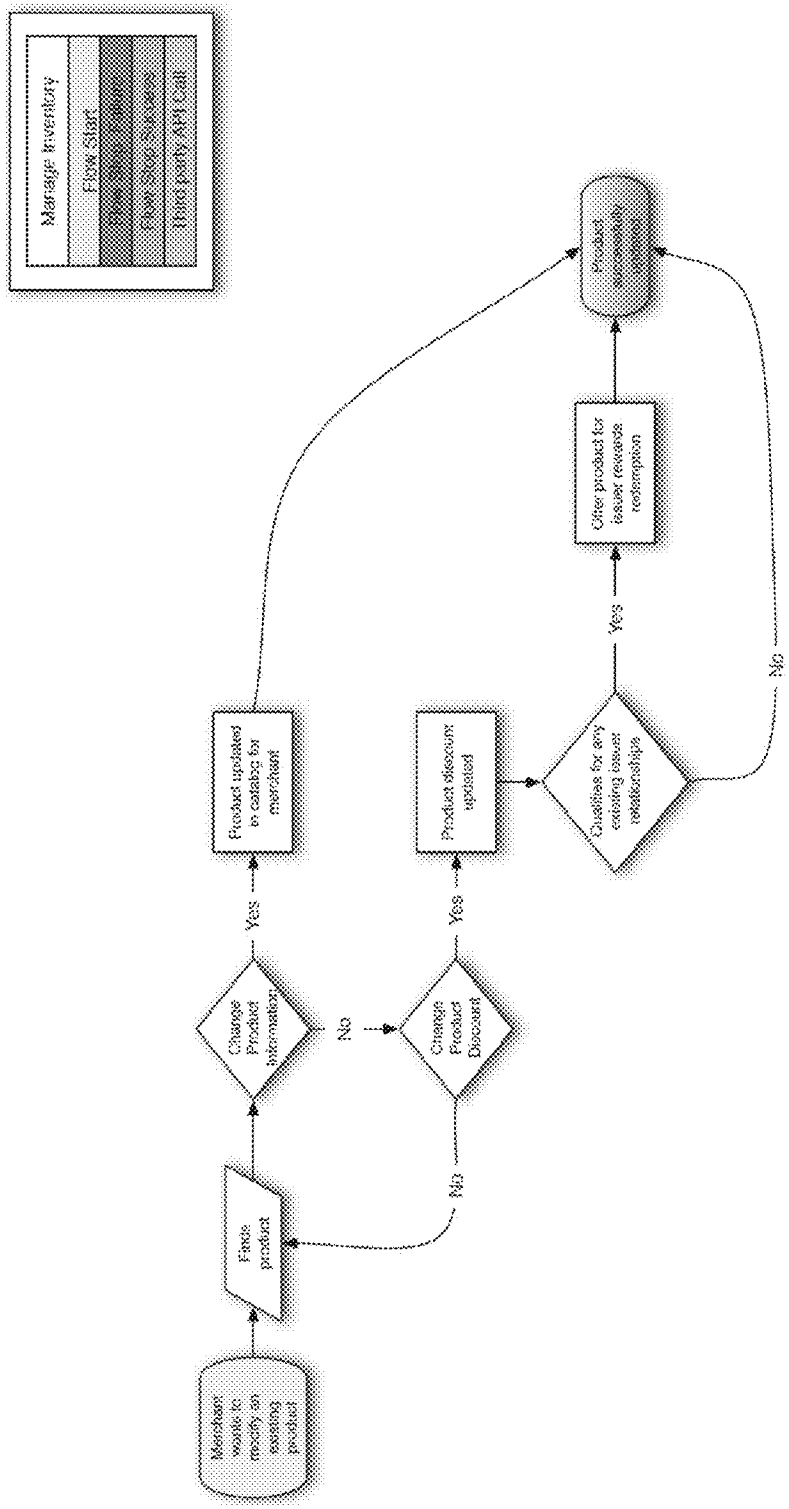
FIG. 48*b* is a flowchart illustrating the process of a merchant managing inventory.
Figure 48C:
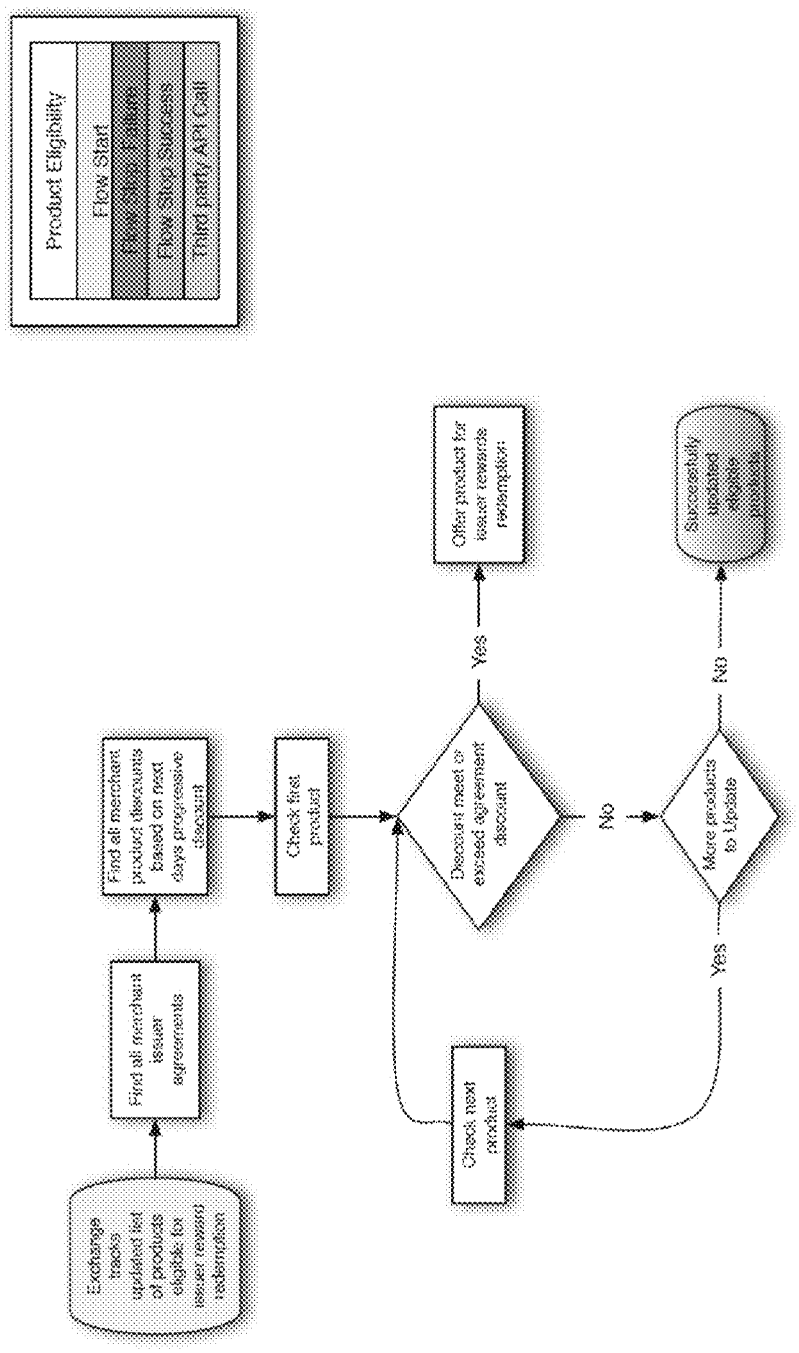
FIG. 48*c* is a flowchart illustrating the process of product eligibility.

In the alternative, a Bulk Product Upload function 4804 may be selected in which a file is uploaded that contains all of the required information, thus eliminating the need for manual entry. Inventory may be managed as shown by the process flow of FIG. 48*b*, and product eligibility is determined as shown by the process flow of FIG. 48*c*.

Figure 49:
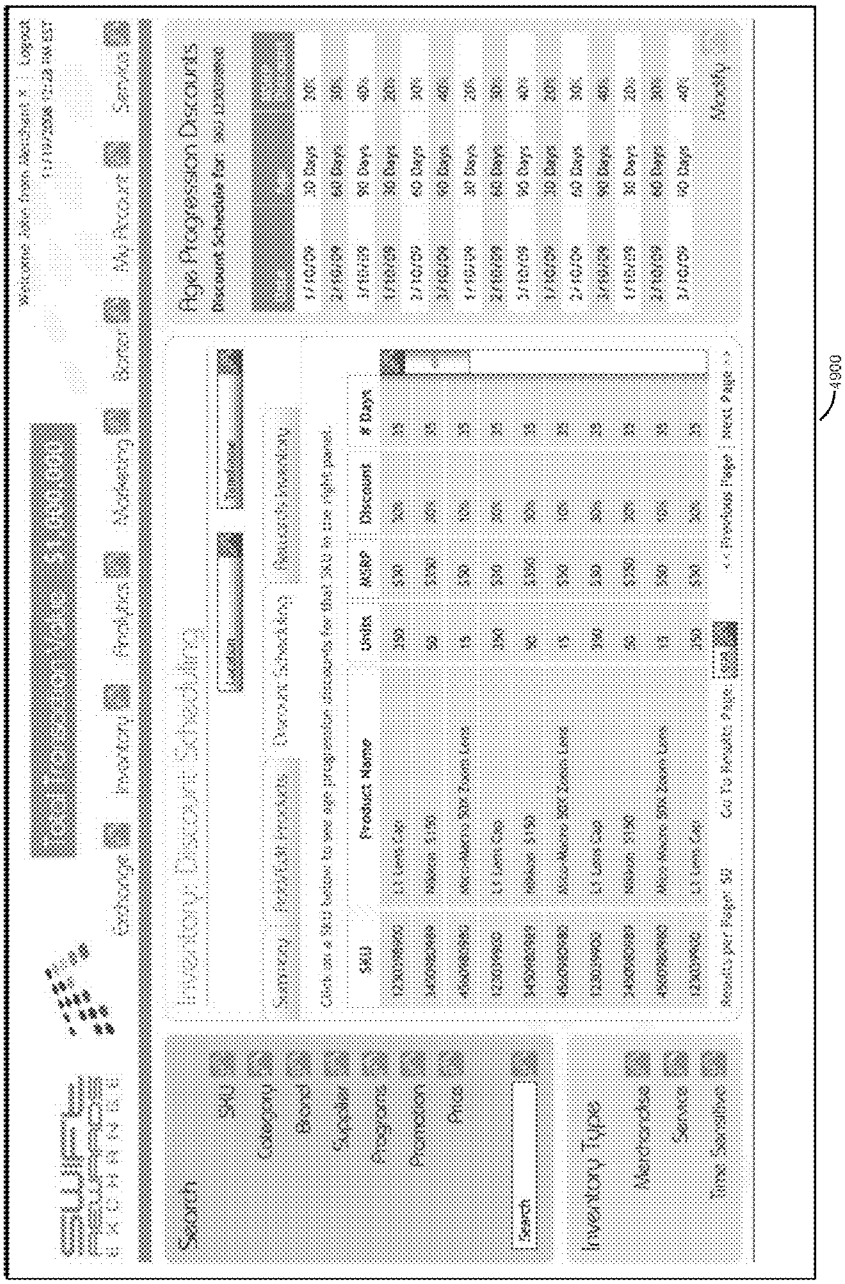
FIG. 49 is a screen shot of a merchant page in which discount scheduling may be implemented.
Figure 50:
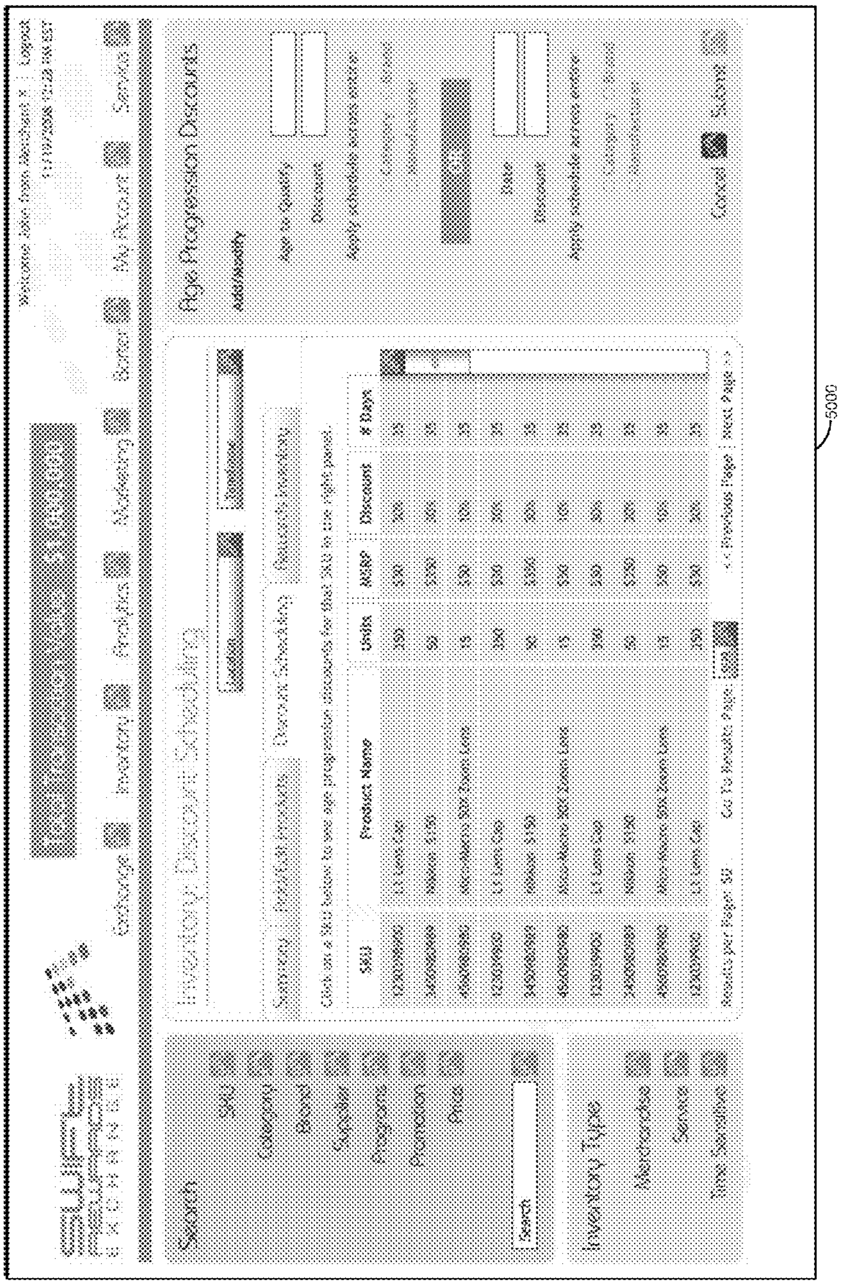
FIG. 50 is a screen shot of a merchant page in which discount scheduling may be modified.
Figure 51:
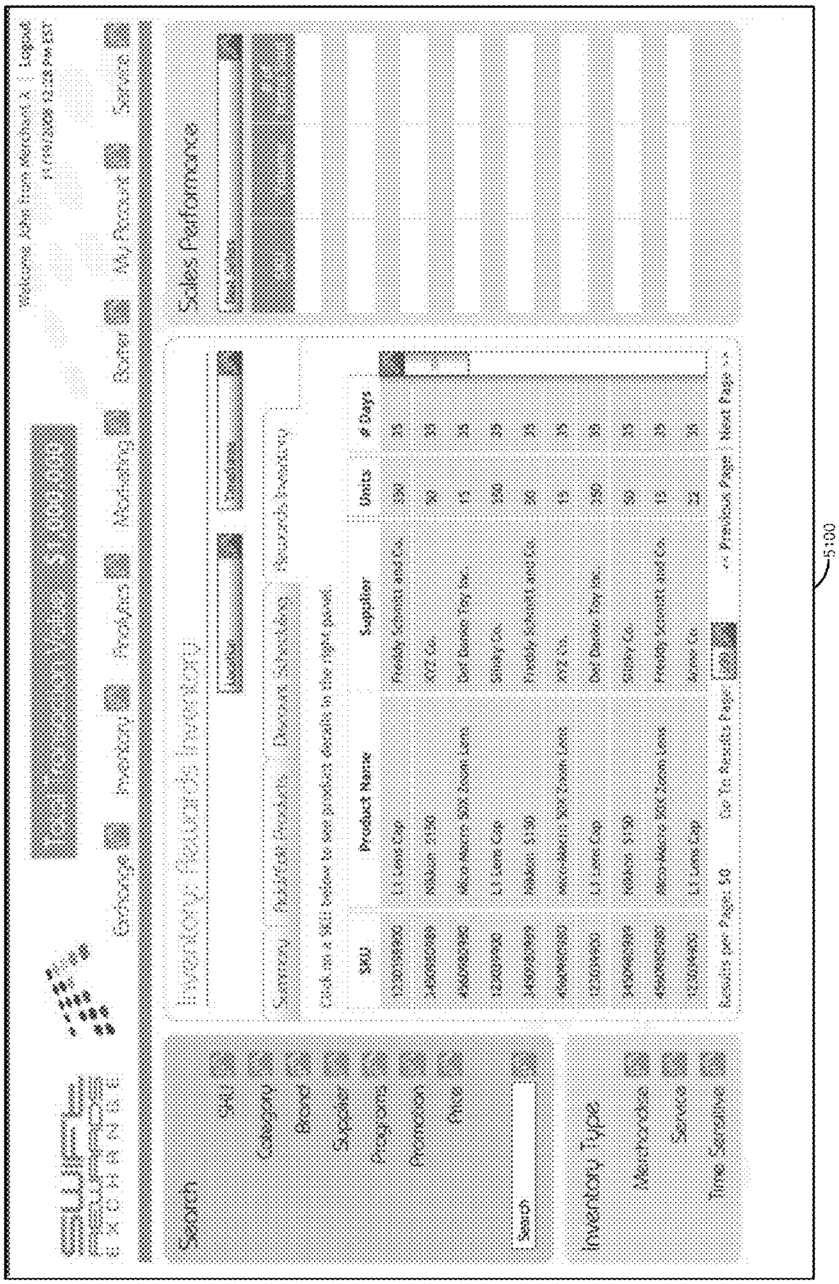
FIG. 51 is a screen shot of a merchant page in which rewards inventory is shown.
Figure 52:
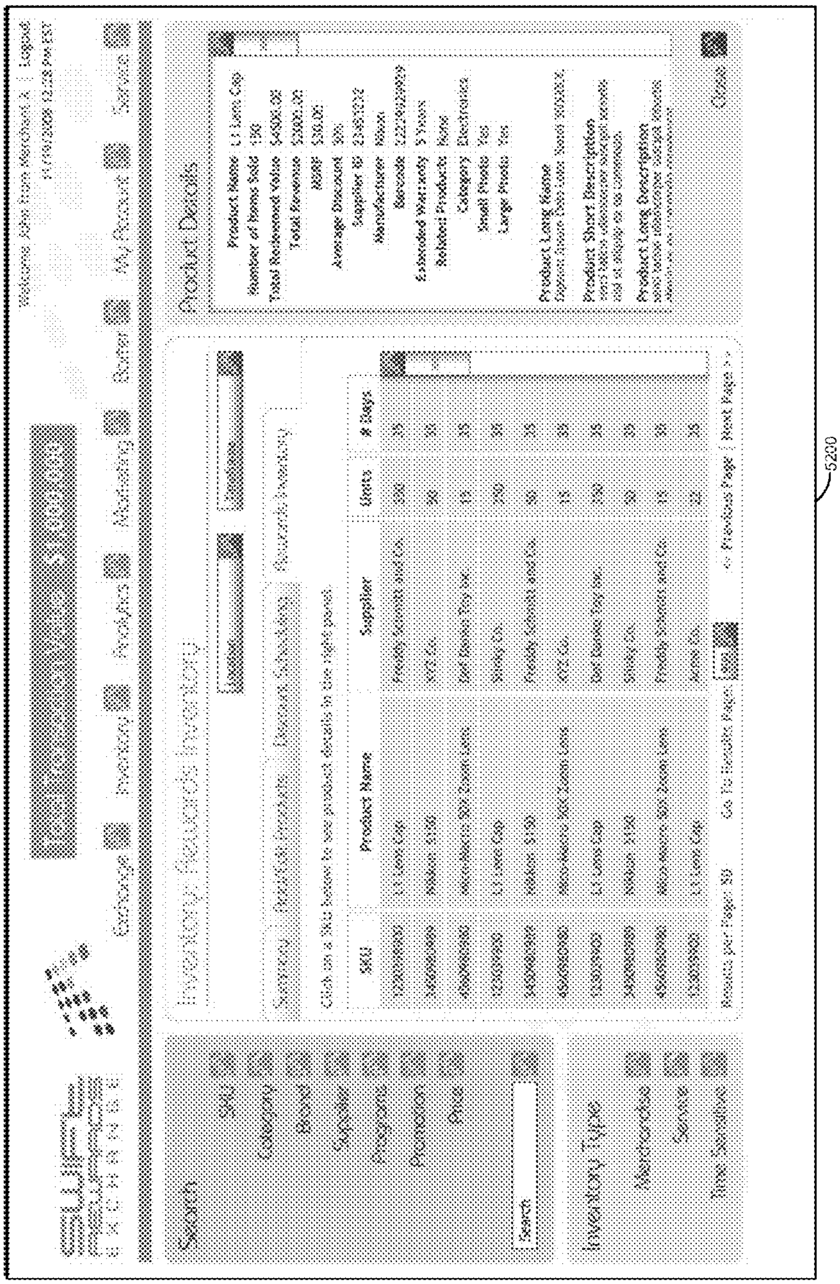
FIG. 52 is a screen shot of a merchant page in which rewards inventory detail is shown.

FIG. 49 is a screen shot of a merchant page 4900 in which discount scheduling may be implemented in accordance with this invention. FIG. 50 is a screen shot of a merchant page 5000 in which discount scheduling may be modified. Here the merchant may enter a schedule of price discounts that will be automatically generated based on the schedule entered. For example, a product may be provided with a 20% discount for 30 days, then 30% for the next 30 days, etc. This progression discount schedule may be modified by the merchant as desired. Similar functionality is provided for rewards inventory as shown in web page 5100 in FIG. 51. FIG. 52 is a screen shot of a merchant page 5200 in which rewards inventory detail is shown.

Figure 36:
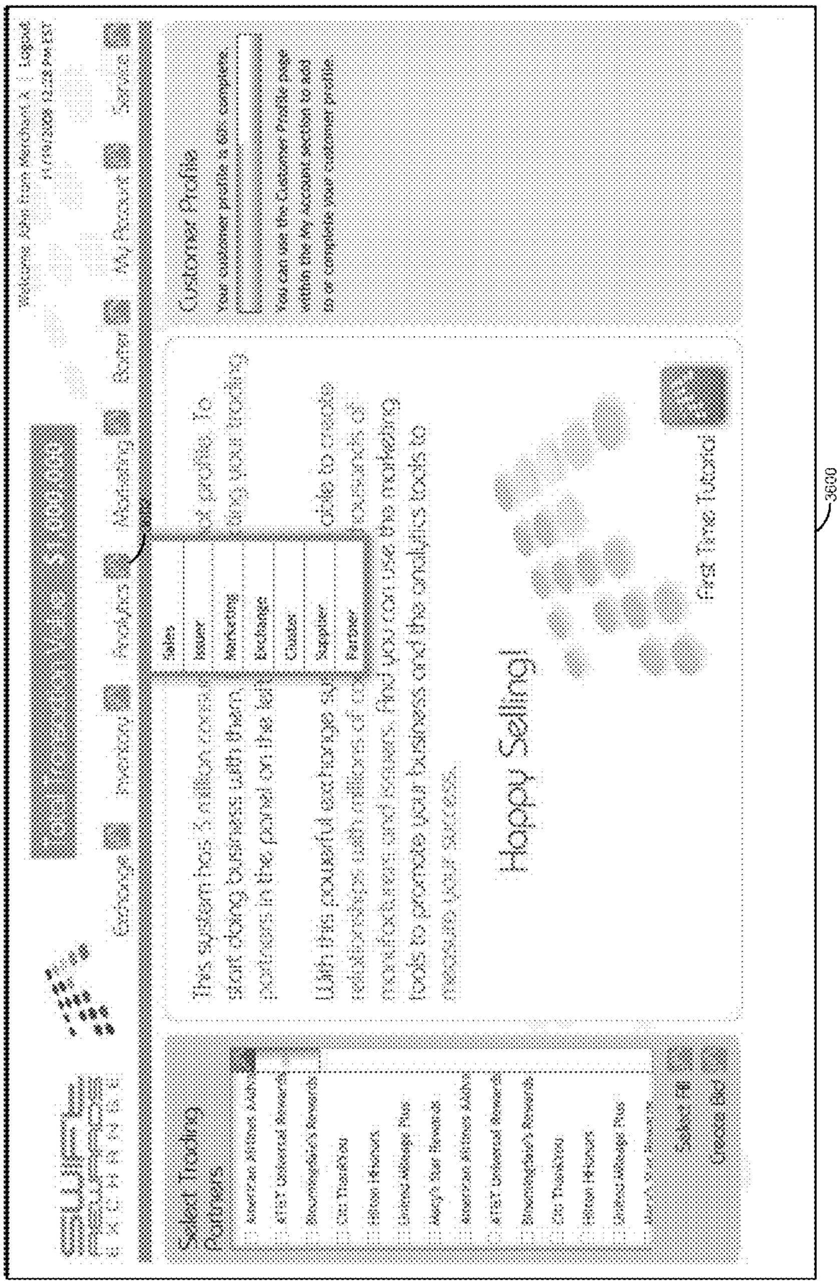
FIG. 36 is a screen shot of a merchant page with an Analytics menu item drop down list.
Figure 37:
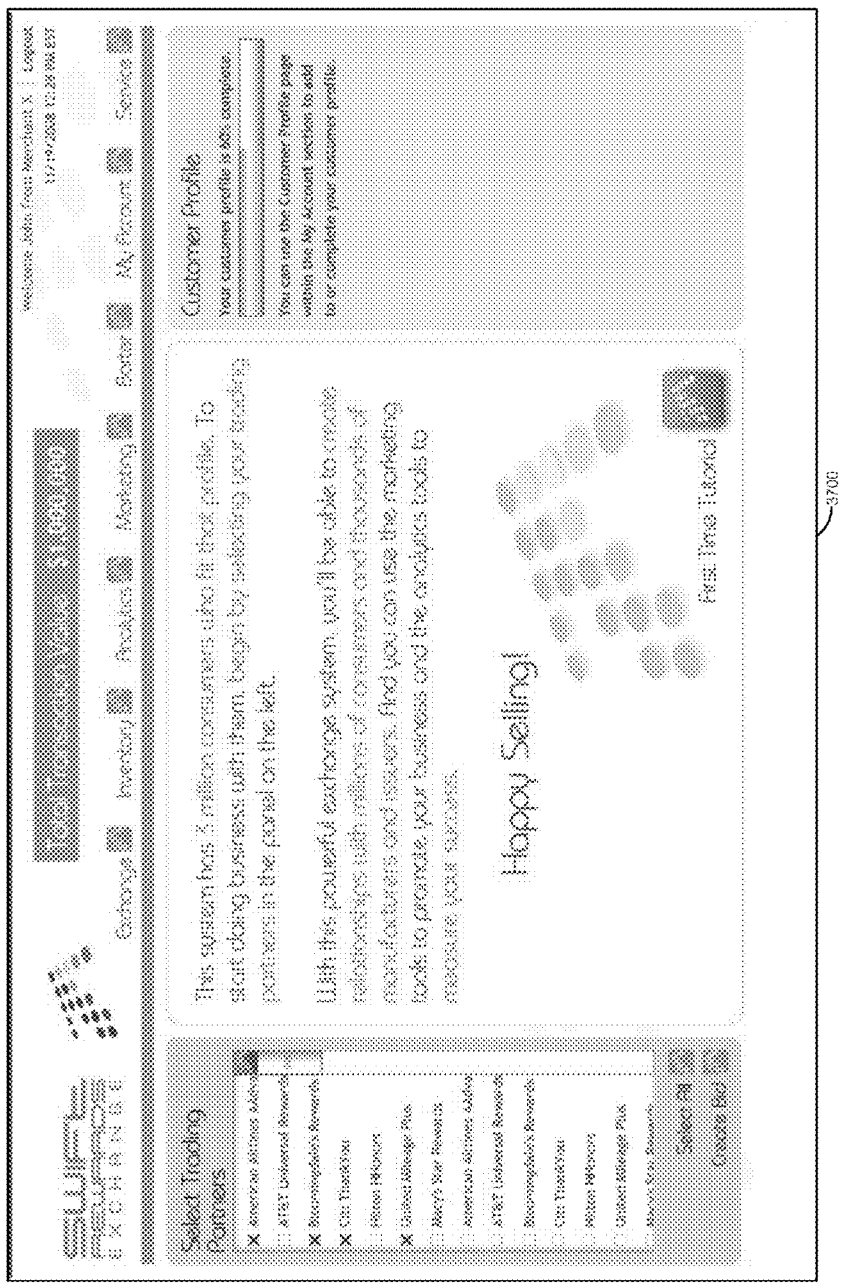
FIG. 37 is a screen shot of a merchant page with trading partners selected.
Figure 53:
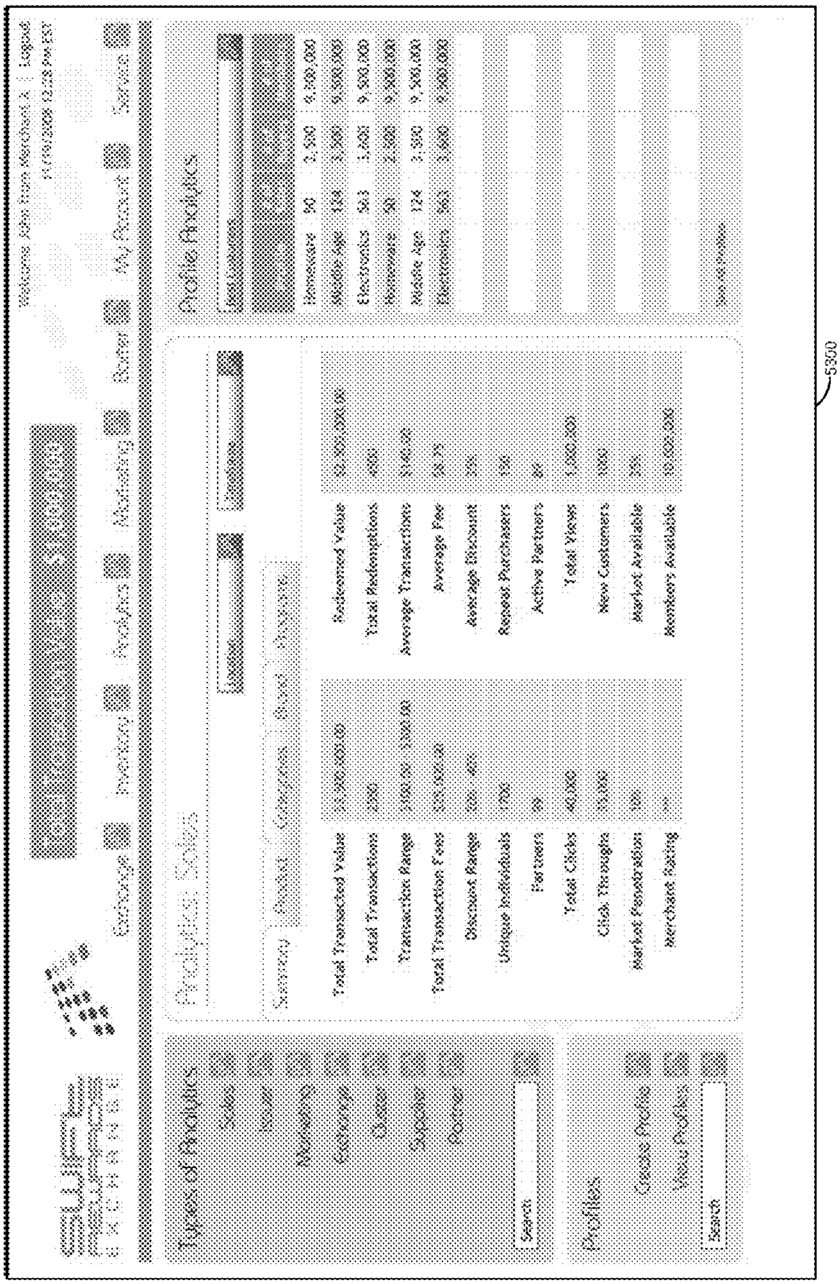
FIG. 53 is a screen shot of a merchant page in which an analytics summary is shown.
Figure 54:
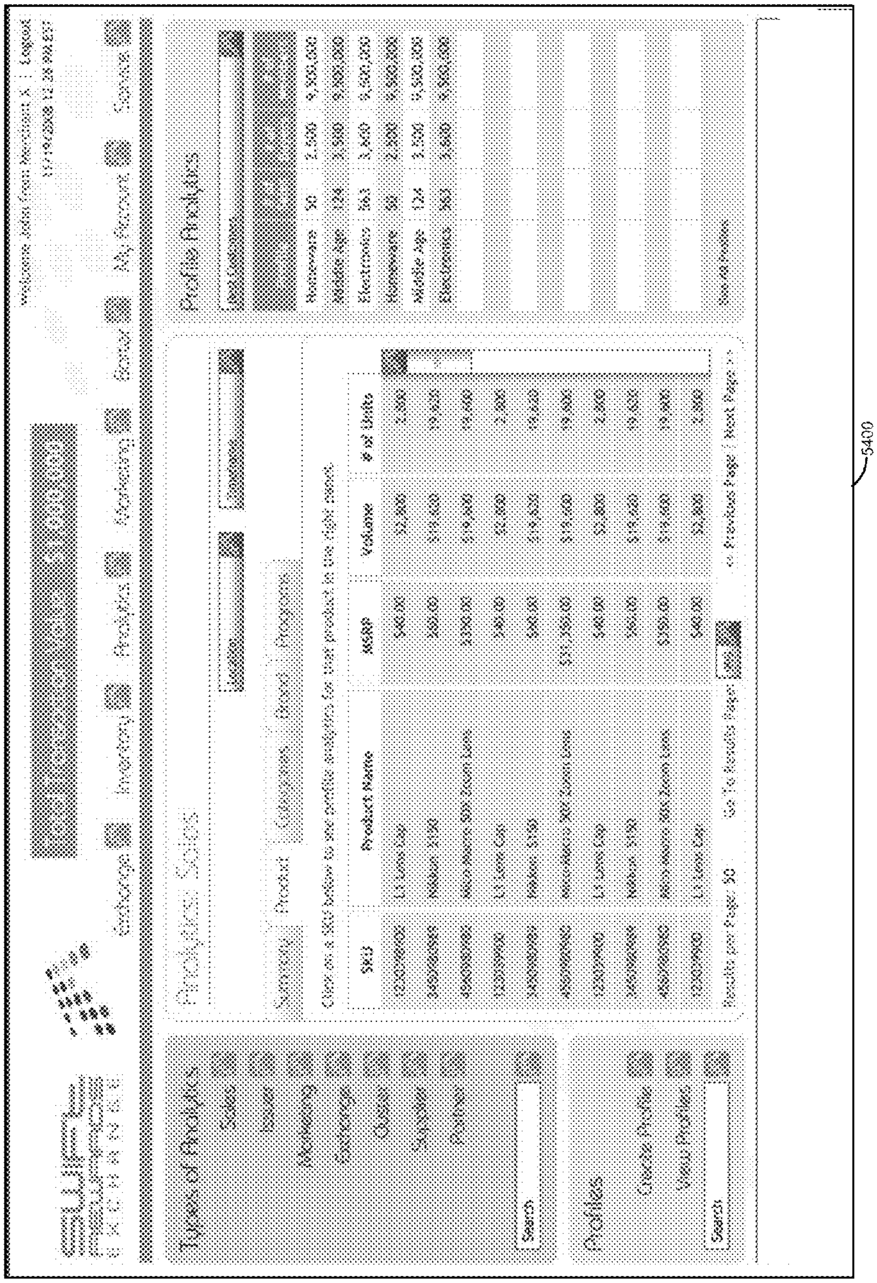
FIG. 54 is a screen shot of a merchant page in which analytics by product is shown.
Figure 55:
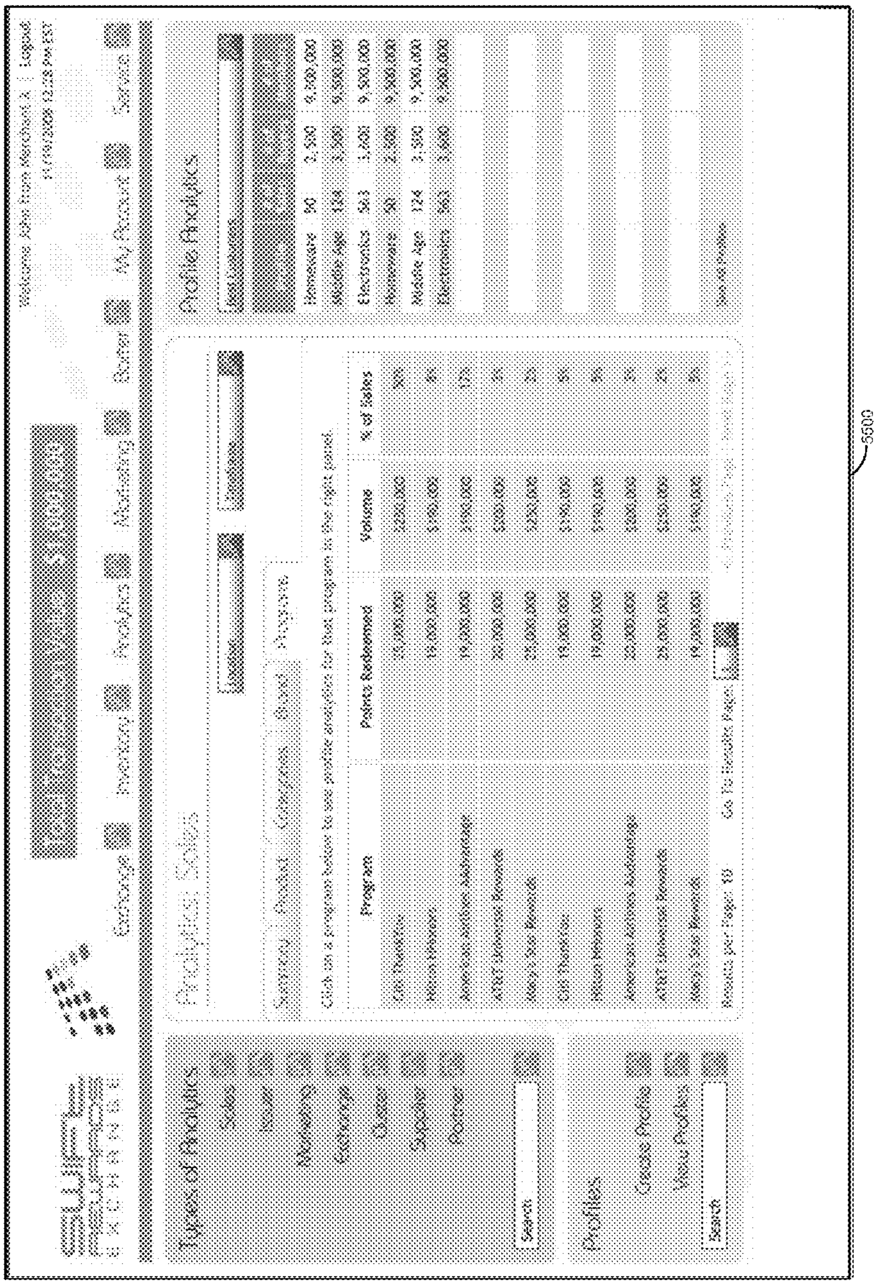
FIG. 55 is a screen shot of a merchant page in which analytics by reward programs is shown.
Figure 56:
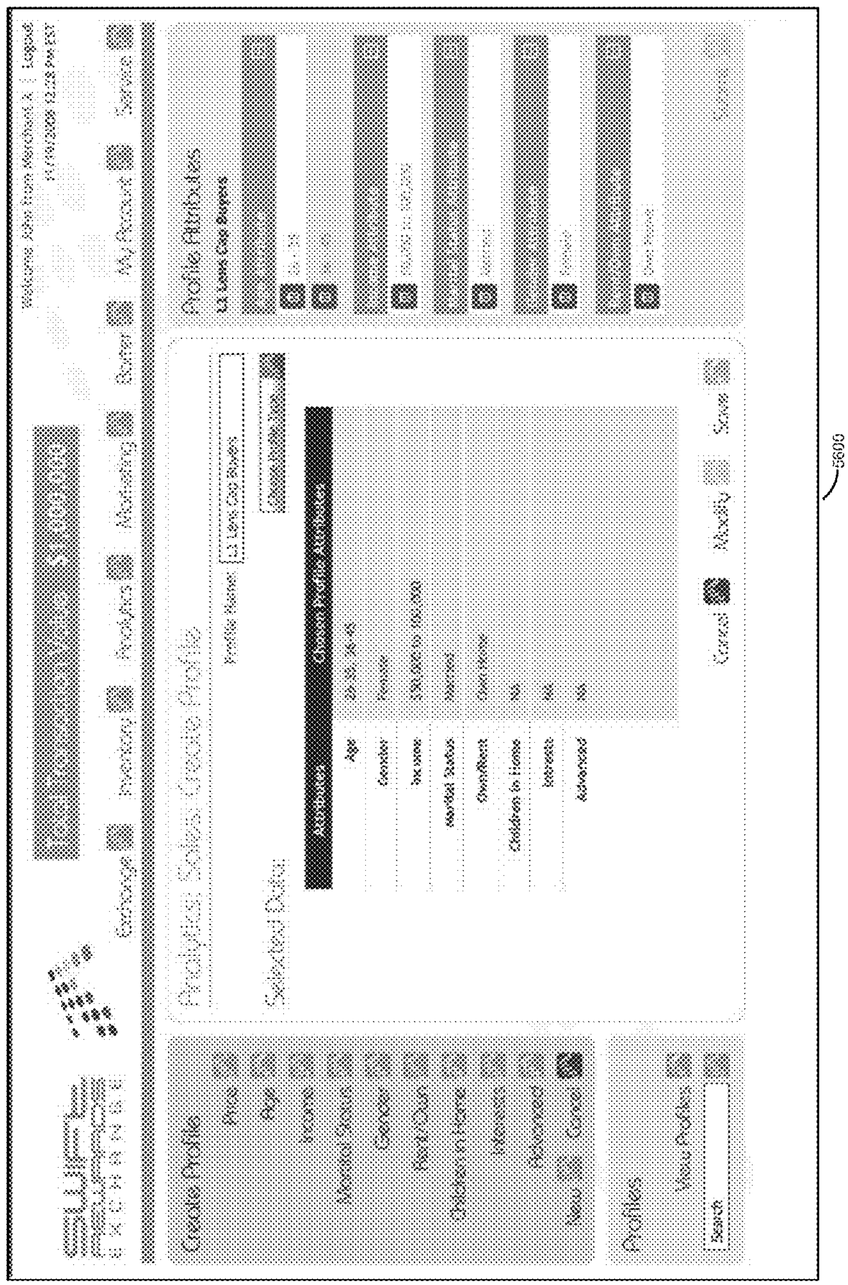
FIG. 56 is a screen shot of a merchant page in which a profile summary is shown after creation.
Figure 57:
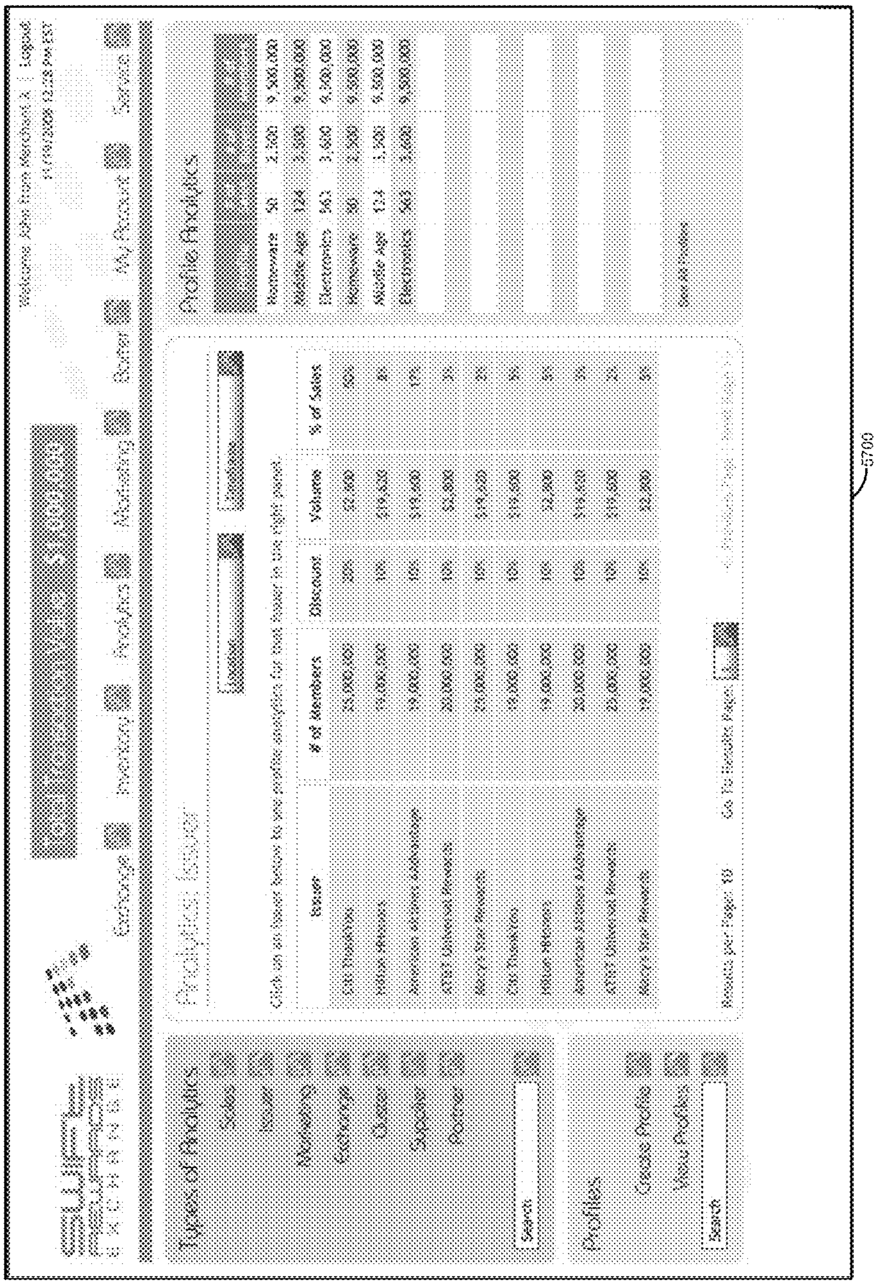
FIG. 57 is a screen shot of a merchant page in which issuer analytics are shown.
Figure 58:
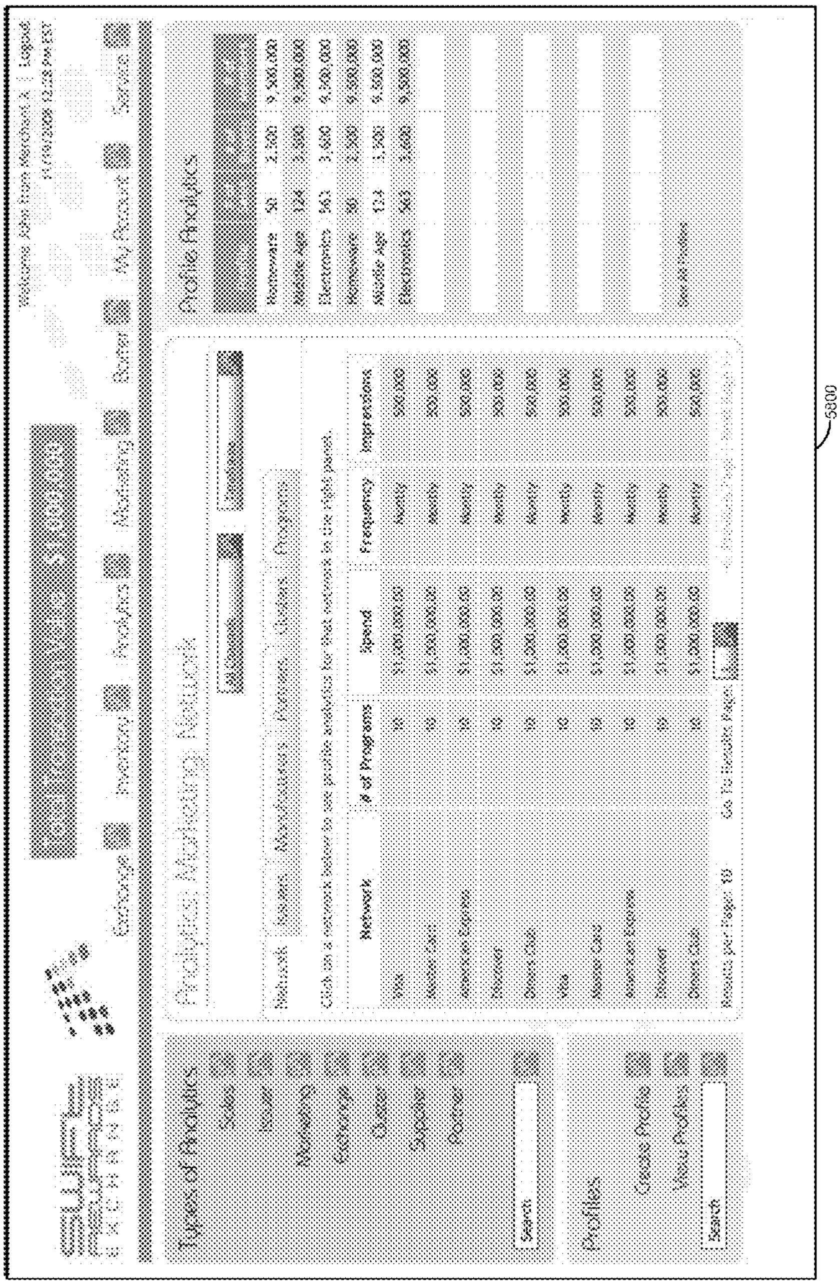
FIG. 58 is a screen shot of a merchant page in which network analytics are shown.

FIG. 36 is a screen shot of a merchant page 3600 with an Analytics menu item drop down list 3602, showing various options such as Sales, Issuer, Marketing, Exchange, Cluster, Supplier and Partner. FIG. 53 is a screen shot of a merchant page 5300 in which an analytics summary is shown. FIG. 54 is a screen shot of a merchant page 5400 in which analytics by product is shown; and FIG. 55 is a screen shot of a merchant page 5500 in which analytics by reward programs is shown. FIG. 56 is a screen shot of a merchant page 5600 in which a profile summary is shown after creation. FIG. 57 is a screen shot of a merchant page 5700 in which issuer analytics are shown, and FIG. 58 is a screen shot of a merchant page 5800 in which network analytics are shown.

In another aspect of the invention, a merchant may submit to the exchange computer any or all of the following: (1) a price discount schedule that specifies price discounts to be automatically generated by the exchange computer as a function of elapsed time that a specified product is available for purchase; (2) a redemption schedule that specifies redemption discounts to be automatically generated by the exchange computer as a function of elapsed time that a specified product is available for purchase; and/or (3) a transacted value discount schedule that specifies transacted value discounts to be automatically generated by the exchange computer as a function of elapsed time that a specified product is available for purchase.

In yet another aspect of the invention, a user profile is built for storage in a user profile database associated with the exchange computer. A reward redemption offer is generated based on information in the user profile and then presented to the user via the user computer. The user profile may include information regarding the user's past reward redemptions and/or the user's past product viewing history. A merchant may access the user profile database in order to generate a product offer to a user that is targeted to that user based on the profile information of the user.

Figure 59:
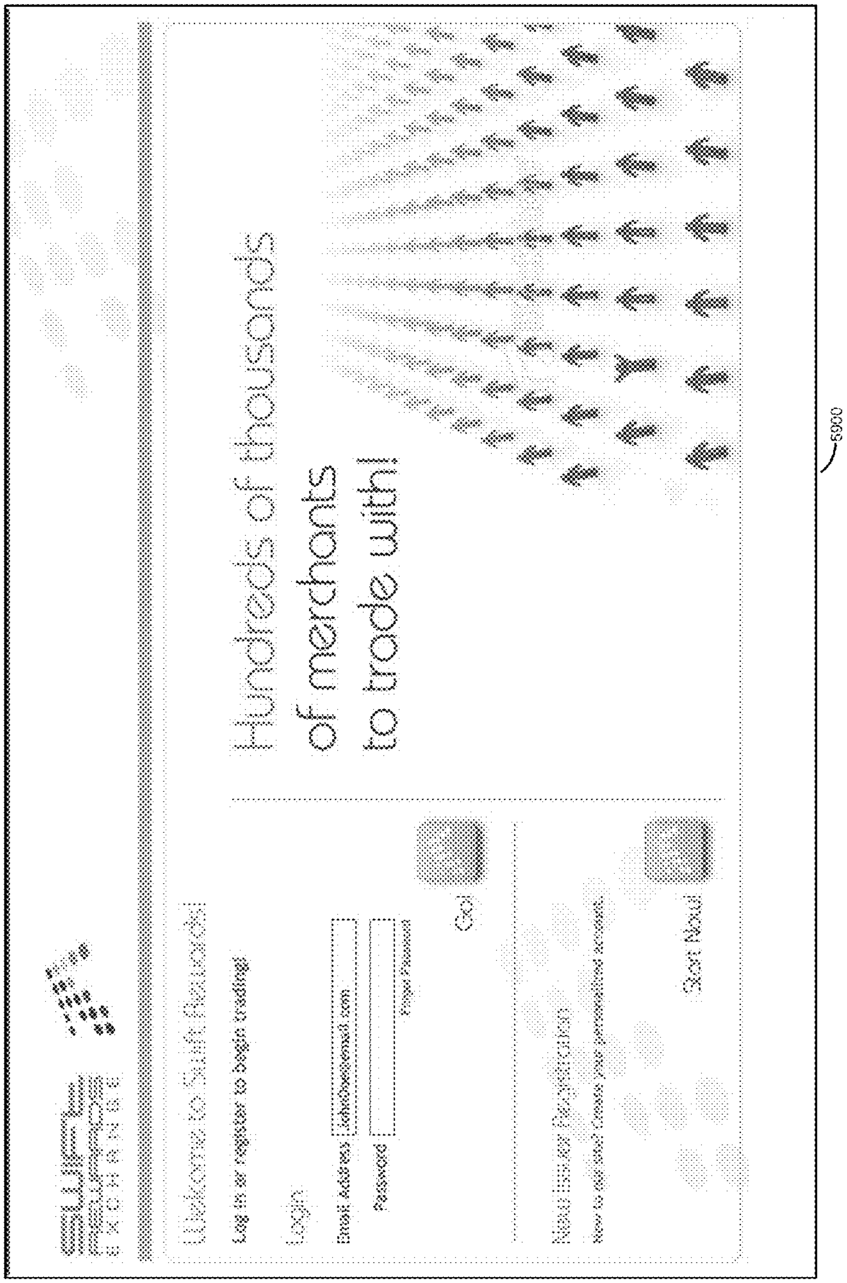
FIG. 59 is a screen shot of an issuer login page.

FIG. 59 is a screen shot of an issuer login page 5900 that is accessed by a reward point issuer 108 on an issuer computer 130 interconnected to the exchange computer 102 via the network 114 by selecting the issuer button 140 on the home screen 134 of FIG. 1. This page may of course also be directly accessed with an appropriate URL entry.

A plurality of issuers also register with the exchange computer via the web site, each of the issuers registering using an associated issuer computer for providing issuer information comprising a designation of merchants registered with the exchange computer with which the issuer agrees to execute a reward redemption transaction when requested by the user.

Figure 60:
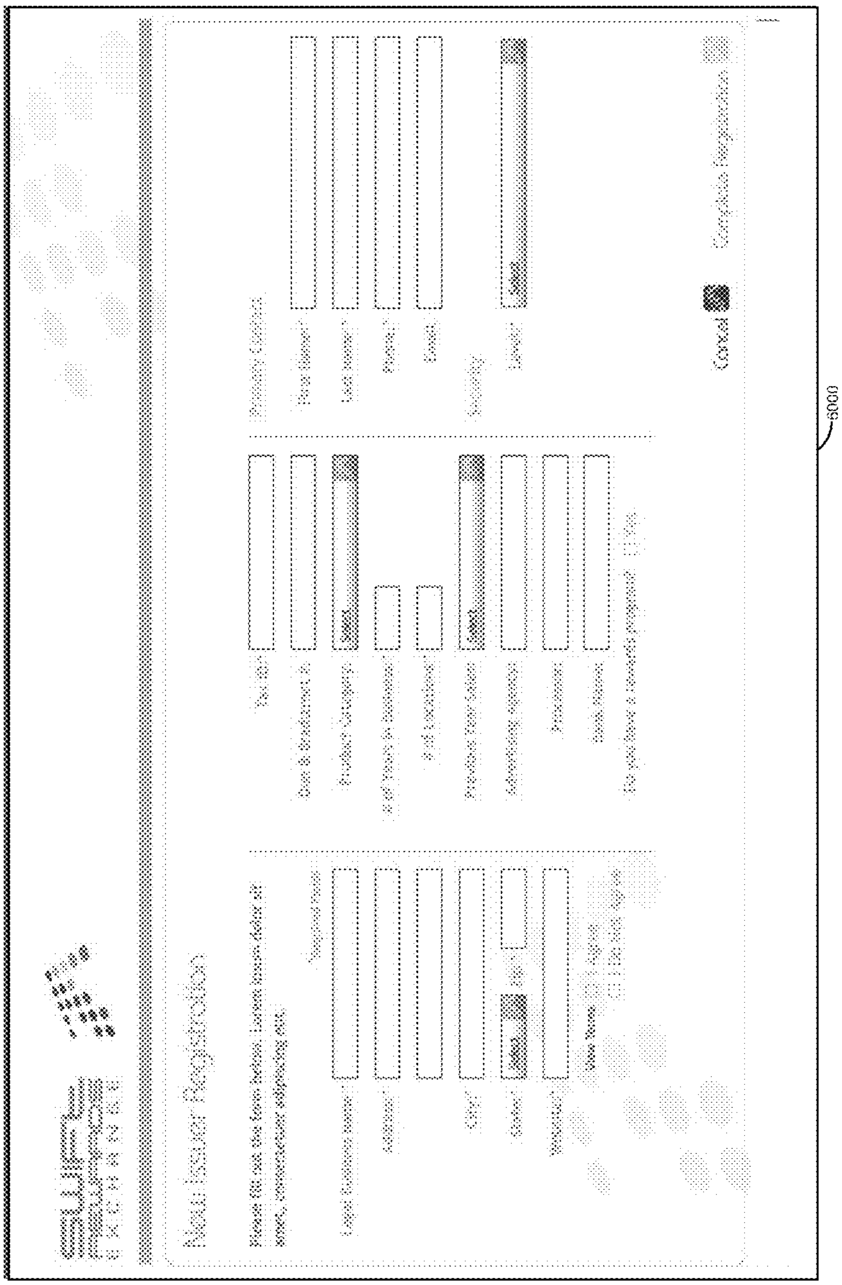
FIG. 60 is a screen shot of a new issuer registration page.
Figure 61:
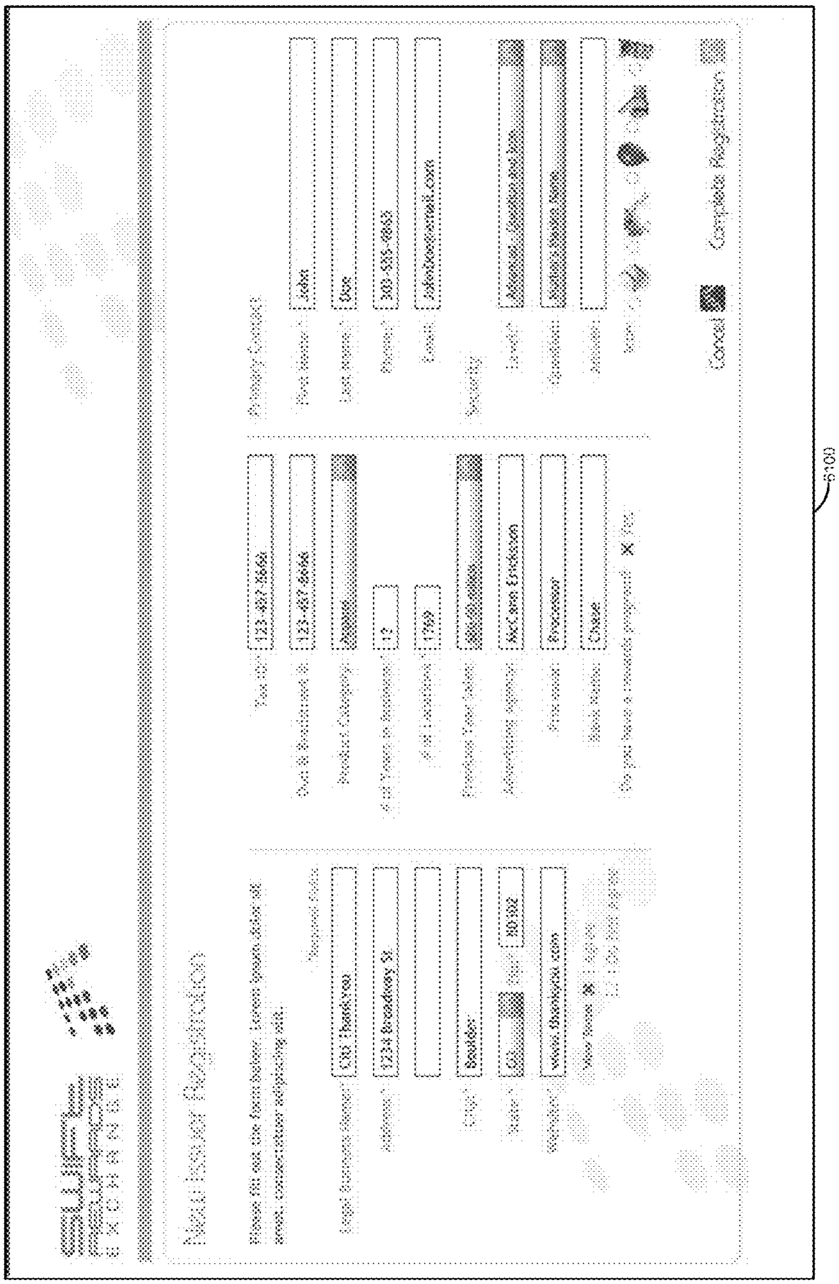
FIG. 61 is a screen shot of a new issuer registration page with filled in data.
Figure 62:
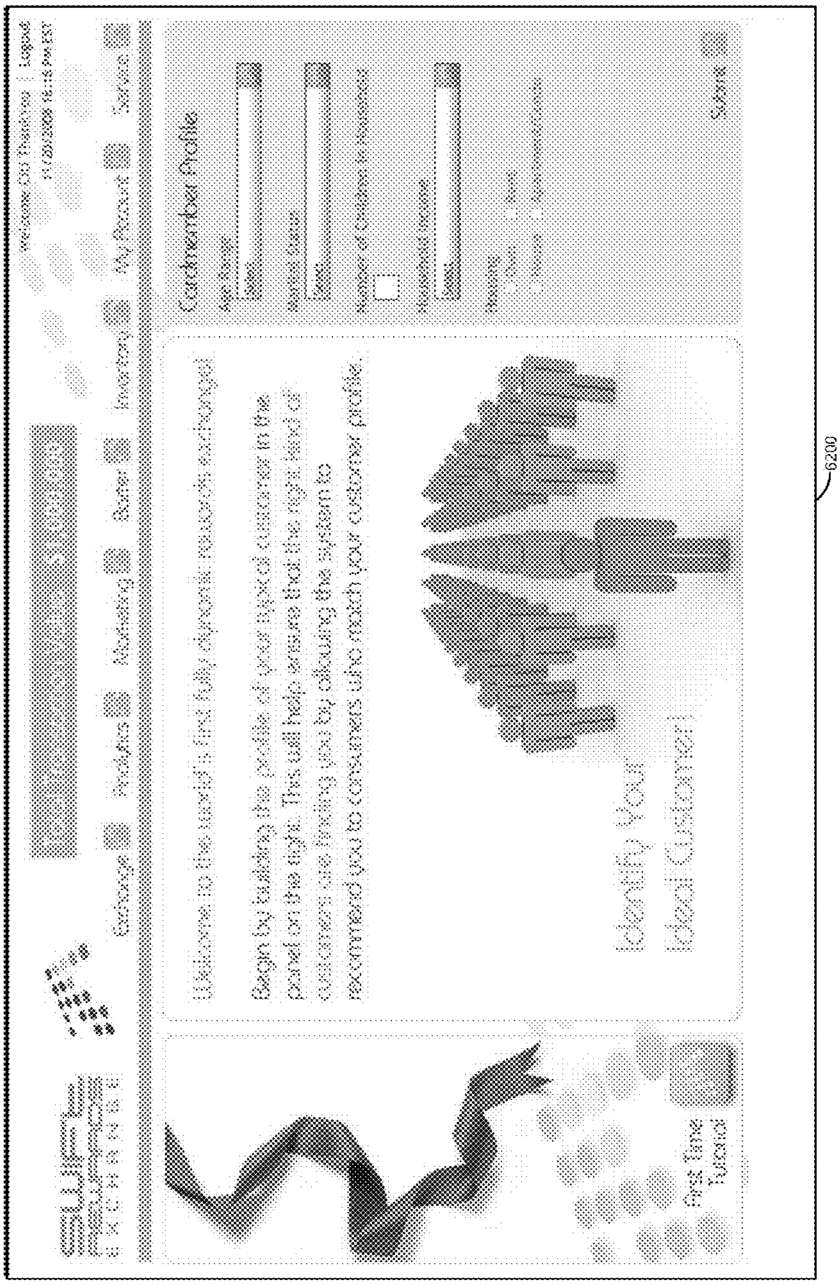
FIG. 62 is a screen shot of an issuer home page.
Figure 63:
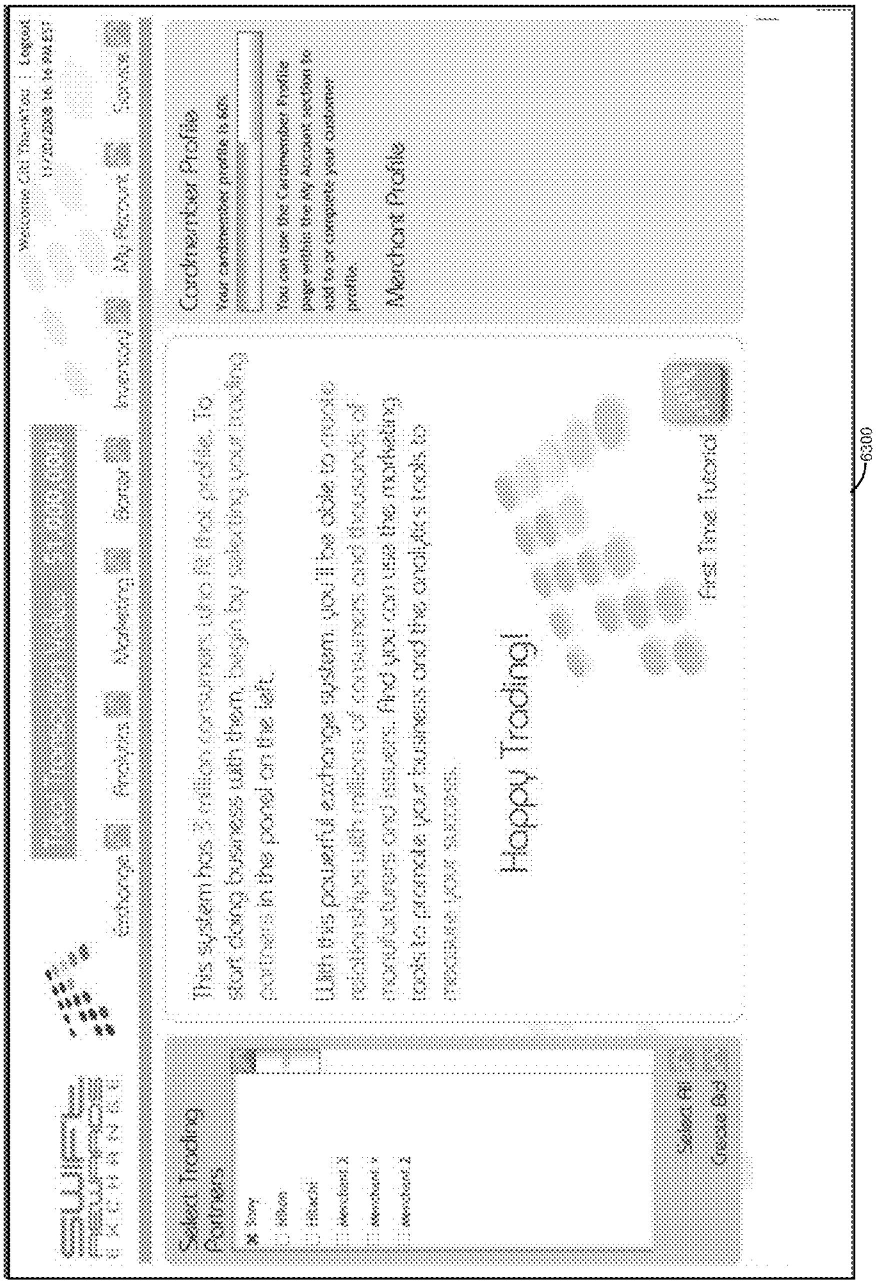
FIG. 63 is a screen shot of an issuer bid creation page.

FIG. 60 is a screen shot of a new issuer registration page 6000, and FIG. 61 is a screen shot of a new issuer registration page 6100 with filled in data. FIG. 62 is a screen shot of an issuer home page 6200 after the issuer has logged in. FIG. 63 is a screen shot of an issuer bid creation page 6300 in which the issuer may create an exchange bid in the same manner as described with respect to the merchants above.

That is, in the alternative, the issuer may create a bid by selecting with the issuer computer a desired merchant from a group of merchants that are registered with the exchange, and entering into the web page a desired redemption discount offer, the desired redemption discount offer being the amount that the issuer is willing to accept in a transaction with the selected merchant. The issuer submits the bid to the exchange computer, which then forwards the bid to the merchant computer of the desired merchant selected by the issuer in the bid. The merchant accepts the bid, rejects the bid, or counter proposes a modified bid in which a modified redemption discount is submitted to the exchange computer for forwarding to the issuer computer.

Figure 64:
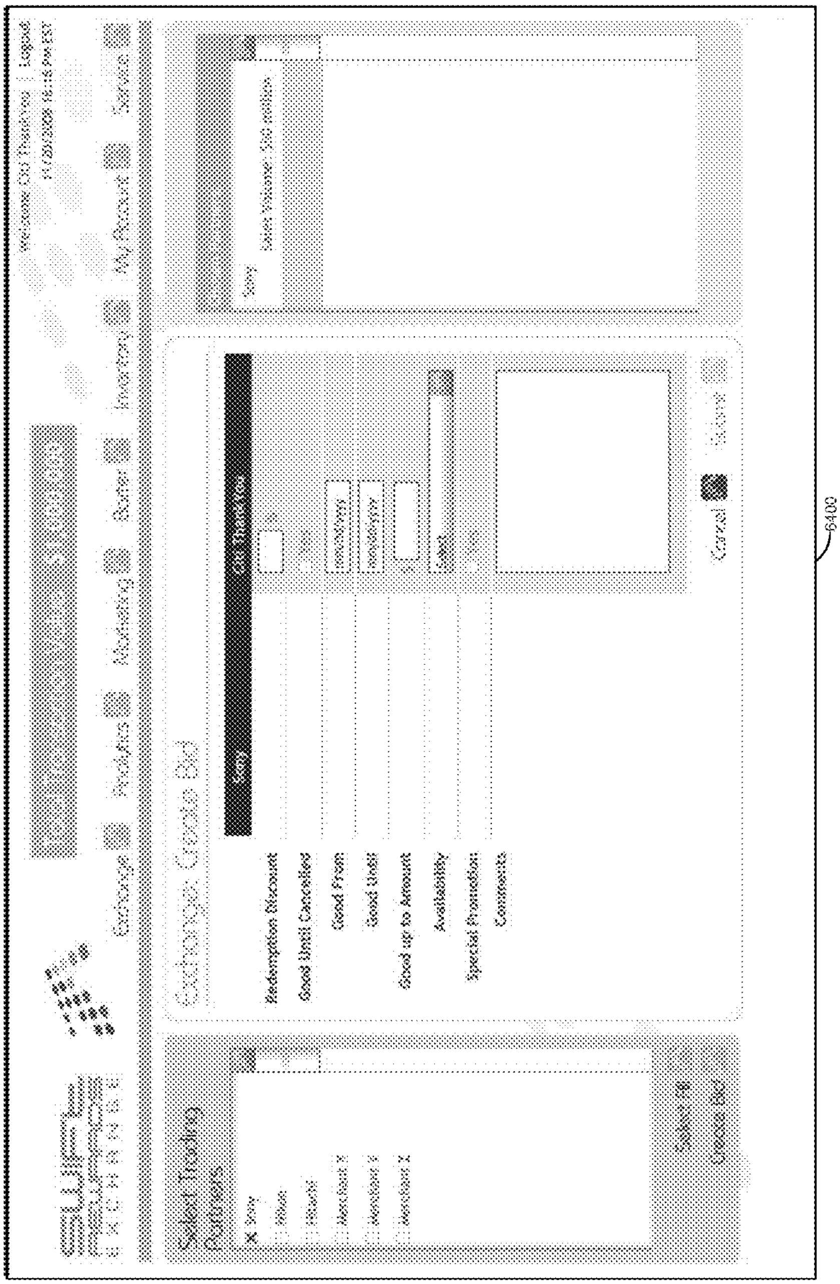
FIG. 64 is a screen shot of an issuer bid creation page with a trading partner selected.
Figure 65:
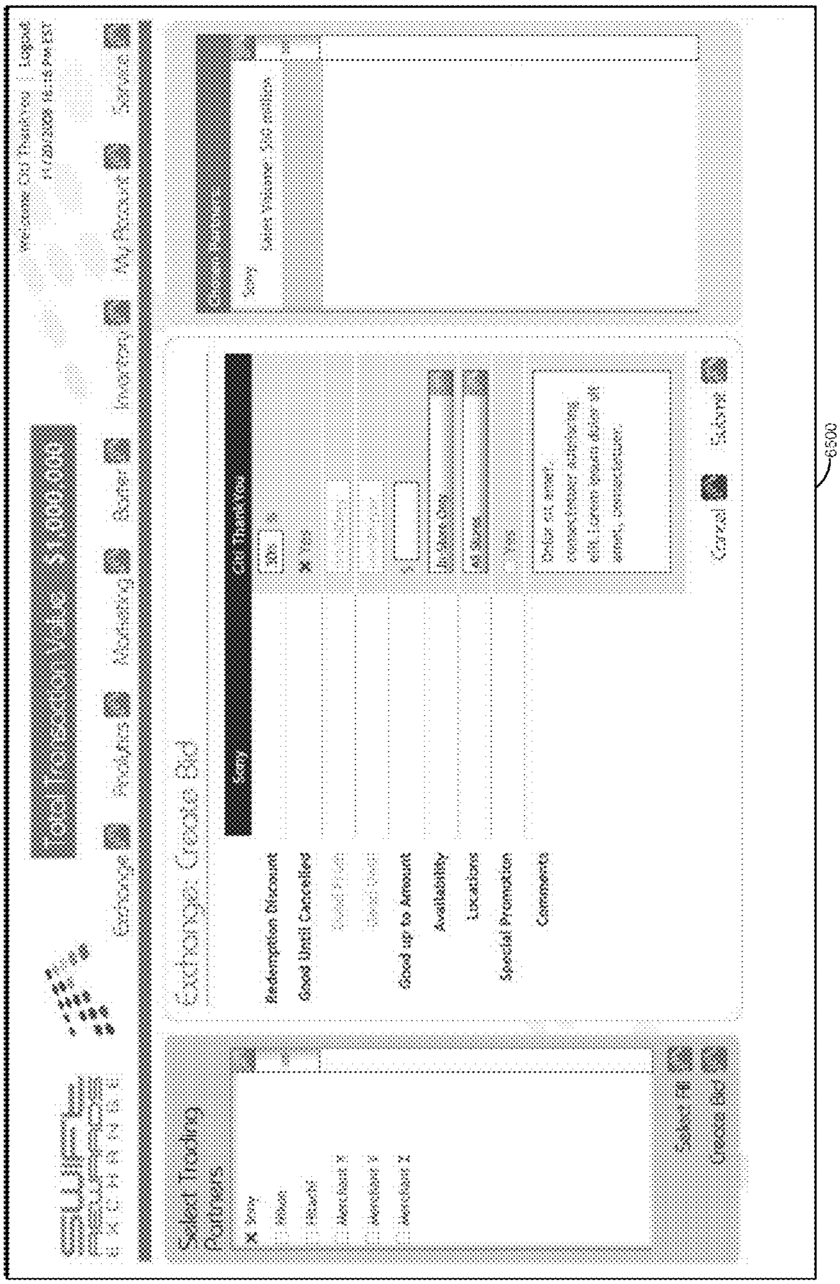
FIG. 65 is a screen shot of the issuer page of FIG. 64 in which bid data has been entered.
Figure 66:
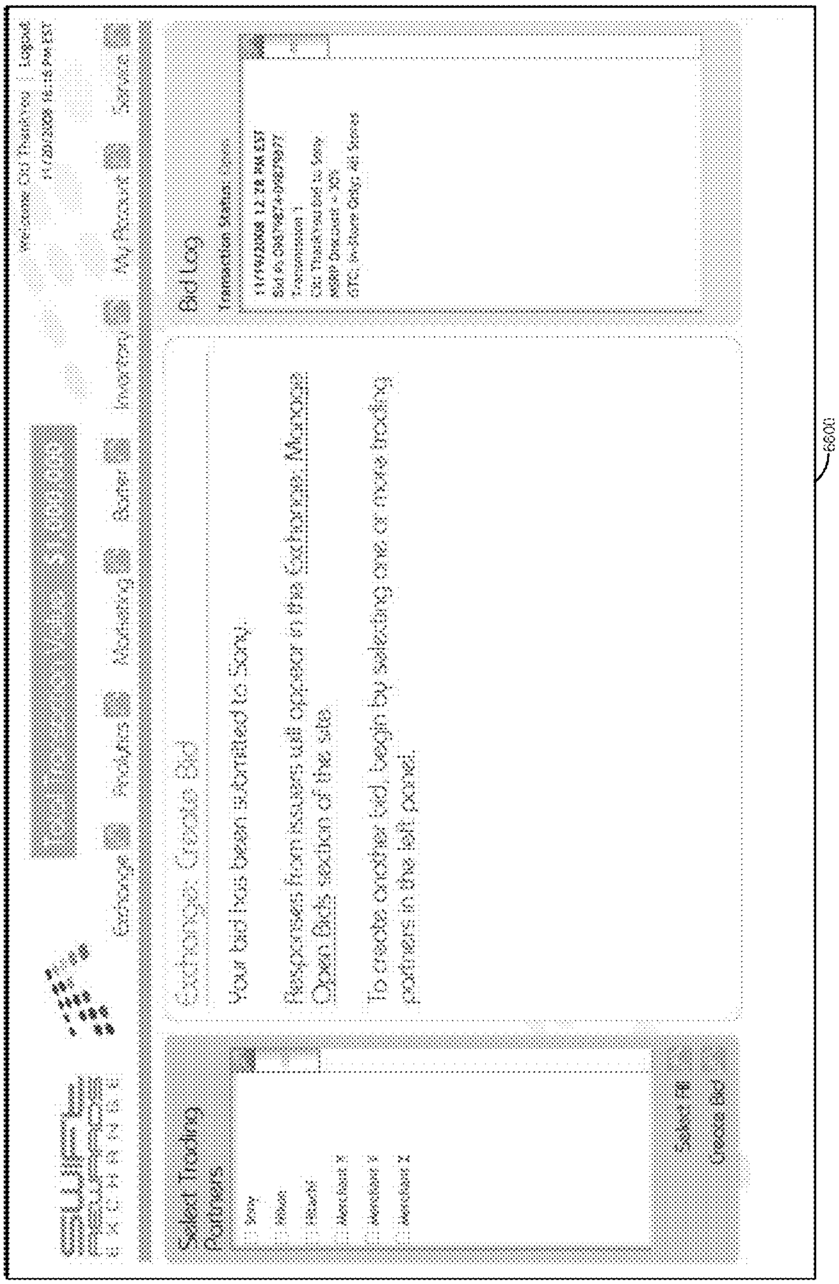
FIG. 66 is a screen shot of an issuer page in which the bid has been submitted.
Figure 67:
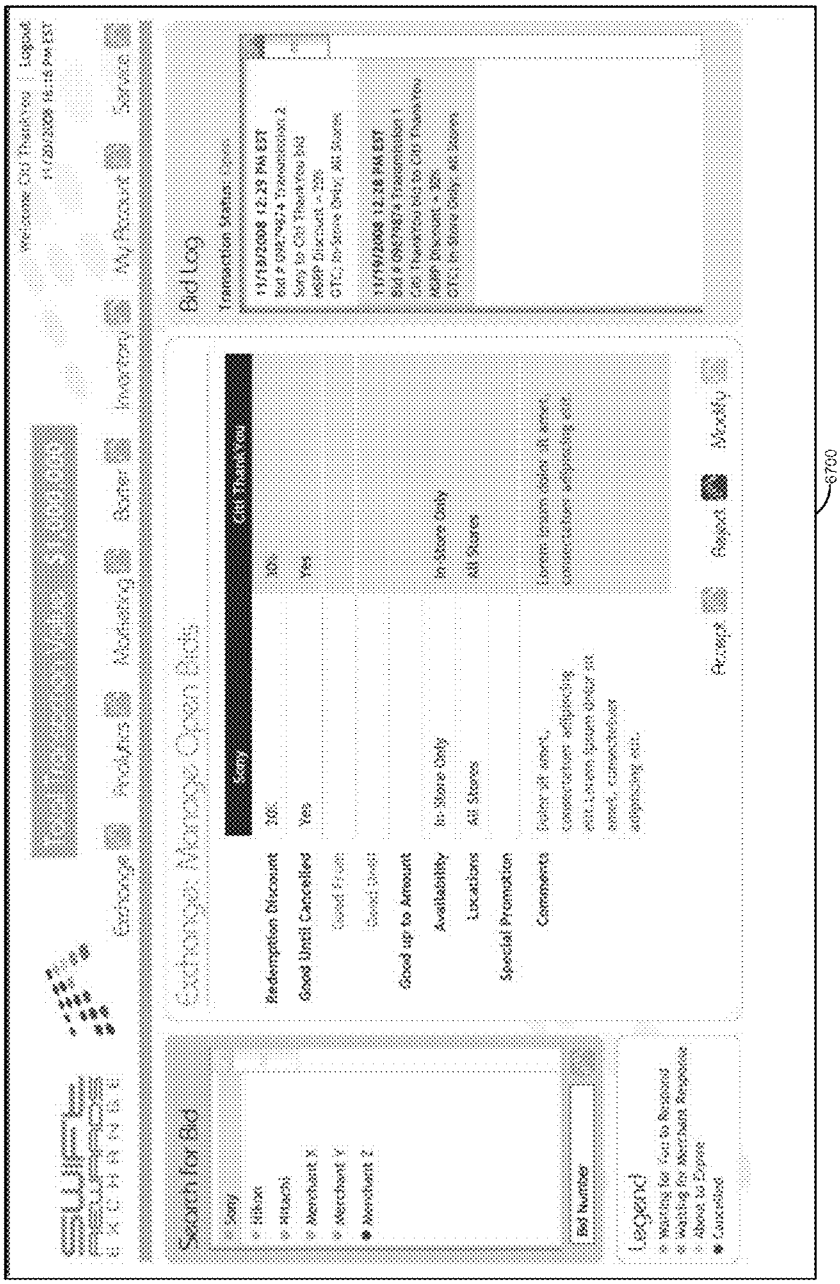
FIG. 67 is a screen shot of an issuer page in which open bids may be searched, selected and managed.
Figure 68:
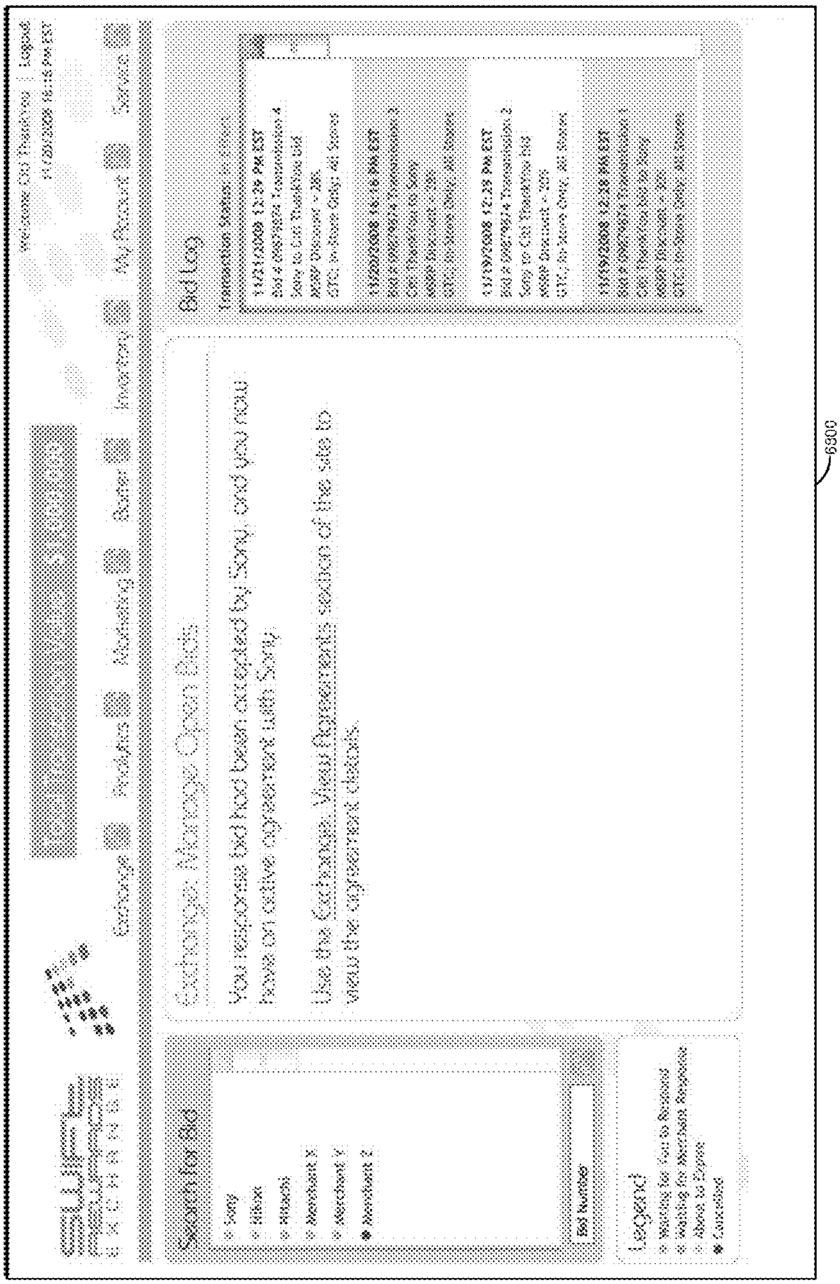
FIG. 68 is a screen shot of an issuer page in which a bid is selected for review.
Figure 69:
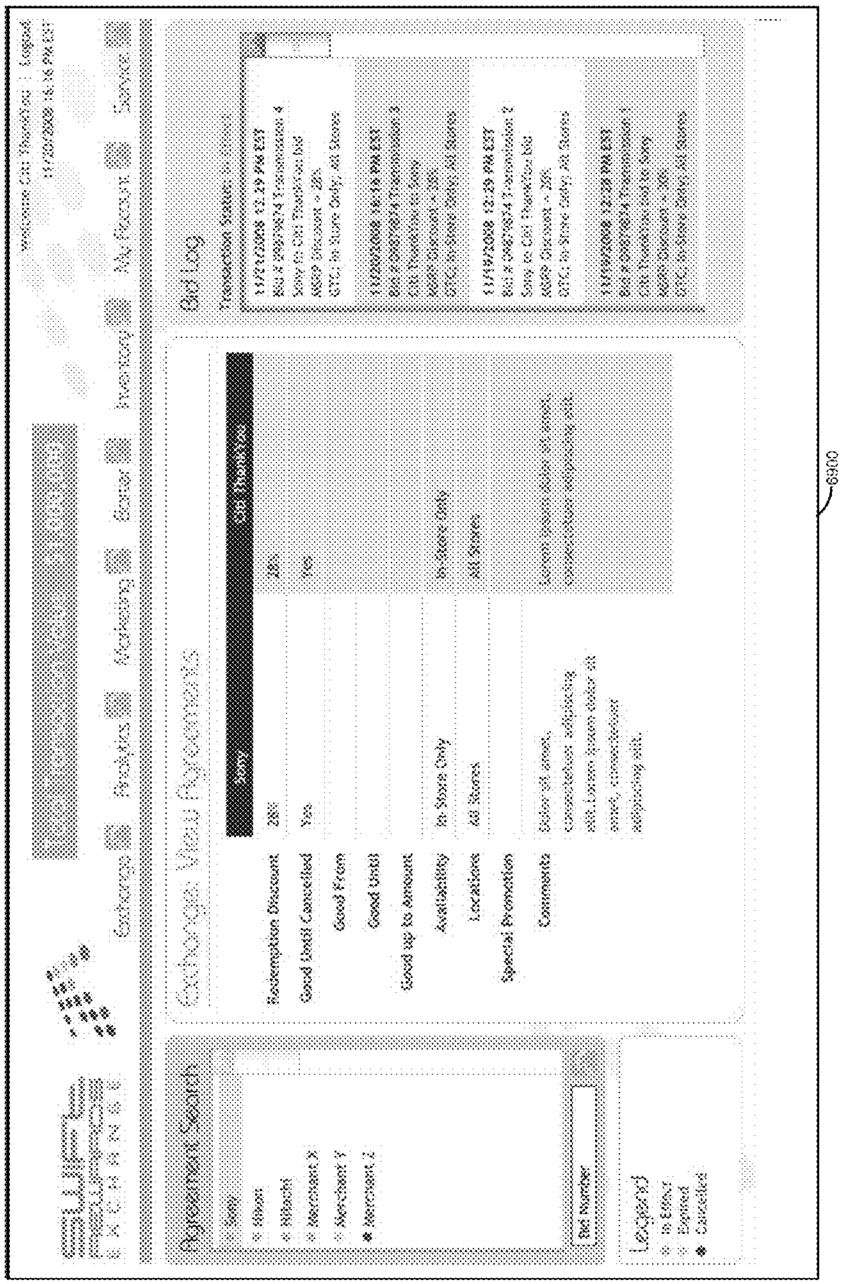
FIG. 69 is a screen shot of an issuer merchant page in which accepted bid agreements may be viewed.
Figure 69A:
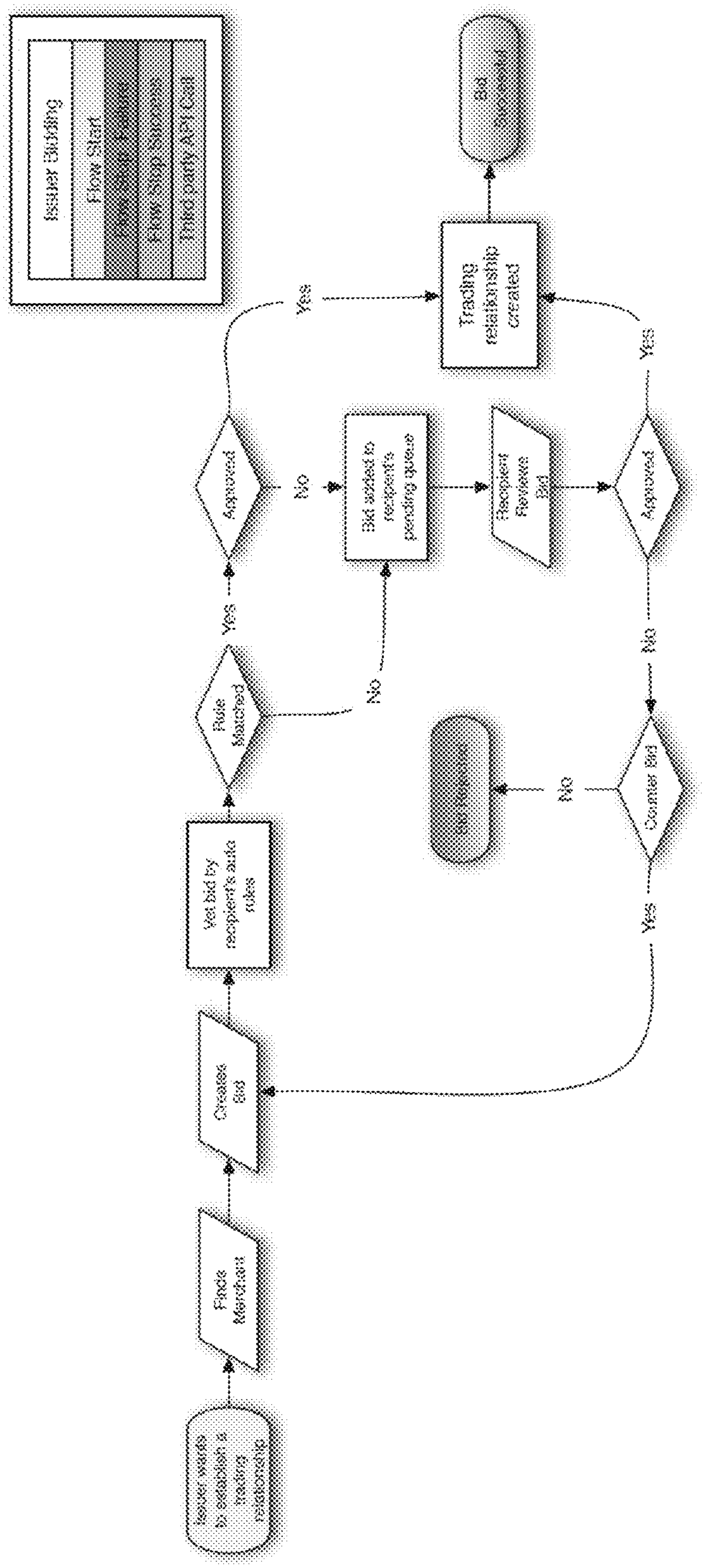
FIG. 69*a* is a flowchart illustrating the issuer bidding process.

FIG. 64 is a screen shot of an issuer bid creation page 6400 with a trading partner selected, FIG. 65 is a screen shot of the issuer page 6500 of FIG. 64 in which bid data has been entered, and FIG. 66 is a screen shot of an issuer page 6600 in which the bid has been submitted. FIG. 67 is a screen shot of an issuer page 6700 in which open bids may be searched, selected and managed; FIG. 68 is a screen shot of an issuer page 6800 in which a bid is selected for review, and FIG. 69 is a screen shot of an issuer merchant page 6900 in which accepted bid agreements may be viewed.

Figure 70:
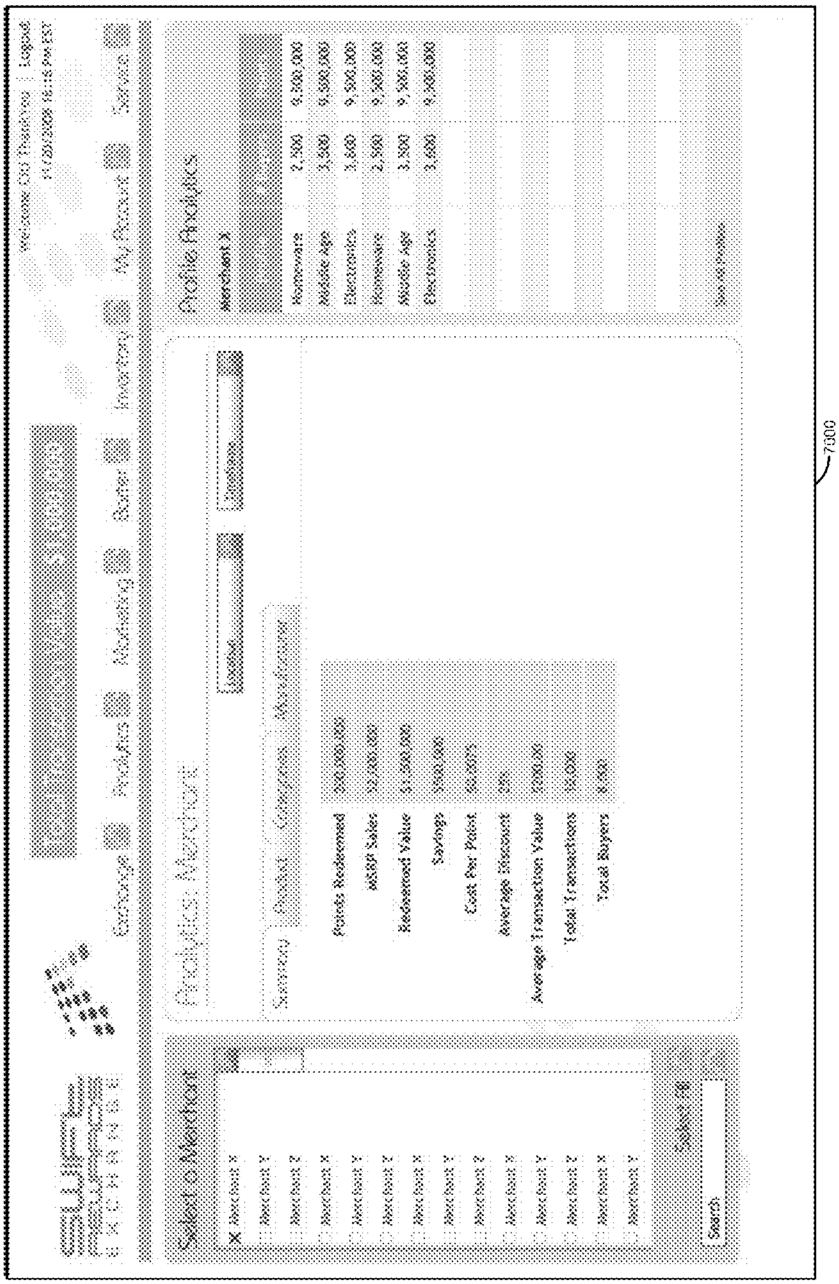
FIG. 70 is a screen shot of an issuer page in which an analytics summary is shown

FIG. 70 is a screen shot of an issuer page 7000 in which an analytics summary is shown similar to the analytics previously described.

The selection of the manufacturer button 142 on FIG. 1 provides functionality to a manufacturer similar to that of a merchant as previously described.

In an alternative to a user entering search criteria into a user computer for products review, a user may use a mobile device such as a camera-enabled cell phone or smart phone such as an IPHONE to capture an image of a UPC bar code of a product of interest. The bar code is imaged and decoded, and the UPC data is transmitted wirelessly to the exchange computer 102. Scanning and decoding of UPC codes is well known in the art. This enables a user to scan a product and comparison shop with the present invention.

In a further alternative embodiment, functionality may be embedded within a point of sale device (POS device) to interact with the exchange computer 102. For example, a user may be shopping in a store and bring a product to the register for checkout. The UPC of the product will be scanned by the cashier using a POS device or associated scanner, and the UPC data will be transmitted to the exchange computer along with customer identification information that may be obtained for example by scanning the magnetic stripe of the user's credit or debit card. The exchange computer may then send back to the POS device a display of the user's available reward points in his promotional wallet as described above. If the merchant where the user is purchasing the product has a trading agreement with the issuer(s) of the user's points (or with a third party other than the points issuer which has the ability to transact the point based transaction), then the user may elect to have a reward exchange transaction take place on order to pay for the product. For example, if the user is purchasing a $20 DVD at BEST BUY, this information is sent to the exchange computer 102 via the POS device. If the user has reward points with CHASE, and CHASE has already executed a trading agreement with BEST BUY, then the user may elect to use his CHASE reward points to pay for the DVD. The user's reward account would be reduced by the number of points required (e.g. 2,000 points), and CHASE per its agreement with BEST BUY would convey appropriate consideration to BEST BUY to pay for the DVD. If for example a 10% trading agreement was previously agreed to by BEST BUY (as merchant) and CHASE (as issuer), then CHASE would convey $18 to BESTBUY for the purchase of the DVD.

The system that is used to implement this embodiment is shown in FIG. 1*d* and includes an exchange computer 102, a merchant computer 128 associated with a merchant 106 and selectively interconnected to the exchange computer via a computer network 14, an issuer computer 130 associated with a reward points issuer 108 and selectively interconnected to the exchange computer via the computer network; and a point of sale device 7100 operably associated with the merchant computer 128. This similar in topology to the system of FIG. 1*b*, except that there is no need for a user computer since the purchase transaction is made via the point of sale device at the merchant's retail outlet.

The point of sale device 7100 may be a terminal associated with a cash register at a checkout counter of the store. Or, the point of sale device may a kiosk located in the store, or in a central location such as a shopping mall, airport terminal, and the like. A point of sale device may be implemented in various mobile environments such as a taxicab to enable a rider to pay for his or her ride with reward points through the exchange, or it may be located at a concierge desk in a hotel or travel agency environment.

Figure 71:
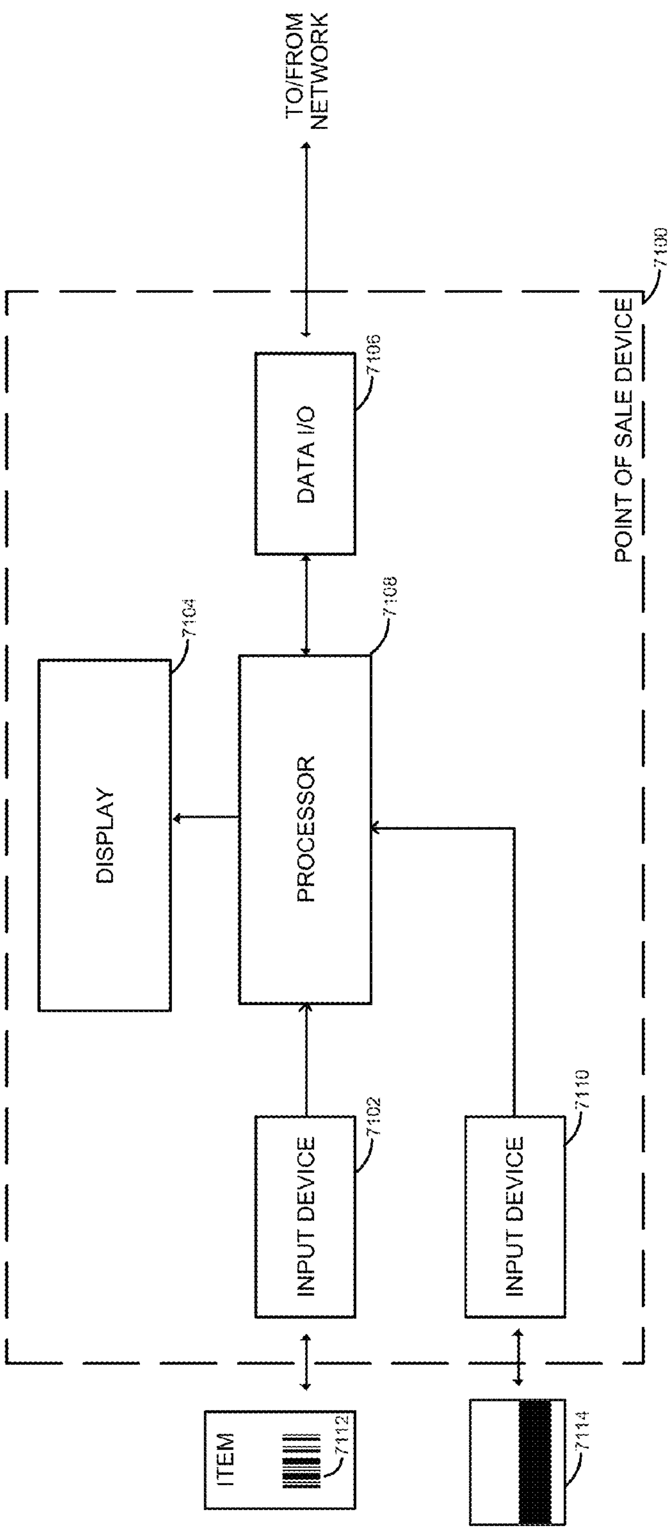
FIG. 71 is a diagram of the point of sale device of FIG. 1*d*.

The point of sale device 7100 is shown in further detail in FIG. 71. The point of sale device 7100 has at least one input device 7102 for inputting information from a user and/or item, a display 7104, a data connection 7106 to the computer network; and a processor 7108.

In an alternative embodiment, a user may be browsing through the aisles at a merchant's retail store and may have real-time communications with a merchant computer located at the store, or with a point of sale device at the store if the merchant computer is located offsite. The user may be carrying a communications device such as a cell phone, or a smartphone or PDA such as an IPHONE or IPAD, and the merchant system (merchant computer or point of sale device) may communicate with the user to advertise certain items that may be of interest, or an application with a remote transmitting device which communicates with a user mobile device. For example, the merchant computer may push an ad to the user's cell phone in the form of a text message that reads "CDs now on sale in aisle 3" or the like. The content of the ad may be of general interest or it may be derived from an analysis of the user's past purchasing or browsing history (e.g. points of interest). Thus, if the merchant computer has already sold CDs to a particular user, the text message above may be sent. If the device being carried by the user has Wi-Fi capabilities and the user is logged in to the store's network, then the system will know the user is in the store and will be able to communicate with the user via the Wi-Fi connection or by text messaging discussed above.

In addition to pushing simple ads, the system may interact with a user device to notify the user of the availability of certain redemption opportunities available at the store that meet certain parameters designated by either the merchant, issuer, or user, concerning products available within the retail environment.

The system may use RF, IR, BLUETOOTH, WI-FI, and or other means of wireless communication between the user device and the merchant computer or point of sale device for such communications discussed above.

With respect to the point of sale device 7100 of FIG. 71, the processor 7108 is programmed to receive via the input device 7102 price information associated with an item to be purchased by a user. Price information associated with the item may be input by reading a machine-readable indicia associated with the item. For example, the input device 7102 may be a bar code canning device, which is then used to scan a bar code such as UPC code 7112 on the (or associated with) the item to be purchased by the user. The price information may be embedded in and obtained directly from the machine-readable UPC indicia 7112, or the machine-readable indicia may include an index that is used by the point of sale device 7100 to lookup the price information from an associated product database. Either of these options are well known in the art.

In an alternative embodiment, the machine-readable indicia may be an RFID tag that is embedded in the item or its packaging. RFID tags emit RF signals that contain information about the item in the same fashion that bar codes contain such information, including but not limited to its price or an index used to lookup its price. In this case, the input device 7102 is an RFID reader device associated with the point of sale device.

In a further alternative, the price or product information may be manually entered into the point of sale device 7100 by a manual data entry input device associated with the point of sale device. This would be a keyboard that may be used for example if the bar code cannot be successfully scanned. All of these data entry input devices 7102 described herein are known in the art and need not be described in any further detail herein.

The input device may also be used to in order to input a user identification (user ID) into the point of sale device 7100. While the same input device 7102 may be used for this function (e.g. a keyboard), it may be preferred to use a second input device 7110 as shown in FIG. 71, which may be a device configured to read an encoded token presented by the user. For example, the input device 7110 may be a card reader known in the art that is able to read the magnetic stripe from a token that is a card 7114 such as a credit card, debit card, or reward loyalty card, etc. Alternatively, the input device 7110 may be a smart card reader that is configured to read a memory chip on a smart card as known in the art. Any type of input device that can read a user ID from a token would be useful with this invention.

In the preferred embodiment the user ID is (or is associated with) the credit card number of the user that is presented by the user during the transaction. The user ID is transmitted by the point of sale device 7100 to the exchange computer 102 via the data connection 7106. The user ID is then used by the exchange computer to ascertain a promotional wallet for that user (as described previously), which is sent back to the point of sale device from the exchange computer via the data connection. As previously described, the promotional wallet indicates a redeemable value of reward points stored in at least one reward point account 132 associated with the user 104 and at least one issuer computer 130.

The promotional wallet is then displayed on display 7104 for the user to review. The promotional wallet may include a proposed redemption solution, as described above, or it may simply show the reward point account(s) linked to by the exchange computer with the number of points available in the account(s). The functionality described above with respect to the display of reward points and selection by the user of the desired points for redemption, may also be implemented by the point of sale device 7100. The user can select the desired redemption solution on the point of sale device (for example if the display 7104 is a touch screen display or through associated buttons as known in the art). The redemption selection, which indicates a selection of reward points to be redeemed from at least one reward point account associated with the user and at least one issuer computer, is then used to execute the purchase transaction for the item selected by the user by using the inputted redemption selection.

In a simple redemption scenario, the user has selected to redeem reward points from a single issuer such as CITIBANK. For example, the user may indicate that the item should be purchased in full with 5,000 of his CITIBANK reward points as indicated in the proposed redemption solution on the display 7104. The point of sale device may then cause the purchase transaction to be executed by transmitting an instruction to the exchange computer 102 to request the CITIBANK issuer computer to redeem the 5,000 reward points selected by the user by (I) reducing the reward account associated with the user by the quantity of reward points selected by the user for execution of the purchase transaction (5,000 points), and (II) conveying consideration to the exchange computer 102 corresponding to the quantity of reward points selected by the user for execution of the purchase transaction. For example, the issuer computer may at some point convey $50.00 to the exchange computer. This may done in real time at the time of the request, or it may done offline in a batch transaction mode in a settlement process as previously described. Regardless of when the consideration is actually conveyed, The point of sale device may receive confirmation from the exchange computer 102 that the issuer computer has redeemed the 5,000 reward points selected by the user and the user may take the item purchased. Settlement between the parties may occur at a later time if desired. For example, the merchant computer 128 may receive consideration for the sale of the item from the exchange computer 102 to complete the transaction.

Alternatively, the transaction may occur directly between the merchant and the issuer without further intervention by the exchange computer. That is, the point of sale device 7100 may cause the purchase transaction to be executed by transmitting an instruction to the CITIBANK issuer computer to request it to redeem the 5,000 reward points selected by the user by (I) reducing the reward account associated with the user by the 5,000 points selected by the user for execution of the purchase transaction, and (II) conveying consideration directly to a merchant computer associated with the point of sale device corresponding to the 5,000 reward points selected by the user for execution of the purchase transaction. The point of sale device may then receive confirmation from the merchant computer that the issuer has redeemed the reward points selected by the user and the user may take the item purchased. Settlement between the parties may occur at a later time if desired. For example, the merchant computer 128 may receive consideration for the sale of the item from the CITIBANK issuer computer 130 to complete the transaction.

In the alternative to using a single reward points issuer as described above, the exchange computer may present the user with an option to redeem points from multiple issuers and combine the total redeemable value to pay for the desired item. Thus, the redemption selection input to the point of sale device may indicate a combination of a first selection of reward points to be redeemed from a first reward point account (e.g. CITIBANK) and a second selection of reward points to be redeemed from a second reward point account (e.g. CHASE), etc. In this embodiment, there will be multiple redemptions and transfers of consideration; one for each issuer selected by the user for redemption. The exchange computer may then authorize the transaction after it has received confirmation of the redemption from all of the selected issuers. In addition, coupons and other forms of tender such as cash, credit, store credits, etc. may be used along with reward points to execute the purchase transactions.

The point of sale device may display advertisements relevant to the user, the product, and/or the transaction itself which are served from the merchant computer based on the transaction, the user, the product being purchased, etc.

What is claimed is:

1. A method for implementing an online reward redemption program, comprising:

an exchange computer generating a reward redemption offer for purchase of an item from a merchant computer by a user based on information in a user profile stored in a user profile database, the reward redemption offer comprising a proposed reward redemption solution that designates a quantity of reward points from at least one of a plurality of reward accounts to be redeemed for at least partial payment for the item, and a first option to accept the proposed reward redemption solution and a second option to modify the proposed reward redemption solution;

the exchange computer sending the reward redemption offer to a user computer for display to the user;

the exchange computer receiving a purchase request from the user computer to execute the reward redemption offer for purchase of the item from the merchant computer via the exchange computer, the purchase request comprising an election of the first option to accept the proposed reward redemption solution or an election of the second option to modify the proposed reward redemption solution; and the exchange computer causing a purchase transaction to be executed for purchase of the item from the merchant computer in accordance with the purchase request by:

the exchange computer requesting an issuer computer associated with the purchase request to:

reduce a user reward account stored on the issuer computer by a quantity of reward points for execution of the purchase request, and convey consideration to the exchange computer corresponding to the quantity of reward points reduced in the user reward account; and the exchange computer conveying consideration to the merchant computer in exchange for providing the selected item to the user.

2. The method of claim 1 wherein the user profile comprises information regarding prior reward redemptions of the user executed via the exchange computer, and wherein the reward redemption offer is generated based on the prior reward redemptions of the user.

3. The method of claim 1 wherein the user profile comprises information regarding prior product viewing history via the exchange computer, and wherein the reward redemption offer is generated based on the prior viewing history of the user.

4. The method of claim 1 wherein a merchant computer accesses the user profile database in order to generate a product offer to the user that is targeted to the user based on the user profile of the user.

5. The method of claim 1 further comprising the exchange computer receiving from the user computer a selection of an item to be purchased in accordance with the reward redemption offer.

6. The method of claim 5 further comprising
the exchange computer providing to the user computer a dynamic search filter that enables the user computer to select a desired product category, manufacturer, and/or price range in order to select the item to be purchased in accordance with the reward redemption offer.

7. The method of claim 5 further comprising
the exchange computer receiving the selection of the item to be purchased as a result of receiving an image of a bar code scanned with a mobile camera-phone, the bar code associated with the item to be purchased.

8. The method of claim 5 further comprising
the exchange computer receiving a plurality of points of interest selected by the user computer;
the exchange computer analyzing the plurality of points of interest received from the user computer; and
the exchange computer providing to the user computer a web page displaying products available for redemption determined as a result of analyzing the points of interest selected by the user computer.

9. An exchange computer for implementing an online reward redemption program with a user computer, the exchange computer programmed to:
generate a reward redemption offer for purchase of an item from a merchant computer by a user based on information in a user profile stored in a user profile database, the reward redemption offer comprising
a proposed reward redemption solution that designates a quantity of reward points from at least one of a plurality of reward accounts to be redeemed for at least partial payment for the item, and
a first option to accept the proposed reward redemption solution and a second option to modify the proposed reward redemption solution;
send the reward redemption offer to a user computer for display to the user;
receive a purchase request from the user computer to execute the reward redemption offer for purchase of the item from the merchant computer via the exchange computer, the purchase request comprising an election of the first option to accept of the proposed reward redemption solution or an election of the second option to modify the proposed reward redemption solution; and
cause a purchase transaction to be executed for purchase of the item from the merchant computer in accordance with the purchase request by
requesting an issuer computer associated with the reward redemption offer to
reduce a user reward account stored on the issuer computer by a quantity of reward points for execution of the purchase request, and
convey consideration to the exchange computer corresponding to the quantity of reward points reduced in the user reward account; and
conveying consideration to the merchant computer in exchange for providing the selected item to the user.

10. The exchange computer of claim 9 wherein the user profile comprises information regarding prior reward redemptions of the user executed via the exchange computer, and wherein the exchange computer programmed to generate the reward redemption based on the prior reward redemptions of the user.

11. The exchange computer of claim 9 wherein the user profile comprises information regarding prior product viewing history via the exchange computer, and wherein the exchange computer programmed to generate the reward redemption offer based on the prior viewing history of the user.

12. The exchange computer of claim 9 further programmed to allow a merchant computer to access the user profile database in order to generate a product offer to the user that is targeted to the user based on the user profile of the user.

13. The exchange computer of claim 9 further programmed to receive from the user computer a selection of an item to be purchased in accordance with the reward redemption offer.

14. The exchange computer of claim 13 further programmed to provide to the user computer a dynamic search filter that enables the user computer to select a desired product category, manufacturer, and/or price range in order to select the item to be purchased in accordance with the reward redemption offer.

15. The exchange computer of claim 13 further programmed to receive from the user computer the selection of the item to be purchased as a result of receiving an image of a bar code scanned with a mobile camera-phone, the bar code associated with the item to be purchased.

16. The exchange computer of claim 13 further programmed to
receive a plurality of points of interest selected by the user computer;
analyze the plurality of points of interest received from the user computer; and
provide to the user computer a web page displaying products available for redemption determined as a result of analyzing the points of interest selected by the user computer.

* * * * *